US012753710B2

(12) United States Patent
O'Donnell et al.

(10) Patent No.: US 12,753,710 B2
(45) Date of Patent: Oct. 6, 2026

(54) THERMAL ENERGY STORAGE SYSTEM COUPLED WITH A SOLID OXIDE ELECTROLYSIS SYSTEM

(71) Applicant: Rondo Energy, Inc., Alameda, CA (US)

(72) Inventors: John Setel O'Donnell, Oakland, CA (US); Yusef Desjardins Ferhani, Menlo Park, CA (US)

(73) Assignee: Rondo Energy, Inc., Alameda, CA (US)

( * ) Notice: Subject to any disclaimer, the term of this patent is extended or adjusted under 35 U.S.C. 154(b) by 0 days.

(21) Appl. No.: 18/915,679

(22) Filed: Oct. 15, 2024

(65) Prior Publication Data

US 2025/0243788 A1 Jul. 31, 2025

Related U.S. Application Data

(60) Continuation of application No. 18/204,910, filed on Jun. 1, 2023, now Pat. No. 12,146,424, which is a (Continued)

(51) Int. Cl.
*F01K 3/02* (2006.01)
*B63H 11/00* (2006.01)

(Continued)

(52) U.S. Cl.
CPC ................ *F01K 3/02* (2013.01); *B63H 11/00* (2013.01); *F01K 3/08* (2013.01); *F01K 3/186* (2013.01);

(Continued)

(58) Field of Classification Search
CPC ... F01K 3/02; F01K 3/08; F01K 3/186; F01K 13/02; F01K 15/00; F01K 11/02;

(Continued)

(56) References Cited

U.S. PATENT DOCUMENTS 1,089,951 A 3/1914 Otto
1,700,542 A 1/1929 O'Donnell (Continued)

FOREIGN PATENT DOCUMENTS

AU 2012292959 B2 2/2016
AU 2016100264 A4 4/2016

(Continued)

OTHER PUBLICATIONS

AMETEK Process Instruments, "Reduce Nox Emissions While Improving Fuel Efficiency", EDG Series Gas Analyzers, Year: 2018, in 2 pages.

(Continued)

*Primary Examiner* — Shafiq Mian
(74) *Attorney, Agent, or Firm* — Procopio, Cory, Hargreaves & Savitch LLP; Matt Rainey

(57) ABSTRACT

An energy storage system (TES) converts variable renewable electricity (VRE) to continuous heat at over 1000° C. Intermittent electrical energy heats a solid medium. Heat from the solid medium is delivered continuously on demand. Heat delivery via flowing gas establishes a thermocline which maintains high outlet temperature throughout discharge. The delivered heat which may be used for processes including power generation and cogeneration. In one application, the energy storage system provides higher-temperature heat to a solid oxide electrolysis system to maintain in an electrolysis operating temperature range during operation and nonoperation, thereby increasing the efficiency of the temperature control.

21 Claims, 16 Drawing Sheets

Related U.S. Application Data continuation-in-part of application No. 18/144,134, filed on May 5, 2023, now Pat. No. 11,913,361, which is a continuation-in-part of application No. 18/171,602, filed on Feb. 20, 2023, now Pat. No. 11,873,743, which is a division of application No. 17/650,522, filed on Feb. 9, 2022, now Pat. No. 11,585,243, said application No. 18/144,134 is a continuation-in-part of application No. 18/142,564, filed on May 2, 2023, now Pat. No. 12,018,596, which is a continuation-in-part of application No. 17/668,333, filed on Feb. 9, 2022, now Pat. No. 11,702,963, said application No. 17/650,522 is a continuation of application No. 17/537,407, filed on Nov. 29, 2021, now Pat. No. 11,603,776, said application No. 18/144,134 is a continuation-in-part of application No. PCT/US2021/061041, filed on Nov. 29, 2021, said application No. 18/142,564 is a continuation-in-part of application No. PCT/US2021/061041, filed on Nov. 29, 2021, said application No. 17/668,333 is a continuation of application No. 17/537,407, filed on Nov. 29, 2021, now Pat. No. 11,603,776.

(60) Provisional application No. 63/347,987, filed on Jun. 1, 2022, provisional application No. 63/378,355, filed on Oct. 4, 2022, provisional application No. 63/427,374, filed on Nov. 22, 2022, provisional application No. 63/434,919, filed on Dec. 22, 2022, provisional application No. 63/459,540, filed on Apr. 14, 2023, provisional application No. 63/338,805, filed on May 5, 2022, provisional application No. 63/337,562, filed on May 2, 2022, provisional application No. 63/231,155, filed on Aug. 9, 2021, provisional application No. 63/170,370, filed on Apr. 2, 2021, provisional application No. 63/165,632, filed on Mar. 24, 2021, provisional application No. 63/155,261, filed on Mar. 1, 2021, provisional application No. 63/119,443, filed on Nov. 30, 2020.

(51) Int. Cl.

| | |
|---|---|
| ***F01K 3/08*** | (2006.01) |
| ***F01K 3/18*** | (2006.01) |
| ***F01K 13/02*** | (2006.01) |
| ***F01K 15/00*** | (2006.01) |
| ***F03G 6/00*** | (2006.01) |
| ***F22B 29/06*** | (2006.01) |
| ***F22B 35/10*** | (2006.01) |
| ***F28D 20/00*** | (2006.01) |
| ***H01M 8/04007*** | (2016.01) |
| ***H01M 8/04014*** | (2016.01) |
| ***H01M 8/04029*** | (2016.01) |
| ***H02J 1/102*** | (2026.01) |
| ***H02J 3/00*** | (2006.01) |
| ***H02J 3/04*** | (2006.01) |
| ***H02M 1/00*** | (2006.01) |
| *B63H 11/12* | (2006.01) |
| *B63H 11/14* | (2006.01) |
| *B63H 11/16* | (2006.01) |
| *F01K 11/02* | (2006.01) |
| *F01K 19/04* | (2006.01) |
| *F03D 9/18* | (2016.01) |

(52) U.S. Cl.

CPC .............. *F01K 13/02* (2013.01); *F01K 15/00* (2013.01); *F03G 6/071* (2021.08); *F22B 29/06* (2013.01); *F22B 35/10* (2013.01); *F28D 20/00* (2013.01); *H01M 8/04014* (2013.01); *H01M 8/04029* (2013.01); *H01M 8/04037* (2013.01); *H01M 8/04052* (2013.01); *H01M 8/04074* (2013.01); *H02J 1/102* (2013.01); *H02J 3/00* (2013.01); *H02J 3/04* (2013.01); *H02M 1/0003* (2021.05); *H02M 1/007* (2021.05); *B63H 11/12* (2013.01); *B63H 11/14* (2013.01); *B63H 11/16* (2013.01); *F01K 11/02* (2013.01); *F01K 19/04* (2013.01); *F03D 9/18* (2016.05); *F28D 2020/0004* (2013.01); *Y02E 60/14* (2013.01)

(58) Field of Classification Search

CPC ..... F01K 19/04; H02M 1/007; H02M 1/0003; F03G 6/071; B63H 11/00; B63H 11/12; B63H 11/14; B63H 11/16; F22B 29/06; F22B 35/10; F28D 20/00; F28D 2020/0004; H01M 8/0401; H01M 8/04029; H01M 8/04037; H01M 8/04052; H01M 8/04074; H02J 1/102; H02J 3/00; H02J 3/04; F03D 9/18; Y02E 60/14

See application file for complete search history.

(56) References Cited

U.S. PATENT DOCUMENTS

| | | | | |
|---|---|---|---|---|
| 1,700,642 | A | 1/1929 | Meindersma | |
| 2,833,532 | A | 5/1958 | Ries | |
| 3,103,917 | A | 9/1963 | Bauer et al. | |
| 3,381,113 | A | 4/1968 | Jacques et al. | |
| 3,549,136 | A | 12/1970 | Baab et al. | |
| 3,788,066 | A | 1/1974 | Nebgen | |
| 3,908,381 | A | 9/1975 | Barber et al. | |
| 3,995,434 | A | 12/1976 | Kato et al. | |
| 4,011,430 | A | 3/1977 | Witkin et al. | |
| 4,028,884 | A | 6/1977 | Martz et al. | |
| 4,110,987 | A | 9/1978 | Cahn et al. | |
| 4,123,909 | A | 11/1978 | French | |
| 4,124,061 | A | 11/1978 | Mitchell et al. | |
| 4,127,161 | A | 11/1978 | Clyne et al. | |
| 4,146,057 | A | 3/1979 | Friedman et al. | |
| 4,172,442 | A | 10/1979 | Boblitz | |
| 4,200,783 | A | 4/1980 | Ehret | |
| 4,222,365 | A | 9/1980 | Thomson | |
| 4,234,782 | A | 11/1980 | Barabas et al. | |
| 4,237,692 | A | 12/1980 | Ahrens et al. | |
| 4,312,324 | A | 1/1982 | Ross et al. | |
| 4,329,592 | A | 5/1982 | Wagner et al. | |
| 4,397,962 | A | 8/1983 | Schockmel | |
| 4,438,630 | A | 3/1984 | Rowe | |
| 4,524,756 | A | 6/1985 | Laverman | |
| 4,651,810 | A | 3/1987 | Triessnig | |
| 4,809,523 | A | 3/1989 | Vandenberg | |
| 4,874,034 | A | 10/1989 | Hirata et al. | |
| 4,979,374 | A | 12/1990 | Kabakov et al. | |
| 5,154,224 | A | 10/1992 | Yasui et al. | |
| 5,286,472 | A | 2/1994 | Fulford | |
| 5,384,489 | A | 1/1995 | Bellac | |
| 5,416,416 | A | 5/1995 | Bisher | |
| 5,419,388 | A | 5/1995 | Hickel et al. | |
| 5,553,604 | A | 9/1996 | Frei | |
| 5,634,313 | A | 6/1997 | Mögling | |
| 5,924,477 | A | 7/1999 | Doru | |
| 6,274,855 | B1 | 8/2001 | Tatematsu et al. | |
| 6,302,188 | B1 | 10/2001 | Ruhl et al. | |
| 6,322,356 | B1 | 11/2001 | Gupta et al. | |
| 6,631,754 | B1 | 10/2003 | Bremont et al. | |
| 7,213,409 | B1 | 5/2007 | Nuckols | |
| 7,693,402 | B2 | 4/2010 | Hudson et al. | |
| 7,800,024 | B2 | 9/2010 | Duguay et al. | |
| 8,226,917 | B2 | 7/2012 | Fan et al. | |
| 8,544,275 | B2 | 10/2013 | Shinnar | |
| 8,701,773 | B2 | 4/2014 | O'Donnell et al. | |
| 8,960,182 | B2 * | 2/2015 | Magaldi .................. | F24S 60/00 126/609 |

(56) References Cited

U.S. PATENT DOCUMENTS 9,370,044 B2 6/2016 McDonald
9,512,826 B2 12/2016 Rodionov et al.
9,556,708 B2 1/2017 Schneider et al.
9,642,188 B2 5/2017 Bach et al.
9,816,490 B2 11/2017 Conlon
9,816,491 B2 11/2017 Perry
9,948,140 B2 4/2018 Pietsch et al.
9,989,271 B1 6/2018 Becker
10,113,535 B2 10/2018 Conlon
10,221,726 B2 3/2019 Balczunas et al.
10,334,881 B1 7/2019 Conley et al.
10,345,050 B2 7/2019 Pietsch et al.
10,527,026 B2 1/2020 Muir et al.
10,767,935 B2 9/2020 Bergan et al.
10,775,111 B2 9/2020 Kerth
10,876,521 B2 12/2020 Anderson et al.
11,038,431 B2 6/2021 Ness et al.
11,352,951 B2 6/2022 Apte et al.
11,459,944 B2 10/2022 Robinson
11,480,160 B1 10/2022 Mokheimer et al.
11,603,776 B2 3/2023 O'Donnell et al.
11,809,153 B1 11/2023 Kearns et al.
11,994,347 B2 5/2024 Ponec et al.
2003/0101728 A1 6/2003 Wakana et al.
2003/0113255 A1 6/2003 Harlan
2004/0062063 A1 4/2004 Siri
2004/0099261 A1 5/2004 Litwin
2004/0148922 A1 8/2004 Pinkerton
2004/0182081 A1 9/2004 Sim et al.
2004/0211215 A1 10/2004 Maier-Laxhuber et al.
2005/0095500 A1* 5/2005 Corless ............... H01M 8/2475 429/100
2005/0126172 A1 6/2005 Hudson et al.
2006/0107664 A1 5/2006 Hudson et al.
2006/0165908 A1 7/2006 Fey et al.
2006/0174622 A1 8/2006 Skowronski
2006/0179840 A1 8/2006 Murphy et al.
2006/0211777 A1 9/2006 Severinsky
2006/0231466 A1 10/2006 Nuber
2006/0266039 A1 11/2006 Skowronski et al.
2006/0277910 A1 12/2006 Hoetger
2007/0209365 A1 9/2007 Hamer et al.
2007/0220889 A1 9/2007 Nayef et al.
2008/0000231 A1 1/2008 Litwin et al.
2008/0066736 A1 3/2008 Zhu
2008/0127647 A1 6/2008 Leitner
2008/0134681 A1* 6/2008 Nayef ....................... H02J 3/28 60/659
2008/0279761 A1 11/2008 Kimura et al.
2008/0318143 A1 12/2008 Nakayama et al.
2009/0038668 A1 2/2009 Plaisted
2009/0090109 A1 4/2009 Mills et al.
2009/0117633 A1 5/2009 Bradley et al.
2009/0125152 A1 5/2009 Skowronski et al.
2009/0208402 A1 8/2009 Rossi
2009/0320828 A1 12/2009 Koketsu et al.
2010/0005966 A1 1/2010 Wibberley
2010/0101462 A1 4/2010 Hayashi et al.
2010/0132391 A1 6/2010 Barot
2010/0178156 A1 7/2010 Rivas Cortes et al.
2010/0195357 A1 8/2010 Fornage et al.
2010/0229523 A1 9/2010 Holt et al.
2010/0251711 A1 10/2010 Howes et al.
2010/0295306 A1 11/2010 Ridnik et al.
2011/0083443 A1 4/2011 Jockenhoevel et al.
2011/0226440 A1 9/2011 Bissell et al.
2011/0247335 A1 10/2011 Schmid et al.
2011/0277469 A1 11/2011 Brenmiller et al.
2011/0286902 A1 11/2011 Fan et al.
2011/0289924 A1 12/2011 Pietsch
2012/0067047 A1 3/2012 Peterson et al.
2012/0097151 A1 4/2012 Matsuno et al.
2012/0102950 A1 5/2012 Turchi
2012/0131898 A1 5/2012 Mokheimer et al.
2012/0151926 A1 6/2012 Labbe
2012/0167559 A1 7/2012 Havel
2012/0167567 A1 7/2012 Kleine
2012/0227926 A1 9/2012 Field et al.
2012/0241677 A1 9/2012 Perkins et al.
2012/0255309 A1 10/2012 Venetos et al.
2012/0286524 A1 11/2012 Bronicki
2013/0025817 A1 1/2013 Callaghan
2013/0047976 A1 2/2013 Kaftori
2013/0056170 A1 3/2013 Klemencic
2013/0081394 A1 4/2013 Perry
2013/0081395 A1 4/2013 Frey et al.
2013/0118169 A1 5/2013 Milam et al.
2013/0175006 A1 7/2013 Robinson et al.
2014/0004469 A1 1/2014 Recourt et al.
2014/0053554 A1 2/2014 Tartibi et al.
2014/0074314 A1 3/2014 Niknafs et al.
2014/0102073 A1 4/2014 Pang et al.
2014/0116069 A1 5/2014 Peterson et al.
2014/0190469 A1 7/2014 O'Donnell et al.
2014/0216717 A1 8/2014 O'Donnell et al.
2014/0223906 A1 8/2014 Gee et al.
2014/0224469 A1 8/2014 Mirmobin et al.
2014/0366536 A1 12/2014 Muren
2015/0007577 A1 1/2015 Li et al.
2015/0027122 A1 1/2015 Brunhuber et al.
2015/0033740 A1 2/2015 Anderson et al.
2015/0053266 A1 2/2015 Chen et al.
2015/0134120 A1 5/2015 Sun et al.
2015/0143806 A1 5/2015 Friesth
2015/0143811 A1 5/2015 Pang et al.
2015/0167489 A1 6/2015 Heiligenstein et al.
2015/0176920 A1 6/2015 Vendeirinho
2015/0224850 A1 8/2015 Bank et al.
2015/0267566 A1 9/2015 Vamvas
2015/0276234 A1 10/2015 Muro et al.
2015/0295508 A1 10/2015 Conry
2015/0354545 A1 12/2015 Conlon
2015/0369125 A1 12/2015 Reiter et al.
2016/0130709 A1 5/2016 Hong et al.
2016/0146110 A1 5/2016 Hackstein et al.
2016/0164451 A1 6/2016 Lenert et al.
2016/0208657 A1 7/2016 Brückner et al.
2016/0214910 A1 7/2016 King
2016/0281607 A1 9/2016 Asati et al.
2016/0301093 A1* 10/2016 Bosmann .......... H01M 8/04201
2016/0355932 A1* 12/2016 Reytier ..................... C25B 3/00
2017/0051949 A1 2/2017 Uselton
2017/0058768 A1 3/2017 Bergins et al.
2017/0093163 A1 3/2017 Johnson et al.
2017/0204741 A1 7/2017 Hogen et al.
2017/0241649 A1 8/2017 Cave
2017/0241669 A1 8/2017 von Behrens
2017/0283713 A1 10/2017 Stephens et al.
2017/0362090 A1 12/2017 Melsert et al.
2017/0362724 A1 12/2017 Planque et al.
2018/0003445 A1 1/2018 Bergan et al.
2018/0028967 A1 2/2018 Balfe et al.
2018/0038352 A1 2/2018 Conlon
2018/0073777 A1 3/2018 O'Donnell et al.
2018/0083449 A1 3/2018 Green
2018/0106739 A1 4/2018 Esmaili et al.
2018/0163574 A1 6/2018 Bailey et al.
2018/0179955 A1 6/2018 Apte et al.
2018/0207557 A1 7/2018 Nellis
2018/0216010 A1 8/2018 Hong
2018/0231316 A1 8/2018 Watremetz et al.
2018/0238563 A1 8/2018 Stepa et al.
2018/0245485 A1 8/2018 Conlon
2018/0278439 A1 9/2018 Cox
2018/0292097 A1 10/2018 Specter
2018/0347406 A1 12/2018 Friesth
2018/0372337 A1 12/2018 Walker
2018/0372420 A1 12/2018 Ahadi et al.
2019/0003308 A1 1/2019 Laughlin
2019/0043624 A1 2/2019 Fork et al.
2019/0045617 A1 2/2019 Fork et al.
2019/0096535 A1 3/2019 Olshansky et al.
2019/0140477 A1 5/2019 Yang et al.
2019/0162482 A1 5/2019 Kerth

(56) References Cited

U.S. PATENT DOCUMENTS

| | | | | |
|---|---|---|---|---|
| 2019/0170436 | A1 | 6/2019 | De et al. | |
| 2019/0186786 | A1 | 6/2019 | Neiser | |
| 2019/0226462 | A1 | 7/2019 | Conlon | |
| 2019/0245224 | A1 | 8/2019 | Lacroix et al. | |
| 2019/0331098 | A1 | 10/2019 | von Behrens et al. | |
| 2019/0359894 | A1 | 11/2019 | Heidel et al. | |
| 2020/0095984 | A1 | 3/2020 | Karni et al. | |
| 2020/0124356 | A1 | 4/2020 | Ma et al. | |
| 2020/0172815 | A1 | 6/2020 | Stephens et al. | |
| 2020/0217518 | A1 | 7/2020 | Field et al. | |
| 2020/0232345 | A1 | 7/2020 | Zwinkels | |
| 2020/0332201 | A1 | 10/2020 | Koseoglu et al. | |
| 2020/0346165 | A1 | 11/2020 | Lu et al. | |
| 2020/0358112 | A1* | 11/2020 | Chatroux | H01M 8/12 |
| 2020/0378599 | A1 | 12/2020 | Risseeuw et al. | |
| 2020/0386447 | A1 | 12/2020 | Wang | |
| 2021/0053689 | A1 | 2/2021 | Lynn et al. | |
| 2021/0094834 | A1 | 4/2021 | Chen et al. | |
| 2021/0143446 | A1 | 5/2021 | Ponec et al. | |
| 2021/0172685 | A1 | 6/2021 | Bergan et al. | |
| 2021/0190044 | A1 | 6/2021 | Anderson et al. | |
| 2021/0207527 | A1 | 7/2021 | Robinson | |
| 2021/0211066 | A1 | 7/2021 | Vavilpalli et al. | |
| 2021/0325069 | A1 | 10/2021 | Cotton et al. | |
| 2021/0328544 | A1 | 10/2021 | Johnson et al. | |
| 2021/0389056 | A1 | 12/2021 | Calvet et al. | |
| 2022/0049615 | A1 | 2/2022 | Truong | |
| 2022/0049631 | A1 | 2/2022 | Deng | |
| 2022/0060142 | A1 | 2/2022 | Akhavan-Tafti | |
| 2022/0085603 | A1 | 3/2022 | McNamara et al. | |
| 2022/0090827 | A1 | 3/2022 | Magaldi et al. | |
| 2022/0132633 | A1 | 4/2022 | Forsberg et al. | |
| 2022/0146205 | A1 | 5/2022 | Eronen et al. | |
| 2022/0170386 | A1 | 6/2022 | O'Donnell et al. | |
| 2022/0228271 | A1* | 7/2022 | Ashok | F01K 7/16 |
| 2022/0228772 | A1 | 7/2022 | Murata et al. | |
| 2022/0268179 | A1 | 8/2022 | O'Donnell et al. | |
| 2022/0290929 | A1 | 9/2022 | Doerbeck | |
| 2022/0307386 | A1 | 9/2022 | Savic et al. | |
| 2022/0403759 | A1 | 12/2022 | Stapp, III et al. | |
| 2022/0412228 | A1 | 12/2022 | Ponec et al. | |
| 2023/0052951 | A1 | 2/2023 | Migl et al. | |
| 2023/0086892 | A1 | 3/2023 | Robertson et al. | |
| 2023/0216297 | A1 | 7/2023 | Peri et al. | |
| 2023/0287808 | A1 | 9/2023 | Conlon | |
| 2023/0407186 | A1 | 12/2023 | Sundaram et al. | |
| 2024/0092646 | A1 | 3/2024 | Isobe et al. | |
| 2024/0418106 | A1 | 12/2024 | Bostick et al. | |
| 2025/0026986 | A1 | 1/2025 | Zellhuber et al. | |

FOREIGN PATENT DOCUMENTS

| | | | |
|---|---|---|---|
| AU | 2016204109 | B2 | 5/2018 |
| CH | 703751 | A1 | 3/2012 |
| CN | 1559893 | A | 1/2005 |
| CN | 101799200 | A | 8/2010 |
| CN | 101592439 | B | 4/2011 |
| CN | 102897812 | A | 1/2013 |
| CN | 104242433 | A | 12/2014 |
| CN | 104296577 | A | 4/2016 |
| CN | 105575659 | A | 5/2016 |
| CN | 105605957 | A | 5/2016 |
| CN | 105948037 | A | 9/2016 |
| CN | 106052451 | A | 10/2016 |
| CN | 106247836 | A | 12/2016 |
| CN | 107246732 | A | 10/2017 |
| CN | 107872196 | A | 4/2018 |
| CN | 108167034 | A | 6/2018 |
| CN | 108204760 | A | 6/2018 |
| CN | 108362151 | A | 8/2018 |
| CN | 108362152 | A | 8/2018 |
| CN | 108612634 | A | 10/2018 |
| CN | 106767074 | B | 12/2018 |
| CN | 109883241 | A | 6/2019 |
| CN | 110411260 | A | 11/2019 |
| CN | 111256364 | A | 6/2020 |
| CN | 210802160 | U | 6/2020 |
| CN | 211183438 | U | 8/2020 |
| CN | 111655989 | A | 9/2020 |
| CN | 110725725 | B | 12/2020 |
| CN | 112113203 | A | 12/2020 |
| CN | 212157096 | U | 12/2020 |
| CN | 113835372 | A | 12/2021 |
| CN | 114754617 | A | 7/2022 |
| CN | 109445511 | B | 3/2024 |
| DE | 19808810 | C1 | 6/1999 |
| DE | 10029732 | A1 | 1/2002 |
| DE | 102008051384 | B3 | 2/2010 |
| DE | 102009020531 | B3 | 4/2011 |
| DE | 102012024526 | B4 | 9/2014 |
| DE | 102013212981 | A1 | 1/2015 |
| DE | 102017212684 | A1 | 1/2019 |
| DE | 102019210737 | A1 | 1/2021 |
| EP | 79247 | A1 | 5/1983 |
| EP | 794161 | B1 | 7/1996 |
| EP | 1930587 | A2 | 6/2008 |
| EP | 2372116 | A1 | 10/2011 |
| EP | 2722496 | A2 | 4/2014 |
| EP | 3081770 | A1 | 10/2016 |
| EP | 3324018 | A1 | 5/2018 |
| EP | 3486594 | A1 | 5/2019 |
| EP | 2837086 | B1 | 11/2019 |
| EP | 3245388 | B1 | 11/2019 |
| EP | 3574191 | A1 | 12/2019 |
| EP | 3725917 | A1 | 10/2020 |
| EP | 2909547 | B1 | 9/2021 |
| EP | 3642296 | A1 | 1/2022 |
| GB | 2109026 | A | 5/1983 |
| GB | 2152652 | A | 8/1985 |
| GB | 2477801 | A | 8/2011 |
| IL | 284451 | | 8/2021 |
| JP | S63119874 | U | 8/1988 |
| JP | 2006145200 | A | 6/2006 |
| KR | 2001-0100320 | A | 11/2001 |
| KR | 102308531 | B1 | 10/2021 |
| MA | 40029 | A | 12/2015 |
| TW | 202100240 | A | 1/2021 |
| WO | WO 1980/000170 | | 2/1980 |
| WO | WO 2007/108014 | A1 | 9/2007 |
| WO | WO 2008/052249 | A1 | 5/2008 |
| WO | WO 2008/108870 | A1 | 9/2008 |
| WO | WO 2009/152562 | A1 | 12/2009 |
| WO | WO 2011/066039 | A1 | 6/2011 |
| WO | WO 2011/077248 | A2 | 6/2011 |
| WO | WO 2011/109514 | A1 | 9/2011 |
| WO | WO 2012/123853 | A1 | 9/2012 |
| WO | WO 2012/127178 | A1 | 9/2012 |
| WO | WO 2012/150969 | A1 | 11/2012 |
| WO | WO 2013/020176 | A1 | 2/2013 |
| WO | WO 2014/063191 | A1 | 5/2014 |
| WO | WO 2014/151843 | A2 | 9/2014 |
| WO | WO 2015/149124 | A1 | 10/2015 |
| WO | WO 2015/187423 | A2 | 12/2015 |
| WO | 2016/062425 | A1 | 4/2016 |
| WO | WO 2016/065191 | A1 | 4/2016 |
| WO | WO 2016/150455 | A1 | 9/2016 |
| WO | WO 2017/001710 | A1 | 1/2017 |
| WO | WO 2017/049320 | A1 | 3/2017 |
| WO | WO 2017/147022 | A1 | 8/2017 |
| WO | WO 2018/011363 | A1 | 1/2018 |
| WO | 2018/024409 | A1 | 2/2018 |
| WO | WO 2018/101989 | A1 | 6/2018 |
| WO | WO 2018/164647 | A1 | 9/2018 |
| WO | WO 2019/020562 | A1 | 1/2019 |
| WO | WO 2019/149623 | A1 | 8/2019 |
| WO | WO 2019/224538 | A1 | 11/2019 |
| WO | WO 2020/068758 | A1 | 4/2020 |
| WO | 2020/136456 | A1 | 7/2020 |
| WO | WO 2020/254001 | A1 | 12/2020 |
| WO | WO 2022/086630 | A1 | 4/2022 |
| WO | WO 2022/187903 | A1 | 9/2022 |

(56) References Cited

FOREIGN PATENT DOCUMENTS

| | | | |
|---|---|---|---|
| WO | 2023/219610 | A1 | 11/2023 |
| ZA | 201603514 | B | 11/2018 |

OTHER PUBLICATIONS

Fakhroleslam, Mohammad, et al., "Thermal/catalytic cracking of hydrocarbons for the production of olefins; a state-of-the-art review III: Process modeling and simulation", Elsevier, www.elsevier.com/locate/fuel, Fuel 252 (2019) 553-566, in 14 pages.
Sakakibara, Reyu, et al., "Practical emitters for thermophotovoltaics: a review", Journal of Photonics for Energy, vol. 9, Issue 3, 032713 (Feb. 2019), https://doi.org/10.1117/1.JPE.9.032713, in 38 pages.
"Ethylene Production via Cracking of Ethane-Propane", Chemical Engineering, Nov. 1, 2015, Total pp. 4.
"Matching Time Of Use Periods With Grid Conditions Maximizes Use Of Renewable Resources", California ISO, Outcropping Way, Folsom, 2015, Total pp. 2.
"Miscibility Gap Alloys", University of Newcastle, accessed at https://miscibilitygapalloy.blogspot.com/p/how-did-it-stater-ted.html on Apr. 2, 2022.
Aaron Rimpel et al., "Liquid Air Combined Cycle (LACC) for Power and Storage", Thermal-Mechanical-Chemical Energy Storage (TMCES) Workshop, Aug. 10-11, 2021, Total pp. 6.
Alexis McKittrick, "Low Temperature & Coproduced Resources Reservoir Thermal Energy Storage (RTES) Portfolio", Geothermal Technologies Office, U.S. Department of Energy, dated Feb. 2022. Total pp. 4.
Anthony Rawson et al., "Effective conductivity of Cu—Fe and Sn—Al miscibility gap alloys", International Journal of Heat and Mass Transfer, vol. 77, Oct. 2014, pp. 395-405, Total pp. 11.
Antoni Gil et al., "State of the art on high temperature thermal energy storage for power generation. Part 1—Concepts, materials and modellization", Renewable and Sustainable Energy Reviews, vol. 14, Issue 1, Jan. 2010, pp. 31-55, Total pp. 25.
Audrey Barucchi, "Calix files a new patent for zero emissions iron and steel", https://www.calix.global/co2-mitigation-focus-area/new-patent-for-zero-emissions-iron-and-steel/, Nov. 23, 2021, Total pp. 5.
Bao Truong, "Malta Pumped Heat Energy Storage System Green Heat & Power Application", Energy Storage for Manufacturing and Industrial Decarbonization Workshop, Feb. 9, 2022, Total pp. 5.
Ben Bollinger, "Malta Pumped Heat Energy Storage", Malta, Aug. 10, 2021, Total pp. 9.
Cédric Philibert, "Renewable Energy for Industry", Renewable Energy Division, International Energy Agency, Nordic Pavillion, COP23, Fidji—Bonn, Nov. 15, 2017, Total pp. 7.
Charles Forsberg et al., "Coupling heat storage to nuclear reactors for variable electricity output with baseload reactor operation", The Electricity Journal, vol. 31, Issue 3, Apr. 2018, pp. 23-31, Total pp. 9.
Charles Forsberg et al., "Variable Electricity from Base-load Nuclear Power Plants Using Stored Heat", International Congress on Advances in Nuclear Power Plants (ICAPP 2015), May 2015, Total pp. 12.
Charles Forsberg, "Heat Storage and the Electricity Grid Integrating Nuclear and Renewables into a Low-Carbon Economic Grid", Massachusetts Institute of Technology, Jan. 2017, Massachusetts, Cambridge, Total pp. 114.
Charles Forsberg, "Hybrid systems to address seasonal mismatches between electricity production and demand in nuclear renewable electrical grids", Energy Policy, vol. 62, Nov. 2013, pp. 333-341, Total pp. 9.
Charles W Forsberg et al., "Converting excess low-price electricity into high-temperature stored heat for industry and high-value electricity production", The Electricity Journal, vol. 30, Issue 6, Jul. 2017, pp. 42-52, Total pp. 11.
Christopher Fraughton, "Electro-Thermal Energy Storage General Presentation", MAN Energy Solutions, Aug. 2021, Total pp. 23.
CK-12 Foundation, "Saturated Hydrocarbon", Apr. 2, 2022, Total pp. 8.
Clifford K. Ho, "High-Temperature Thermal Storage in Moving and Fixed Particle Beds", Thermal-Mechanical-Chemical Energy Storage (TMCES) Workshop, San Antonio, TX, dated Aug. 10, 2021. Total pp. 13.
Cowper Stove An overview ScienceDirect Topics, Sep. 13, 2021, Total pp. 25.
D. Fernandes et al., "Thermal energy storage: How previous findings determine current research priorities", Energy, vol. 39, Issue 1, Mar. 2012, pp. 246-257, Total pp. 12.
Daniel C Stack et al., "Performance of firebrick resistance-heated energy storage for industrial heat applications and round-trip electricity storage", Applied Energy, vol. 242, May 15, 2019, pp. 782-796, Total pp. 15.
Daniel Christopher Stack, "Conceptual Design and Performance Characteristics of Firebrick Resistance-Heated Energy Storage for Industrial Heat Supply and Variable Electricity Production", Thesis, Master of Science in Nuclear Science and Engineering, Massachusetts Institute of Technology, Feb. 2017, Total pp. 166.
Daniel Christopher Stack, "Development of high-temperature firebrick resistance-heated energy storage (FIRES) using doped ceramic heating system", Thesis, Doctor of Philosophy in Nuclear Science and Engineering, Massachusetts Institute of Technology, Feb. 2021, Total pp. 121.
Daniel Stack et al., "Joule Hive-Replacing fire with renewable heat", Aug. 28, 2021, Total pp. 15.
David Bierman, "Clean, affordable, and reliable heat & electricity", Antora Energy, Feb. 2022, Total pp. 9.
David L. Chandler "MIT News: Turning desalination waste into a useful resource" MIT News Office, Feb. 13, 2019 (Cited in NFOA dated Sep. 14, 2022 in related U.S. Appl. No. 17/650,522.).
David Roberts, "Solar power's greatest challenge was discovered 10 years ago. It looks like a duck", www.vox.com, Aug. 29, 2018, Total pp. 19.
Dr. Avi Shultz, "Concentrating Solar-thermal Power and Thermal Energy Storage", U.S. Department of Energy, dated Feb. 8, 2022. Total pp. 7.
Dr. Avi Shultz, "Industrial Decarbonization:Renewable Process Heating from Concentrating Solar Thermal", U.S. Department of Energy, dated Feb. 8, 2022. Total pp. 6.
Dr. Eric L. Miller, "The Hydrogen Energy Earthshot and H2@Scale: Importance to Industrial Decarbonization", Energy StorM Panel, Feb. 8, 2022, Total pp. 9.
Dr. Gianluca Ambrosetti et al., "Cement Production", Energy Storage for Manufacturing and Industrial Decarbonization Workshop "Energy StorM", Feb. 8, 2022, Total pp. 10.
Dr. Jeffrey Goldmeer, "Power To Gas: Hydrogen for Power Generation Fuel Flexible Gas Turbines as Enablers for a Low or Reduced Carbon Energy Ecosystem," GE Power, Feb. 2019, 19 pages.
Echogen, "CO2-Based Pumped-Thermal Energy Storage Technical Overview & Status", Echogen Power System, Total pp. 20, Aug. 10-11, 2021.
Elizabeth Endler, "Energy Storage for Manufacturing Petrochemical Industry Perspective", Feb. 8, 2022, "Energy StorM" Workshop, US Department of Energy, Total pp. 14.
Elliott Group, "Materials for Hydrogen Compression", Thermo-Mechanical-Chemical Energy Storage Workshop, Elliott, Aug. 10-11, 2021, Total pp. 25.
Emiliano Bellini, "Long-duration thermal storage system based on silica sand", pv magazine International, Nov. 5, 2021, Total pp. 6.
Emiliano Bellini, "Storing wind, solar power with silica sands", pv magazine International, Sep. 1, 2021, Total pp. 10.
GE Energy Storage Unit RSU-4000, Modular, Scalable Energy Storage Solution for Utility-Scale Applications; www/ge.com/energystorage; 2020, 1 page.
Gregory C Staple, "California's Grid Geeks: Flattening the 'duck curve'", Jan. 25, 2017, www.greenbiz.com, Total Page Count 9.
Grid Energy Storage, U.S. Department of Energy, Dec. 2013, Total pp. 67.

(56) References Cited

OTHER PUBLICATIONS

Haisheng Chen et al., "Progress in electrical energy storage system: A critical review", Progress in Natural Science, vol. 19, Issue 3, Mar. 10, 2009, pp. 291-312, Total pp. 22.
Hamish Andrew Miller, et al. "Green hydrogen from anion exchange membrane water electrolysis: a review of recent developments in critical materials and operating conditions," rsc.li/sustainable-energy; DOI: 10.1039/c9se01240k; Accepted Mar. 4, 2020; 20 pages.
Heber Sugo, "Miscibility gap alloys with inverse microstructures and high thermal conductivity for high energy density thermal storage applications", Applied Thermal Engineering, vol. 51, Issues 1-2, Mar. 2013, pp. 1345-1350, Total pp. 6.
Hélder Da Silva, "Energy Storage for Manufacturing and Industrial Decarbonization Workshop "Energy StorM"", Feb. 8, 2022, Total pp. 11.
Hitesh Bindra et al., "Sliding flow method for exergetically efficient packed bed thermal storage", Applied Thermal Engineering, vol. 64, Issues 1-2, Mar. 2014, pp. 201-208, Total pp. 8.
Hitesh Bindra et al., "Thermal analysis and exergy evaluation of packed bed thermal storage systems", Applied Thermal Engineering, vol. 52, Issue 2, Apr. 15, 2013, pp. 255-263, Total pp. 9.
"How thermal power plants can benefit from the energy transition", The Future of Energy 2019, Siemens Gamesa Renewable Energy, 10 pages.
Ilievski D, "New Two-Stage Calcination Technology", Proceedings of the 9th International Alumina Quality Workshop, Alcoa World Alumina, Technology Delivery Group, Western Australia, 2012, Total pp. 7.
Industrial Decarbonization using Electric Thermal Energy Storage (ETES), Jan. 25, 2022, Total pp. 11.
International Search Report mailed on Sep. 14, 2022 for International Application No. PCT/US2021/061041, 41 pages.
International Search Report and Written Opinion mailed on Mar. 1, 2024 for International Application No. PCT/US2023/034488, 14 pages.
International Search Report and Written Opinion mailed on May 17, 2024 for International Application No. PCT/US2023/085826, 14 pages.
International Search Report and Written Opinion mailed on Aug. 23, 2024 for International Application No. PCT/US2024/024158, 9 pages.
Jaume Gasia et al., "Review on system and materials requirements for high temperature thermal energy storage. Part 1: General requirements", Renewable and Sustainable Energy Reviews, vol. 75, Aug. 2017, pp. 1320-1338, Total pp. 19.
Jay Fitzgerald, "Bioenergy and Chemical Energy Storage", Energy Storage for Manufacturing & Industrial Decarbonization Workshop, Feb. 8-9, 2022, Total pp. 6.
Jeff Moore, "Development of sCO2 Turbomachinery and its Application to Energy Storage", Thermal Mechanical-Chemical-Energy-Storage Workshop, Aug. 10-11, 2021, San Antonio, TX, Total pp. 41.
Jeff Moore, "Oxygen Storage Incorporated into the Allam OxyFuel Power Cycle", Southwest Research Institute, Total pp. 8, Aug. 10-11, 2021.
Ji, Huichao, et al., "Electricity Consumption Prediction of Solid Electric Thermal Storage with a Cyber-Physical Approach", Energies Dec. 2019, 47441 doi: 10.3390/en12244744, www.mdpi.com/journal/energies, published on Dec. 12, 2019, in 18 pages.
Joe Cresko, "Energy Storage for Manufacturing", Energy Storage for Manufacturing & Industrial Decarbonization Workshop, Feb. 8-9, 2022, Total pp. 11.
Joe Paladino, "Transformation of the Electric Grid", Energy StorM Workshop, Feb. 4, 2022, Total pp. 5.
Joe Stekli, "Lcri Update TMCES 2021", Low-Carbon Resources Initiative, Electric Power Research Institute, Aug. 2021, Total pp. 31.
Joshua Schmitt, "Development of An Advanced Hydrogen Energy Storage System Using Aerogel In A Cryogenic Flux Capacitor (Cfc)", Southwest Research Institute, Aug. 10, 2021, Total pp. 8.
Lion Hirth, "The market value of variable renewables: The effect of solar wind power variability on their relative price", Energy Economics, vol. 38, Jul. 2013, pp. 218-236, Total pp. 19.
Lion Hirth, "The Optimal Share of Variable Renewables: How the Variability of Wind and Solar Power affects their Welfare-optimal Deployment", The Energy Journal, vol. 36, No. 1, p. 149-184, (2015). Total pp. 36.
Lori Schaefer-Weaton, "Solar & Battery Energy Solution Agri-Industrial Plastics Co.", Agri-Industrial Plastics Company, Feb. 2022, Total pp. 12.
Luisa F Cabeza, "Advances in Thermal Energy Storage Systems Methods and Applications", Woodhead Publishing Series in Energy, No. 66, 2015, Total pp. 592.
M Gajendiran et al., "Application of Solar Thermal Energy Storage for Industrial Process Heating", Advanced Materials Research, vols. 984-985, Jul. 2019, Total pp. 7.
Marc Medrano et al., "State of the art on high-temperature thermal energy storage for power generation. Part 2—Case studies", Renewable and Sustainable Energy Reviews, vol. 14, Issue 1, Jan. 2010, pp. 56-72, Total 17.
Mathieu Hubert, "Lecture 3: Basics of industrial glass melting furnaces", IMI-NFG Course in Processing of Glass, Spring 2015, Total pp. 75.
Mecys Palsauskas, et al.: ""Device ensuring effective usage of photovoltaics for water heating"", Electrical Engineering, 101 (1), 189-202, Apr. 8, 2019 (Apr. 8, 2019), DOI: 10.1007/s00202-019-00766-0.
Michael Pesin, "The Office of Electricity Grid Modernization R&D Portfolio", Aug. 2, 2021, Total pp. 18.
Mike Gravely, "The Role of Energy Storage in Helping California Meet the State's Future Zero Carbon Energy Goals", Energy Research and Development Division, California, 2021, Total pp. 23.
Natalie Smith et al., "Integration of Pumped Heat Energy Storage with a Fossil-Fired Power Plant", U.S. Department of Energy, 2021, Total pp. 6.
PCT; Invitation to Pay Additional Fees issued in International Patent Application No. PCT/US2021/061041; mailed Mar. 24, 2022; 21 Pages.
Pintail Power LLC, "Liquid Air Combined Cycle Hybrid Energy Storage", Pintail Power LLC, Tmces Workshop, Aug. 10-11, 2021, San Antonio, TX, Total pp. 12.
Office Action in U.S. Appl. No. 17/650,519 mailed Apr. 20, 2022, 10 pages.
Office of Fossil Energy and Carbon Management, "U.S. Department of Energy Selects 12 Projects to Improve Fossil-Based Hydrogen Production, Transport, Storage and Utilization", dated Jul. 7, 2021, in 8 pages.
R. B. Laughlin, "Variable Blading in Closed-Cycle Brayton Energy Storage", TMCES, Aug. 10, 2021, San Antonio, Total pp. 26.
Rainer Kurz, "Hydrogen Pipelines & Storage", Mar. 8, 2021, Total pp. 16.
Reply to Communication Under Rule 71(3) EPC, received in corresponding EP App. No. 21 843 808.3, submitted May 6, 2024, in 9 pages.
Revterra, "Revterra Company Overview", TMCES 2021, Total pp. 14.
Reyad Sawafta, "Thermal Energy Storage—Cold Storage", Energy Storage for Manufacturing and Industrial Decarbonization Workshop, Feb. 9, 2022, Total pp. 11.
Richard Brody, "Powering the Carbon-Free Electric Future, Modular Geomechanical Pumped Storage (GPS)", Quidnet Energy, 3rd TMCES—Storage Deployment Panel, Aug. 11, 2021, Total pp. 7.
Richard T. Ibekwe, "Induction Heating of Firebricks for the Large-Scale Storage of Nuclear and Renewable Energy", Massachusetts Institute of Technology, Jun. 2018, Total pp. 40.
Robert J. Krane, "A second law analysis of a thermal energy storage system with Joulean heating of the storage element", American Society of Mechanical Engineers, Winter Annual Meeting, Miami Beach, Florida, USA, Nov. 17-21, 1985, Total pp. 10.

(56) References Cited

OTHER PUBLICATIONS

Russ Weed, "Market Needs & Technology Overview", Thermal-Mechanical-Chemical Energy Storage Workshop—Storage Deployment, Aug. 11, 2021, Total pp. 20.
S. W. Sucech et al., "Alcoa Pressure Calcination Process for Alumina", Light Metals 1986, R.E. Miller, 669-674, Total pp. 6.
Sanjoy Banerjee, "Energy Storage to Decarbonize the Industrial Sector Through Direct Electrification", Energy Storage for Manufacturing and Industrial Decarbonization Workshop, Feb. 8, 2022, Total pp. 9.
Scott Hume, "Mid-Duration Energy Storage (MDES) Benefits and Challenges", 3rd TMCES Workshop, Aug. 10, 10 2021, Total pp. 11.
Sempra Energy Utility, "SoCalGas", Total pp. 6, Oct. 2021.
Sharadga, Hussein, et al., "A hybrid PV/T and Kalina cycle for power generation", Int J Energy Res. 2018;42:4817-4829, https://doi.org/10.1002/er.4237, dated Sep. 7, 2018.
Shaun Sullivan, "Reversible Counter-Rotating Turbomachine to Enable Brayton-Laughlin Cycle", 3rd Thermal-Mechanical-Chemical Energy Storage Workshop, Aug. 10, 2021, San Antonio TX, Total pp. 7.
Siemens AG, "Compressed Air Energy Storage (CAES)", 3rd Thermal-Mechanical-Chemical Energy Storage Workshop, Siemens Energy, Aug. 2021, Total pp. 17.
Siemens Gamesa, "Electric Thermal Energy Storage (ETES)—Industrial Decarbonization", Siemens Gamesa Renewable Energy, 2020, Total pp. 9.
Soteris Kalogirou, "The potential of solar industrial process heat applications", Applied Energy, vol. 76, Issue 4, Dec. 2003, pp. 337-361, Total pp. 25.
Steffes, ThermElect Hydronic, Demand-Free, Off-Peak Heating, May 2020, Total pp. 2.
Stefica Nicol Bikes, "Australian engineers patent thermal block to store renewable energy", www.reuters.com, Oct. 27, 2021, Total pp. 6.
Storworks Power, 3rd Thermal-Mechanical-Chemical Energy Storage Workshop, Aug. 10, 2021, Total pp. 8.
Swagelok Energy Advisors Inc, "Steam Quality—Plant Operations Require A High Steam Quality", Steam Systems Best Practices, Document No. 23, 2009, Total pp. 3.
T. Fiedler et al., "Thermal capacitors made from Miscibility Gap Alloys (MGAs)", WIT Transactions on Ecology and The Environment, vol. 186, 2014, Total pp. 8.
Third Party Objections raised in corresponding EP App. No. 21 843 808.3, dated Apr. 30, 2024, with English Translation, in 8 pages.
Thomas A. Buscheck, "Hybrid-energy technology enabled by heat storage and oxy-combustion for power and industrial-heat applications with near-zero or negative CO2 emissions", Thermal-Mechanical-Chemical Energy Storage Workshop, San Antonio, Texas, Aug. 10, 2021, Total pp. 22.
Timothy C. Allison, "Thermal-Mechanical-Chemical Energy Storage Technology Overview and Research Activities", Southwest Research Institute, Aug. 9, 2021, Total pp. 22.
Todd Brix, "Converting Carbon. Storing Energy", Richland, Washington U.S.A, Feb. 9, 2022, Total pp. 13.
Tony Bowdery et al., "Heat Exchangers For Thermal Energy Storage: Challenges And Mitigation", Meggitt, Aug. 2021, Total pp. 20.
Torbjörn Lindquist, "Powering the evolution of a renewable society, by redefining energy infrastructure", Azelio, Feb. 7, 2022, Total pp. 10.
Travis McLing et al., "Dynamic Earth Energy Storage: Grid Scale Energy Storage using Planet Earth as a Thermal Battery (RTES)", Feb. 2022, Total pp. 7.
Trevor Brown, "Ammonia: the other hydrogen", Energy Storage for Manufacturing and Industrial Decarbonization Workshop "Energy StorM", Feb. 9, 2022, Total pp. 13.
Veera Gnaneswar Gude, "Energy storage for desalination processes powered by renewable energy and waste heat sources", Applied Energy, vol. 137, Jan. 1, 2015, pp. 877-898, Total pp. 22.
Vishal Sardeshpande, "Performance analysis for glass furnace regenerator", Applied Energy, vol. 88, Issue 12, Dec. 2011, pp. 4451-4458, Total pp. 8.
Whitlock, "NREL scientists partnering with Antora Energy and MIT on TPV projects" Renewable Energy Magazine Dec. 10, 2021, https://www.renewableenergymagazine.com/pv_solar/nrel-scientists-partnering-with-antoraenergy-and-20211210.
Written Opinion of the International Searching Authority mailed on Sep. 14, 2022 for PCT/US2021/061041, 25 pages.
Zhao, Haichuan, et al., "Thermal Calculation and Experimental Investigation of Electric Heating and Solid Thermal Storage System", Energies 2020, 13, 5241; doi: 10.3390/en13205241, www.mdpi.com/journal/energies, published on Oct. 9, 2020, in 20 pages.
Zhou et al., "Highly Conductive Porous Graphene/Ceramic Composites for Heat Transfer and Thermal Energy Storage," Adv. Funct. Mater., 2013, 23, pp. 2263-2269.
International Search Report and Written Opinion mailed on Dec. 20, 2024 for International Application No. PCT/US2024/024156, 29 pages.
Song, Jian, et al., "Combined supercritical CO2 (SCO2) cycle and organic Rankine cycle (ORC) system for hybrid solar and geothermal power generation: Thermoeconomic assessment of various configurations", (Year: 2021), in 16 pages.
International Search Report and Written Opinion mailed on Apr. 25, 2025 for International Application No. PCT/US2024/051145, 19 pages.
Waste Heat Recovery: Technology and Opportunities in U.S. Industry, prepared by BCS, Incorporation, Mar. 2008, in 112 pages.
International Search Report and Written Opinion mailed on Aug. 29, 2025 for International Application No. PCT/US2025/030863, 19 pages.
International Search Report and Written Opinion mailed on Oct. 16, 2025 for International Application No. PCT/US2025/036518, 13 pages.
International Search Report and Written Opinion mailed on Oct. 21, 2025 for International Application No. PCT/US2025/026289, 19 pages.
Deepinder Jot Singh, et al., "On the reduction of electric energy consumption in electrolysis: A thermodynamic study," www.sciencedirect.com, Mar. 26, 2021, Total 13 pages.

* cited by examiner

THERMAL ENERGY STORAGE SYSTEM COUPLED WITH A SOLID OXIDE ELECTROLYSIS SYSTEM

CROSS-REFERENCE TO RELATED APPLICATIONS

The present application is a continuation of U.S. patent application Ser. No. 18/204,910, filed Jun. 1, 2023, which is a continuation-in-part of U.S. patent application Ser. No. 18/144,134, filed May 5, 2023[1]. This application also claims priority under 35 USC § 119(e) to:

1 which is a Continuation in part of U.S. patent application Ser. No. 18/171,602, filed Feb. 20, 2023, which is a Divisional of U.S. patent application Ser. No. 17/650,522 filed Feb. 9, 2022 and patented as U.S. Pat. No. 11,585,243, and is a continuation-in-part of U.S. patent application Ser. No. 18/142,564, filed May 2, 2023, which claims priority from Provisional Application 63/459,540 filed Apr. 14, 2023, Provisional Application 63/434,919, filed Dec. 22, 2022, Provisional Application 63/427,374, filed Nov. 22, 2022, Provisional Application 63/378,355, filed Oct. 4, 2022, Provisional Application 63/347,987, filed Jun. 1, 2022, and Provisional Application 63/338,805, filed May 5, 2022, and Provisional Application 63/337,562, filed May 2, 2022 and is a Continuation-in-part of U.S. patent application Ser. No. 17/668,333, filed Feb. 9, 2022, which claims priority to PCT/US2021/061041, filed Nov. 29, 2021 and is a continuation of U.S. patent application Ser. No. 17/537,407, filed Nov. 29, 2021 (U.S. Pat. No. 11,603,776), both of which claim priority from Provisional Application 63/231,155, filed Aug. 9, 2021, Provisional Application 63/170,370, filed Apr. 2, 2021, Provisional Application 63/165,632, filed Mar. 24, 2021, Provisional Application 63/155,261, filed Mar. 1, 2021, and Provisional Application 63/119,443, filed Nov. 30, 2020.

U.S. Provisional Patent Application No. 63/347,987 filed on Jun. 1, 2022,

U.S. Provisional Patent Application No. 63/378,355 filed on Oct. 4, 2022,

U.S. Provisional Patent Application No. 63/427,374 filed on Nov. 22, 2022,

U.S. Provisional Patent Application No. 63/434,919 filed on Dec. 22, 2022, and

U.S. Provisional Patent Application No. 63/459,540 filed on Apr. 14, 2023,

The contents of these priority applications are incorporated by reference in their entirety and for all purposes.

BACKGROUND

Technical Field

The present disclosure relates to thermal energy storage and utilization systems. More particularly, the present disclosure relates to an energy storage system that stores electrical energy in the form of thermal energy, which can be used for the continuous supply of hot air, carbon dioxide ($CO_2$), steam or other heated fluids, for various applications including the supply of heat for power generation. More specifically, the energy storage system provides higher-temperature heat to a solid oxide electrolysis system to maintain in an electrolysis operating temperature range during operation and nonoperation, thereby increasing the efficiency of the temperature control. New disclosure in this application (beyond what was disclosed in the parent application Ser. No. 17/668,333) appears primarily at paragraphs [173]-[231], and in FIGS. 7-16.

Related Art

I. Thermal Energy Systems

A. Variable Renewable Electricity

The combustion of fossil fuels has been used as a heat source in thermal electrical power generation to provide heat and steam for uses such as industrial process heat. The use of fossil fuels has various problems and disadvantages, however, including global warming and pollution. Accordingly, there is a need to switch from fossil fuels to clean and sustainable energy.

Variable renewable electricity (VRE) sources such as solar power and wind power have grown rapidly, as their costs have reduced as the world moves towards lower carbon emissions to mitigate climate change. But a major challenge relating to the use of VRE is, as its name suggests, its variability. The variable and intermittent nature of wind and solar power does not make these types of energy sources natural candidates to supply the continuous energy demands of electrical grids, industrial processes, etc. Accordingly, there is an unmet need for storing VRE to be able to efficiently and flexibly deliver energy at different times.

Moreover, the International Energy Agency has reported that the use of energy by industry comprises the largest portion of world energy use, and that three-quarters of industrial energy is used in the form of heat, rather than electricity. Thus, there is an unmet need for lower-cost energy storage systems and technologies that utilize VRE to provide industrial process energy, which may expand VRE and reduce fossil fuel combustion.

B. Storage of Energy as Heat

Thermal energy in industrial, commercial, and residential applications may be collected during one time period, stored in a storage device, and released for the intended use during another period. Examples include the storage of energy as sensible heat in tanks of liquid, including water, oils, and molten salts; sensible heat in solid media, including rock, sand, concrete and refractory materials; latent heat in the change of phase between gaseous, liquid, and solid phases of metals, waxes, salts and water; and thermochemical heat in reversible chemical reactions which may absorb and release heat across many repeated cycles; and media that may combine these effects, such as phase-changing materials embedded or integrated with materials which store energy as sensible heat. Thermal energy may be stored in bulk underground, in the form of temperature or phase changes of subsurface materials, in contained media such as liquids or particulate solids, or in self-supporting solid materials.

Electrical energy storage devices such as batteries typically transfer energy mediated by a flowing electrical current. Some thermal energy storage devices similarly transfer energy into and out of storage using a single heat transfer approach, such as convective transfer via a flowing liquid or gas heat transfer medium. Such devices use "refractory" materials, which are resistant to high temperatures, as their energy storage media. These materials may be arranged in configurations that allow the passage of air and combustion gases through large amounts of material.

Some thermal energy systems may, at their system boundary, absorb energy in one form, such as incoming solar radiation or incoming electric power, and deliver output energy in a different form, such as heat being carried by a liquid or gas. But thermal energy storage systems must also be able to deliver storage economically. For sensible heat storage, the range of temperatures across which the bulk storage material—the "storage medium"—can be heated and cooled is an important determinant of the amount of energy that can be stored per unit of material. Thermal storage materials are limited in their usable temperatures by factors such as freezing, melting, softening, boiling, or thermally driven decomposition or deterioration, including chemical and mechanical effects.

Further, different uses of thermal energy—different heating processes or industrial processes—require energy at different temperatures. Electrical energy storage devices, for example, can store and return electrical energy at any convenient voltage and efficiently convert that voltage up or down with active devices. On the other hand, the conversion of lower-temperature heat to higher temperatures is intrinsically costly and inefficient. Accordingly, a challenge in thermal energy storage devices is the cost-effective delivery of thermal energy with heat content and at a temperature sufficient to meet a given application.

Some thermal energy storage systems store heat in a liquid that flows from a "cold tank" through a heat exchange device to a "hot tank" during charging, and then from the hot tank to the cold tank during discharge, delivering relatively isothermal conditions at the system outlet during discharge. Systems and methods to maintain sufficient outlet temperature while using lower-cost solid media are needed.

Thermal energy storage systems generally have costs that are primarily related to their total energy storage capacity (how many MWh of energy are contained within the system) and to their energy transfer rates (the MW of instantaneous power flowing into or out of the energy storage unit at any given moment). Within an energy storage unit, energy is transferred from an inlet into storage media, and then transferred at another time from storage media to an outlet. The rate of heat transfer into and out of storage media is limited by factors including the heat conductivity and capacity of the media, the surface area across which heat is transferring, and the temperature difference across that surface area. High rates of charging are enabled by high temperature differences between the heat source and the storage medium, high surface areas, and storage media with high heat capacity and/or high thermal conductivity.

Each of these factors can add significant cost to an energy storage device. For example, larger heat exchange surfaces commonly require 1) larger volumes of heat transfer fluids, and 2) larger surface areas in heat exchangers, both of which are often costly. Higher temperature differences require heat sources operating at relatively higher temperatures, which may cause efficiency losses (e.g., radiation or convective cooling to the environment, or lower coefficient of performance in heat pumps) and cost increases (such as the selection and use of materials that are durable at higher temperatures). Media with higher thermal conductivity and heat capacity may also require selection of costly higher-performance materials or aggregates.

Another challenge of systems storing energy from VRE sources relates to rates of charging. A VRE source, on a given day, may provide only a small percentage of its energy during a brief period of the day, due to prevailing conditions. For an energy storage system that is coupled to a VRE source and that is designed to deliver continuous output, all the delivered energy must be absorbed during the period when incoming VRE is available. As a result, the peak charging rate may be some multiple of the discharge rates (e.g., 3-5×), for instance, in the case of a solar energy system, if the discharge period (overnight) is significantly longer than the charge period (during daylight). In this respect, the challenge of VRE storage is different from, for example, that of heat recuperation devices, which typically absorb and release heat at similar rates. For VRE storage systems, the design of units that can effectively charge at high rates is important and may be a higher determinant of total system cost than the discharge rate.

C. Thermal Energy Storage Problems and Disadvantages

The above-described approaches have various problems and disadvantages. Earlier systems do not take into account several critical phenomena in the design, construction, and operation of thermal energy storage systems, and thus does not facilitate such systems being built and efficiently operated. More specifically, current designs fail to address "thermal runaway" and element failure due to non-uniformities in thermal energy charging and discharging across an array of solid materials, including the design of charging, discharging, and unit controls to attain and restore balances in temperature across large arrays of thermal storage material.

Thermal energy storage systems with embedded radiative charging and convective discharging are in principle vulnerable to "thermal runaway" or "heat runaway" effects. The phenomenon may arise from imbalances, even small imbalances, in local heating by heating elements and in cooling by heat transfer fluid flow. The variations in heating rate and cooling rate, unless managed and mitigated, may lead to runaway temperatures that cause failures of heaters and/or deterioration of refractory materials. Overheating causes early failures of heating elements and shortened system life. In Stack, for example, the bricks closest to the heating wire are heated more than the bricks that are further away from the heating wire. As a result, the failure rate for the wire is likely to increase, reducing heater lifetime.

One effect that further exacerbates thermal runaway is the thermal expansion of air flowing in the air conduits. Hotter air expands more, causing a higher outlet velocity for a given inlet flow, and thus a higher hydraulic pressure drop across the conduit, which may contribute to a further reduction of flow and reduced cooling during discharge. Thus, in successive heating and cooling cycles, progressively less local cooling can occur, resulting in still greater local overheating.

The effective operation of heat supply from thermal energy storage relies upon continuous discharge, which is a particular challenge in systems that rely upon VRE sources to charge the system. Solutions are needed that can capture and store that VRE energy in an efficient manner and provide the stored energy as required to a variety of uses, including a range of industrial applications, reliably and without interruption.

Previous systems do not adequately address problems associated with VRE energy sources, including variations arising from challenging weather patterns such as storms, and longer-term supply variations arising from seasonal variations in VRE generation. In this regard, there is an unmet need in the art to provide efficient control of energy storage system charging and discharging in smart storage management. Current designs do not adequately provide storage management that considers a variety of factors, including medium-term through short-term weather forecasts, VRE generation forecasts, and time-varying demand for energy, which may be determined in whole or in part by considerations such as industrial process demand, grid energy demand, real-time electricity prices, wholesale electricity market capacity prices, utility resource adequacy value, and carbon intensity of displaced energy supplies. A system is needed that can provide stored energy to various demands that prioritizes by taking into account these factors, maximizing practical utility and economic efficiencies.

There are a variety of unmet needs relating generally to energy, and more specifically, to thermal energy. Generally, there is a need to switch from fossil fuels to clean and sustainable energy. There is also a need to store VRE to deliver energy at different times in order to help meet society's energy needs. There is also a need for lower-cost energy storage systems and technologies that allow VRE to provide energy for industrial processes, which may expand the use of VRE and thus reduce fossil fuel combustion.

There is also a need to maintain sufficient outlet temperature while using lower-cost solid media.

Still further, there is a need to design VRE units that can be rapidly charged at low cost, supply dispatchable, continuous energy as required by various industrial applications despite variations in VRE supply, and that facilitate efficient control of charging and discharging of the energy storage system.

II. Solid Oxide Electrolysis (SOE)

A. SOE Concepts

Solid oxide electrolysis is a type of high-temperature electrolysis that uses a solid oxide electrolyte to transport oxygen ions from the anode to the cathode, where they react with hydrogen ions to form water and produce high-purity hydrogen gas and oxygen gas. The process operates at temperatures between 600° C. and 1000° C., making it highly efficient and enabling the use of a wide range of energy sources, including renewable energy sources such as solar, wind, and geothermal power, as well as fossil fuels and nuclear power.

A solid oxide electrolysis cell (SOEC) includes a dense ceramic electrolyte, a porous anode, and a porous cathode. The electrolyte is typically made of zirconia, which is a ceramic material that conducts oxygen ions at high temperatures. The anode is usually made of nickel-zirconia cermet, which is a composite material that contains both ceramic and metallic components. The cathode is typically made of a porous ceramic material, such as lanthanum strontium manganite (LSM), that is coated with a layer of platinum or another noble metal to catalyze the reaction.

When an electric current is passed through the SOEC, oxygen ions are transported from the cathode to the anode through the solid electrolyte. At the cathode, the water molecules break up into oxygen and hydrogen ions. The hydrogen ions form molecular hydrogen ($H_2$) are transported across the electrolyte. The oxygen ions are drawn to the anode, where they form molecular oxygen ($O_2$). The cathode side stream exiting the SOEC contains unreacted steam and the molecular hydrogen. This stream is cooled such that water vapor condensed out to produce high-purity hydrogen gas.

The high-temperature operation of solid oxide electrolysis makes it well suited for a wide range of industrial applications, including hydrogen production where solid oxide electrolysis can be used to produce high-purity hydrogen gas for a variety of applications, including fuel cell vehicles, industrial processes, and energy storage. Additionally, solid oxide electrolysis can be used to capture carbon dioxide from industrial processes and convert it into useful chemicals such as syngas, methanol, and formic acid.

B. SOE Units

Conventional solid oxide electrolysis units (SOEUs) include one or more solid oxide electrolysis cells (SOECs) arranged in a stack. Each SOEC contains a dense ceramic electrolyte, a porous anode, and a porous cathode. The stack is typically enclosed in a stainless-steel container, which provides support and insulation for the cells and helps to maintain the high-temperature environment necessary for the process.

The SOEC stack can be configured in a number of different ways, depending on the specific application. For example, the stack can be operated in a co-electrolysis mode, where both water and carbon dioxide are fed to the anode side of the stack, enabling the production of syngas, which can be used as a feedstock for the chemical industry. Solid oxide electrolysis units work by splitting water vapor into hydrogen and oxygen gases using a stack of solid oxide electrolysis cells. The process operates at high temperatures and requires an external power input to drive the electrochemical reactions. SOEUs can be configured in a variety of ways to suit specific applications, such as co-electrolysis for the production of syngas or as a means of carbon capture and utilization.

C. Problems and Disadvantages of SOE

Solid oxide electrolyzers according to conventional designs receive an input of heated gas and water in the form of superheated steam. The gas is heated prior to input to the solid oxide electrolyzer by an electric resistive heater, a fuel-fired heater, or the like. The use of an electric resistive heater or fuel-fired heater for this purpose may have various problems and disadvantages. For example, fuel heaters may consume fossil fuels such as natural gas, which is expensive and causes pollution. Hydrogen-fired heaters, while non-polluting, may reduce the yield of hydrogen produced for its primary use, since it consumes a portion of the electrolysis hydrogen yield, hence lowering overall system efficiency. Electric heaters powered directly by VRE sources cause problems associated with changing temperatures, such as decreased efficiency, thermal stresses and fatigue at component interfaces leading to premature device failure, as well as limited operating periods.

There are several types of fuel cells that take hydrogen or a mix of gases at an elevated temperature and make electric power, such as molten carbonate electrolyzer fuel cells, and solid oxide fuel cells. Such fuel cells are essentially the same as electrolyzers operating in a reverse manner. However, solid oxide fuel cells have problems and disadvantages in electrolyzer mode because the oxidation reaction causes localized heating and issues with cell life, as mentioned above. Solid oxide fuel cells require their inlet reactants and the fuel cell assembly to be maintained at particular temperatures. The operation of fuel cells delivers energy partly in the form of electrical energy and partly as heat, and solid oxide fuel cells typically use a recuperator (e.g., high-temperature heat exchanger) to make use of a portion of the heat generated by the fuel cell. However, a substantial portion of the heat generated is typically not used (e.g. exhausted), which results in inefficiencies.

SUMMARY

The example implementations advance the art of thermal energy storage and enable the practical construction and operation of high-temperature thermal energy storage systems which are charged by VRE, store energy in solid media, and deliver high-temperature heat.

I. Thermal Energy Storage System

This Section I of the Summary relates to the disclosure as it appears in U.S. patent application Ser. No. 17/668,333, of which this application is a continuation-in-part.

Aspects of the example implementations relate to a system for thermal energy storage, including an input, (e.g., electricity from a variable renewable electricity (VRE) source), a container having sides, a roof and a lower platform, a plurality of vertically oriented thermal storage units (TSUs), inside the container, the TSUs each including a plurality of stacks of bricks and heaters attached thereto, each of the heaters being connected to the input electricity via switching circuitry, an insulative layer interposed between the plurality of TSUs, the roof and at least one of the sides, a duct formed between the insulative layer and a boundary formed by the sides, an inner side of the roof and the lower platform of the container, a blower that blows relatively cooler fluid such as air or another gas (e.g. $CO_2$) along the flow path, an output (e.g., hot air at prescribed temperature to industrial application), a controller that controls and co-manages the energy received from the input and the hot air generated at the output based on a forecast associated with an ambient condition (e.g., season or weather) or a condition (e.g., output temperature, energy curve, etc.). The exterior and interior shapes of the container may be rectangular, cylindrical (in which case "sides" refers to the cylinder walls), or other shapes suitable to individual applications.

The terms air, fluid and gas are used interchangeably herein to refer to a fluid heat transfer medium of any suitable type, including various types of gases (air, $CO_2$, oxygen and other gases, alone or in combination), and when one is mentioned, it should be understood that the others can equally well be used. Thus, for example, "air" can be any suitable fluid or gas or combinations of fluids or gases.

Thermal energy storage (TES) systems according to the present designs can advantageously be integrated with or coupled to steam generators, including heat recovery steam generators (HRSGs) and once-through steam generators (OTSGs). The terms "steam generator", "HRSG", and "OTSG" are used interchangeably herein to refer to a heat exchanger that transfers heat from a first fluid into a second fluid, where the first fluid may be air circulating from the TSU and the second fluid may be water (being heated and/or boiled), oil, salt, air, $CO_2$, or another fluid. In such implementations, the heated first fluid is discharged from a TES unit and provided as input to the steam generator, which extracts heat from the discharged fluid to heat a second fluid, including producing steam, which heated second fluid may be used for any of a variety of purposes (e.g., to drive a turbine to produce shaft work or electricity). After passing through a turbine, the second fluid still contains significant heat energy, which can be used for other processes. Thus, the TES system may drive a cogeneration process. The first fluid, upon exiting the steam generator, can be fed back as input to the TES, thus capturing waste heat to effectively preheat the input fluid. Waste heat from another process may also preheat input fluid to the TES.

According to another aspect, a dynamic insulation system include a container having sides, a roof and a lower platform, a plurality of vertically oriented thermal storage units (TSUs) spaced apart from one another, an insulative layer interposed between the plurality of TSUs, the roof and at least one of the sides and floor, a duct formed between the insulative layer and a boundary formed by the sides, an inner side of the roof and the lower platform of the container, and a blower that blows unheated air along the air flow path, upward from the platform to a highest portion of the upper portion, such that the air path is formed from the highest portion of the roof to the platform, and is heated by the plurality of TSUs, and output from the TES apparatus. The unheated air along the flow path forms an insulated layer and is preheated by absorbing heat from the insulator.

II. SOE System and Applications

This Section II of the Summary relates to the newly added disclosure of this continuation-in-part application.

An inventive system and process includes a thermal energy storage (TES) system that captures and stores intermittent electrical energy by converting it to high-temperature heat stored in a medium, and discharges high temperature heat externally to a solid oxide electrolysis system. Additional aspects may include a solid-oxide electrolysis application that includes the TES unit coupled to an electrolysis system. A high-temperature solid oxide electrolyzer converts water into hydrogen and oxygen in a hydrogen generation unit (e.g., for use in a fuel cell). The electrolyzer includes an anode, a cathode and a solid ceramic (oxide) electrolyte, and uses heat (e.g., output of the thermal energy storage (TES)) to decrease the electrical energy needed to be used in the electrolysis process. The heat that flows from the TES stack is received at the solid oxide electrolysis cells (SOEC) as hot air and/or steam, at a rate that is determined by a controller (manual and/or automatic) that sets the flow rate to maintain the SOEC at a desired temperature (e.g., 860° C.). The electricity source may be any of a variety of sources, such as a photovoltaic (PV) cell, an electricity output application associated with the TES, or stored electricity at the SOEC itself. The hydrogen generated by the SOEC by may be used in a wide variety of known applications, including in a hydrogen filling station (e.g., electric vehicle charging station), or other industrial application (e.g., renewable diesel refinery), and the highly oxygenated by-product may also be used for industrial or commercial applications, including power generation. The lower-temperature waste heat released by the SOEC (e.g., at 650° C.) can optionally be directed and optionally supplemented by higher-temperature heat by the TES, and coupled into a steam generator for the use of such heat or used for another industrial process. As an alternative to electrolysis of water to hydrogen, electrolysis of other gases may be performed, such as carbon dioxide to carbon monoxide, either separately or in combination with electrolysis of water.

According to an additional aspect, a DC/DC power conversion system includes an array of galvanically isolated individual converters, each receiving an input from a photovoltaic (PV) array at a primary side, a secondary side of each of the individual converters coupled in series for higher output voltage, and in parallel for higher output current, a combiner coupled to the array and other arrays, and a junction box including a plurality of high voltage switches coupled, by a variable DC line to the combiner, having an output to a thermal storage unit (TSU) or a DC charging system.

According to another aspect, a dynamic insulation system include a container having sides, a roof and a lower platform, a plurality of vertically oriented thermal storage units (TSUs) spaced apart from one another, an insulative layer interposed between the plurality of TSUs, the roof and at least one of the sides and floor, a duct formed between the insulative layer and a boundary formed by the sides, an inner side of the roof and the lower platform of the container, and a blower that blows unheated air along the air flow path, upward from the platform to a highest portion of the upper portion, such that the air path is formed from the highest portion of the roof to the platform, and is heated by the plurality of TSUs, and output from the TES apparatus. The unheated air along the flow path forms an insulated layer and is preheated by absorbing heat from the insulator.

Further aspects include applications associated with a carbon dioxide separator. The separation of carbon dioxide from other gases including ambient air and combustion exhaust gases is often beneficially accomplished by processes that use large amounts of heat to regenerate a chemical that absorbs or reacts with carbon dioxide. Such processes include but are not limited to processes that use a carbonation/calcination reaction cycle, for example using calcium or potassium reactions, or absorption/adsorption/release cycles, for example using liquid or solid materials including zeolites or amines. The provision of heat to serve these capture processes from VRE may be beneficial in further reducing the emissions and costs such of carbon capture processes. For example, a combustion exhaust gas input from an industrial source, or from a direct air capture (DAC) unit, may require heat to drive a solvent "reboiler," a steam generator or a calcium carbonate calciner, to raise the temperature of a reactant that causes the release separation of carbon dioxide. The combustion exhaust gas is received via a heat exchanger and a stripper tower. A carbon dioxide compressor receives power generated by a steam turbine connected to the TES system and compresses the selectively separated carbon dioxide. Compressed carbon dioxide may be input to a solid oxide electrolysis cell (SOEC), industrial processes, or geologic sequestration.

BRIEF DESCRIPTION OF DRAWINGS

The accompanying drawings are included to provide a further understanding of the present disclosure and are incorporated in and constitute a part of this specification. The drawings illustrate example implementations of the present disclosure and, together with the description, serve to explain the principles of the present disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 1 illustrates a schematic diagram of the thermal energy storage system architecture according to the example implementations.

FIG. 2 illustrates a schematic diagram of a system according to the example implementations.

FIG. 3 illustrates a schematic diagram of a storage-fired once-through steam generator (OTSG) according to the example implementations.

FIG. 4 illustrates an example view of a system being used as an integrated cogeneration system according to the example implementations.

FIG. 5 illustrates dynamic insulation according to the example implementations.

FIG. 6 provides an isometric view of the thermal storage unit with multiple vents closures open, according to some implementations.

FIG. 7 shows an integration 700 of a solid oxide electrolyzer whose operation is maintained by heat stored in a thermal energy storage R6, and whose operation may be advantageously efficient by being maintained at beneficial temperature, with the thermal energy storage providing thermal energy that is absorbed in an endothermic electrolysis reaction.

FIG. 8 provides an illustration 800 of the solid oxide unit as a fuel cell 801 and as an electrolyzer 803.

FIG. 9 illustrates the electrolysis mode 900 of the example implementation.

FIG. 10 illustrates a fuel cell mode 1000 according to an example implementation. The thermal energy storage system 1001 provides air or oxygen as shown at 1002, such as explained above with respect to an electrolysis mode.

FIG. 11 illustrates an example system 1100 used to power the production of hydrogen and/or hydrocarbon fuels by delivering both heat and power to drive a high-temperature solid-oxide electrolyzer 1102.

FIG. 12 illustrates a reversible solid oxide electrolysis system 1200 according to an example implementation.

FIG. 13 illustrates an example process of a backpressure turbine 1303 with a thermal storage system 1301 and solid oxide unit 1302.

FIG. 14 illustrates an alternative heat exchange process.

FIG. 15 illustrates an example process integration with a non-condensing steam turbine.

FIG. 16 illustrates an example process integration with a condensing steam turbine.

DETAILED DESCRIPTION

Aspects of the example implementations, as disclosed herein, relate to systems, methods, materials, compositions, articles, and improvements for a thermal energy storage system for power generation for various industrial applications.

I. Thermal Energy Storage System

This Section I of the Summary relates to the disclosure as it appears in U.S. Pat. No. 11,603,776, of which this application is a continuation-in-part.

U.S. Pat. No. 11,603,776 relates to the field of thermal energy storage and utilization systems and addresses the above-noted problems. A thermal energy storage system is disclosed that stores electrical energy in the form of thermal energy in a charging mode and delivers the stored energy in a discharging mode. The discharging can occur at the same time as charging; i.e., the system may be heated by electrical energy at the same time that it is providing a flow of convectively heated air. The discharged energy is in the form of hot air, hot fluids in general, steam, heated $CO_2$, heated supercritical $CO_2$, and/or electrical power generation, and can be supplied to various applications, including industrial uses. The disclosed implementations include efficiently constructed, long-service-life thermal energy storage systems having materials, fabrication, physical shape, and other properties that mitigate damage and deterioration from repeated temperature cycling.

Optionally, heating of the elements of the storage unit may be optimized, so as to store a maximum amount of heat during the charging cycle. Alternatively, heating of elements may be optimized to maximize heating element life, by means including minimizing time at particular heater temperatures, and/or by adjusting peak charging rates and/or peak heating element temperatures. Still other alternatives may balance these competing interests. Specific operations to achieve these optimizations are discussed further below.

Example implementations employ efficient yet economical thermal insulation. Specifically, a dynamic insulation design may be used either by itself or in combination with static primary thermal insulation. The disclosed dynamic insulation techniques provide a controlled flow of air inside the system to restrict dissipation of thermal energy to the outside environment, which results in higher energy storage efficiency.

System Overview as Disclosed in U.S. Pat. No. 11,603,776

Figure 1:
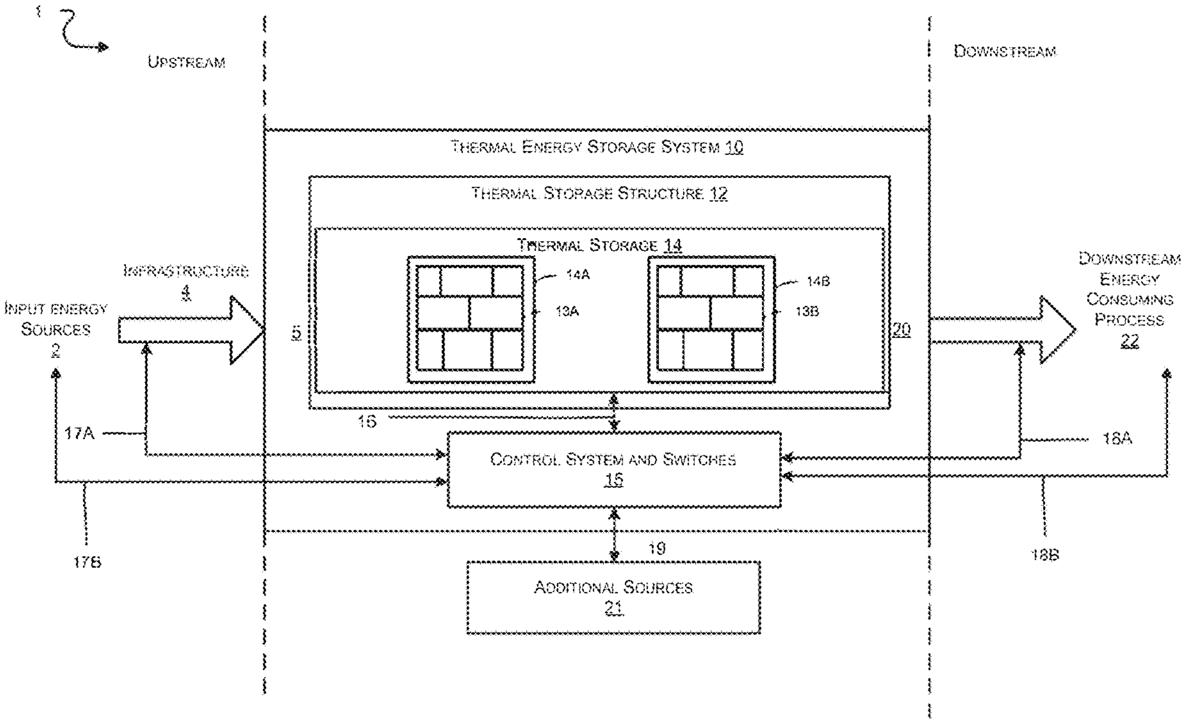
FIGS. 1 to 12 appear in parent U.S. patent application Ser. No. 17/668,333.

FIG. 1 is a block diagram of a system 1 that includes a thermal energy storage system 10, according to one implementation. In the implementation shown, thermal energy storage system 10 is coupled between an input energy source 2 and a downstream energy-consuming process 22. For ease of reference, components on the input and output sides of system 1 may be described as being "upstream" and "downstream" relative to system 10.

In the depicted implementation, thermal energy storage system 10 is coupled to input energy source 2, which may include one or more sources of electrical energy. Source 2 may be renewable, such as photovoltaic (PV) cell or solar, wind, geothermal, etc. Source 2 may also be another source, such as nuclear, natural gas, coal, biomass, or other. Source 2 may also include a combination of renewable and other sources. In this implementation, source 2 is provided to thermal energy storage system 10 via infrastructure 4, which may include one or more electrical conductors, commutation equipment, etc. In some implementations, infrastructure 4 may include circuitry configured to transport electricity over long distances; alternatively, in implementations in which input energy source 2 is located in the immediate vicinity of thermal energy storage system 10, infrastructure 4 may be greatly simplified. Ultimately, infrastructure 4 delivers energy to input 5 of thermal energy storage system 10 in the form of electricity.

The electrical energy delivered by infrastructure 4 is input to thermal storage structure 12 within system 10 through switchgear, protective apparatus and active switches controlled by control system 15. Thermal storage structure 12 includes thermal storage 14, which in turn includes one more assemblages (e.g., 14A, 14B) of solid storage media (e.g., 13A, 13B) configured to store thermal energy. These assemblages are variously referred to throughout this disclosure as "stacks," "arrays," and the like. These terms are intended to be generic and not connote any particular orientation in space, etc. In general, an array can include any material that is suitable for storing thermal energy and can be oriented in any given orientation (e.g., vertically, horizontally, etc.). Likewise, the solid storage media within the assemblages may variously be referred to as thermal storage blocks, bricks, etc. In implementations with multiple arrays, the arrays may be thermally isolated from one another and are separately controllable, meaning that they are capable of being charged or discharged independently from one another. This arrangement provides maximum flexibility, permitting multiple arrays to be charged at the same time, multiple arrays to be charged at different times or at different rates, one array to be discharged while the other array remains charged, etc.

Thermal storage 14 is configured to receive electrical energy as an input. The received electrical energy may be provided to thermal storage 14 via resistive heating elements that are heated by electrical energy and emit heat, primarily as electromagnetic radiation in the infrared and visible spectrum. During a charging mode of thermal storage 14, the electrical energy is released as heat from the resistive heating elements, transferred principally by radiation emitted both by the heating elements and by hotter solid storage media, and absorbed and stored in solid media within storage 14. When an array within thermal storage 14 is in a discharging mode, the heat is discharged from thermal storage structure 12 as output 20. As will be described, output 20 may take various forms, including a fluid such as hot air. (References to the use of "air" and "gases" within the present disclosure may be understood to refer more generally to a "fluid.") The hot air may be provided directly to a downstream energy consuming process 22 (e.g., an industrial application), or it may be passed through a steam generator (not shown) to generate steam for process 22.

Additionally, thermal energy storage system 10 includes a control system 15. Control system 15, in various implementations, is configured to control thermal storage 14, including through setting operational parameters (e.g., discharge rate), controlling fluid flows, controlling the actuation of electromechanical or semiconductor electrical switching devices, etc. The interface 16 between control system 15 and thermal storage structure 12 (and, in particular thermal storage 14) is indicated in FIG. 1. Control system 15 may be implemented as a combination of hardware and software in various embodiments.

Control system 15 may also interface with various entities outside thermal energy storage system 10. For example, control system 15 may communicate with input energy source 2 via an input communication interface 17B. For example, interface 17B may allow control system 15 to receive information relating to energy generation conditions at input energy source 2. In the implementation in which input energy source 2 is a photovoltaic array, this information may include, for example, current weather conditions at the site of source 2, as well as other information available to any upstream control systems, sensors, etc. Interface 17B may also be used to send information to components or equipment associated with source 2.

Similarly, control system 15 may communicate with infrastructure 4 via an infrastructure communication interface 17A. In a manner similar to that explained above, interface 17A may be used to provide infrastructure information to control system 15, such as current or forecast VRE availability, grid demand, infrastructure conditions, maintenance, emergency information, etc. Conversely, communication interface 17A may also be used by control system 15 to send information to components or equipment within infrastructure 4. For example, the information may include control signals transmitted from the control system 15, that controls valves or other structures in the thermal storage structure 12 to move between an open position and a closed position, or to control electrical or electronic switches connected to heaters in the thermal storage 14. Control system 15 uses information from communication interface 17A in determining control actions, and control actions may adjust closing or firing of switches in a manner to optimize the use of currently available electric power and maintain the voltage and current flows within infrastructure 4 within chosen limits.

Control system 15 may also communicate downstream using interfaces 18A and/or 18B. Interface 18A may be used to communicate information to any output transmission structure (e.g., a steam transmission line), while interface 18B may be used to communicate with downstream process 22. For example, information provided over interfaces 18A and 18B may include temperature, industrial application demand, current or future expected conditions of the output or industrial applications, etc. Control system 15 may control the input, heat storage, and output of thermal storage structure based on a variety of information. As with interfaces 17A and 17B, communication over interfaces 18A and 18B may be bidirectional—for example, system 10 may indicate available capacity to downstream process 22. Still further, control system 15 may also communicate with any other relevant data sources (indicated by reference numeral 21 in FIG. 1) via additional communication interface 19. Additional data sources 21 are broadly intended to encompass any other data source not maintained by either the upstream or downstream sites. For example, sources 21 might include third-party forecast information, data stored in a cloud data system, etc.

Thermal energy storage system 10 is configured to efficiently store thermal energy generated from input energy source 2, and deliver output energy in various forms to a downstream process 22. In various implementations, input energy source 2 may be from renewable energy and downstream process 22 may be an industrial application that requires an input such as steam or hot air. Through various techniques, including arrays of thermal storage blocks that use radiant heat transfer to efficiently storage energy and a lead-lag discharge paradigm that leads to desirable thermal properties such as the reduction of temperature nonuniformities within thermal storage 14, system 10 may advantageously provide a continuous (or near-continuous) flow of output energy based on an intermittently available source. The use of such a system has the potential to reduce the reliance of industrial applications on fossil fuels.

Figure 2:
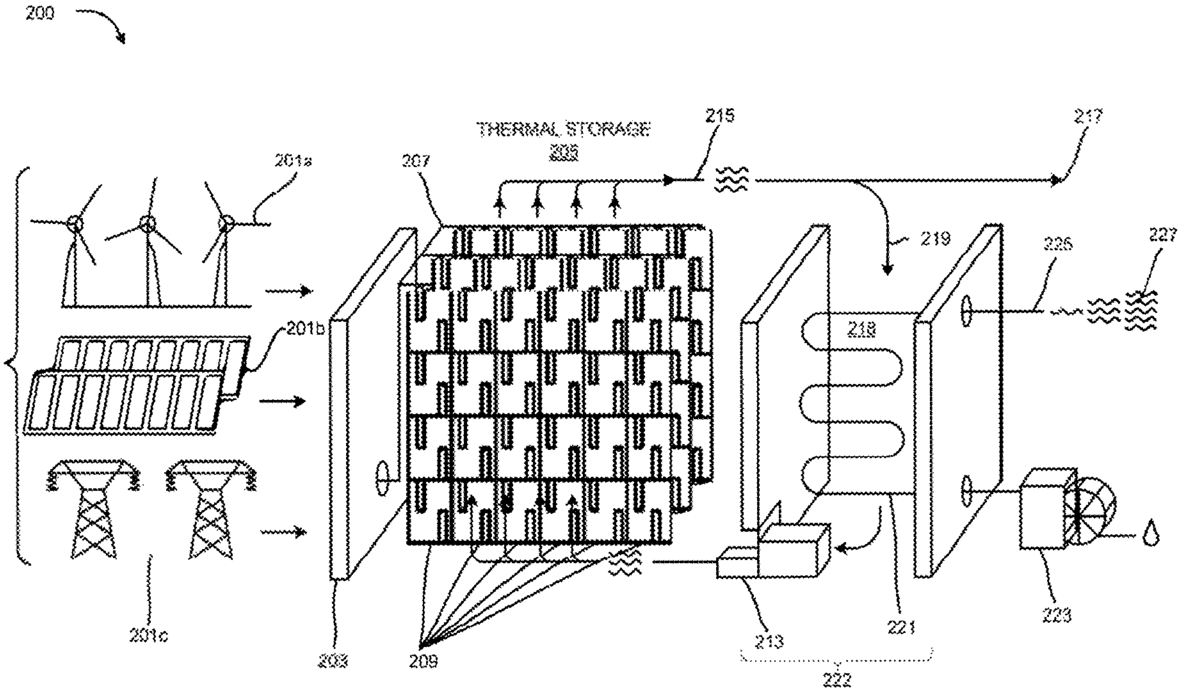

FIG. 2 provides a schematic view of one implementation of a system 200 for storing thermal energy, and further illustrates components and concepts just described with respect to FIG. 1. As shown, one or more energy sources 201 provide input electricity. For example, and as noted above, renewable sources such as wind energy from wind turbines 201*a*, solar energy from photovoltaic cells 201*b*, or other energy sources may provide electricity that is variable in availability or price because the conditions for generating the electricity are varied. For example, in the case of wind turbine 201*a*, the strength, duration and variance of the wind, as well as other weather conditions causes the amount of energy that is produced to vary over time. Similarly, the amount of energy generated by photovoltaic cells 201*b* also varies over time, depending on factors such as time of day, length of day due to the time of year, level of cloud cover due to weather conditions, temperature, other ambient conditions, etc. Further, the input electricity may be received from the existing power grid 201*c*, which may in turn vary based on factors such as pricing, customer demand, maintenance, and emergency requirements.

The electricity generated by source 201 is provided to the thermal storage structure within the thermal energy storage system. In FIG. 2, the passage of electricity into the thermal storage structure is represented by wall 203. The input electrical energy is converted to heat within thermal storage 205 via resistive heating elements 207 controlled by switches (not shown). Heating elements 207 provide heat to solid storage media 209. Thermal storage components (sometimes called "bricks") within thermal storage 205 are arranged to form embedded radiative chambers. FIG. 2 illustrates that multiple thermal storage arrays 209 may be present within system 200. These arrays may be thermally isolated from one another and may be separately controllable. FIG. 2 is merely intended to provide a conceptual representation of how thermal storage 205 might be implemented—one such implementation might, for example, include only two arrays, or might include six arrays, or ten arrays, or more.

In the depicted implementation, a blower 213 drives air or other fluid to thermal storage 205 such that the air is eventually received at a lower portion of each of the arrays 209. The air flows upward through the channels and chambers formed by bricks in each of the arrays 209, with flow controlled by louvers. By the release of heat energy from the resistive heating elements 207, heat is radiatively transferred to arrays 209 of bricks during a charging mode. Relatively hotter brick surfaces reradiate absorbed energy (which may be referred to as a radiative "echo"), and participate in heating cooler surfaces. During a discharging mode, the heat stored in arrays 209 is output, as indicated at 215.

Once the heat has been output in the form of a fluid such as hot air, the fluid may be provided for one or more downstream applications. For example, hot air may be used directly in an industrial process that is configured to receive the hot air, as shown at 217. Further, hot air may be provided as a stream 219 to a heat exchanger 218 of a steam generator 222, and thereby heats a pressurized fluid such as air, water, $CO_2$ or other gas. In the example shown, as the hot air stream 219 passes over a line 221 that provides the water from the pump 223 as an input, the water is heated and steam is generated as an output 225, which may be provided to an industrial application as shown at 227.

Figure 3:
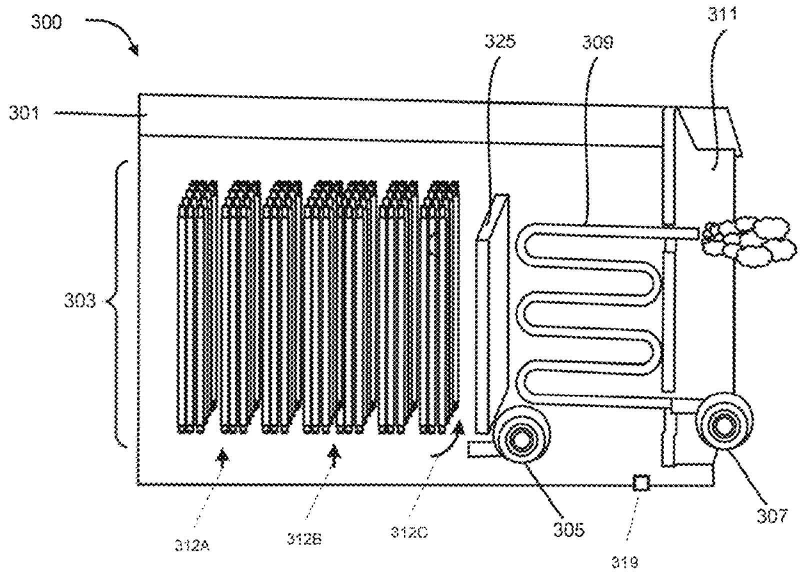

A thermal storage structure such as that depicted in FIGS. 1-2 may also include output equipment configured to produce steam for use in a downstream application. FIG. 3, for example, depicts a block diagram of an implementation of a thermal storage structure 300 that includes a storage-fired once-through steam generator (OTSG). An OTSG is a type of heat recovery stream generator (HRSG), which is a heat exchanger that accepts hot air from a storage unit, returns cooler air, and heats an external process fluid. The depicted OTSG is configured to use thermal energy stored in structure 300 to generate steam at output 311.

As has been described, thermal storage structure 300 includes outer structure 301 such walls, a roof, as well as thermal storage 303 in a first section of the structure. The OTSG is located in a second section of the structure, which is separated from the first section by thermal barrier 325. During a charging mode, thermal energy is stored in thermal storage 303. During a discharging mode, the thermal energy stored in thermal storage 303 receives a fluid flow (e.g., air) by way of a blower 305. These fluid flows may be generated from fluid entering structure 300 via an inlet valve 319, and include a first fluid flow 312A (which may be directed to a first stack within thermal storage 303) and a second fluid flow 312B (which may be directed to a second stack within thermal storage 303).

As the air or other fluid directed by blower 305 flows through the thermal storage 303 from the lower portion to the upper portion, it is heated and is eventually output at the upper portion of thermal storage 303. The heated air, which may be mixed at some times with a bypass fluid flow 312C that has not passed through thermal storage 302, is passed over a conduit 309 through which flows water or another fluid pumped by the water pump 307. As the hot air heats up the water in the conduit, steam is generated at 311. The cooled air that has crossed the conduit (and transferred heat to the water flowing through it) is then fed back into the brick heat storage 303 by blower 305. As explained below, the control system can be configured to control attributes of the steam, including steam quality, or fraction of the steam in the vapor phase, and flow rate.

As shown in FIG. 3, an OTSG does not include a recirculating drum boiler. Properties of steam produced by an OTSG are generally more difficult to control than those of steam produced by a more traditional HRSG with a drum, or reservoir. The steam drum in such an HRSG acts as a phase separator for the steam being produced in one or more heated tubes recirculating the water; water collects at the bottom of the reservoir while the steam rises to the top. Saturated steam (having a steam quality of 100%) can be collected from the top of the drum and can be run through an additional heated tube structure to superheat it and further assure high steam quality. Drum-type HRSGs are widely used for power plants and other applications in which the water circulating through the steam generator is highly purified and stays clean in a closed system. For applications in which the water has significant mineral content, however, mineral deposits form in the drum and tubes and tend to clog the system, making a recirculating drum design infeasible.

For applications using water with a higher mineral content, an OTSG may be a better option. One such application is oil extraction, in which feed water for a steam generator may be reclaimed from a water/oil mixture produced by a well. Even after filtering and softening, such water may have condensed solid concentrations on the order of 10,000 ppm or higher. The lack of recirculation in an OTSG enables operation in a mode to reduce mineral deposit formation; however, an OTSG needs to be operated carefully in some implementations to avoid mineral deposits in the OTSG water conduit. For example, having some fraction of water droplets present in the steam as it travels through the OTSG conduit may be required to prevent mineral deposits by retaining the minerals in solution in the water droplets. This consideration suggests that the steam quality (vapor fraction) of steam within the conduit must be maintained below a specified level. On the other hand, a high steam quality at the output of the OTSG may be important for the process employing the steam. Therefore, it is advantageous for a steam generator powered by VRE through TES to maintain close tolerances on outlet steam quality. There is a sensitive interplay among variables such as input water temperature, input water flow rate and heat input, which must be managed to achieve a specified steam quality of output steam while avoiding damage to the OTSG.

Implementations of the thermal energy storage system disclosed herein provide a controlled and specified source of heat to an OTSG. The controlled temperature and flow rate available from the thermal energy storage system allows effective feed-forward and feedback control of the steam quality of the OTSG output. In one implementation, feed-forward control includes using a target steam delivery rate and steam quality value, along with measured water temperature at the input to the water conduit of the OTSG, to determine a heat delivery rate required by the thermal energy storage system for achieving the target values. In this implementation, the control system can provide a control signal to command the thermal storage structure to deliver the flowing gas across the OTSG at the determined rate. In one implementation, a thermal energy storage system integrated with an OTSG includes instrumentation for measurement of the input water temperature to the OTSG.

In one implementation, feedback control includes measuring a steam quality value for the steam produced at the outlet of the OTSG, and a controller using that value to adjust the operation of the system to return the steam quality to a desired value. Obtaining the outlet steam quality value may include separating the steam into its liquid and vapor phases and independently monitoring the heat of the phases to determine the vapor phase fraction. Alternatively, obtaining the outlet steam quality value may include measuring the pressure and velocity of the outlet steam flow and the pressure and velocity of the inlet water flow, and using the relationship between values to calculate an approximation of the steam quality. Based on the steam quality value, a flow rate of the outlet fluid delivered by the thermal storage to the OTSG may be adjusted to achieve or maintain the target steam quality. In one implementation, the flow rate of the outlet fluid is adjusted by providing a feedback signal to a controllable element of the thermal storage system. The controllable element may be an element used in moving fluid through the storage medium, such as a blower or other fluid moving device, a louver, or a valve.

The steam quality measurement of the outlet taken in real time may be used as feedback by the control system to determine the desired rate of heat delivery to the OTSG. To accomplish this, an implementation of a thermal energy storage system integrated with an OTSG may include instruments to measure inlet water velocity and outlet steam flow velocity, and, optionally, a separator along with instruments for providing separate measurements of the liquid and vapor heat values. In some implementations, the tubing in an OTSG is arranged such that the tubing closest to the water inlet is positioned in the lowest temperature portion of the airflow, and that the tubing closest to the steam exit is positioned in the highest temperature portion of the airflow. In some implementations of the present innovations, the OTSG may instead be configured such that the highest steam quality tubes (closest to the steam outlet) are positioned at some point midway through the tubing arrangement, so as to enable higher inlet fluid temperatures from the TSU to the OTSG while mitigating scale formation within the tubes and overheating of the tubes, while maintaining proper steam quality. The specified flow parameters of the heated fluid produced by thermal energy storage systems as disclosed herein may in some implementations allow precise modeling of heat transfer as a function of position along the conduit. Such modeling may allow specific design of conduit geometries to achieve a specified steam quality profile along the conduit.

Figure 4:
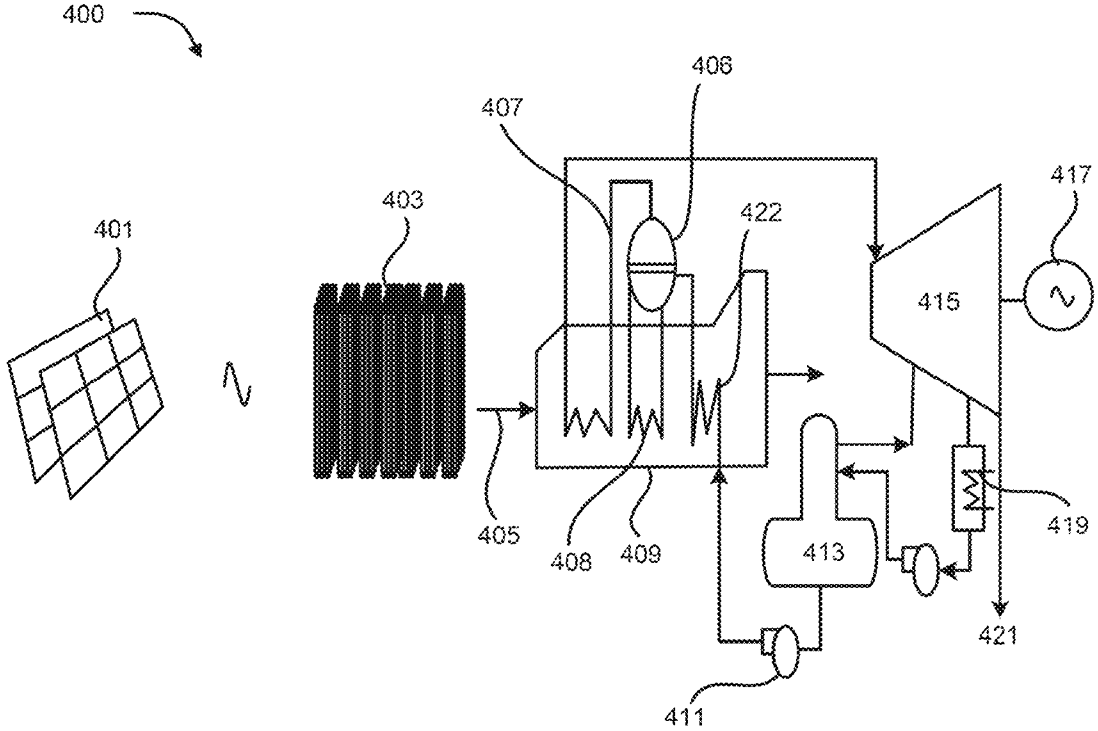
Figure 5:
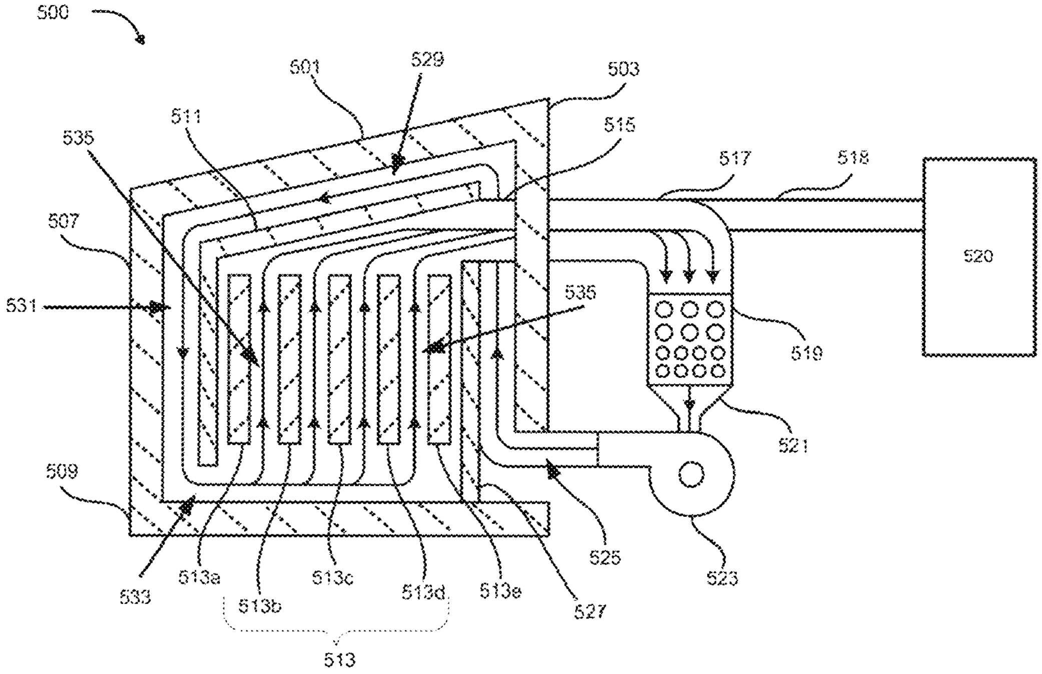

As shown in FIG. 4, the output of the thermal energy storage system may be used for an integrated cogeneration system 400. As previously explained, an energy source 401 provides electrical energy that is stored as heat in the heat storage 403 of the TSU. During discharge, the heated air is output at 405. As shown in FIG. 5, lines containing a fluid, in this case water, are pumped into drum 406 of an HRSG 409 via a preheating section of tubing 422. In this implementation, HRSG 409 is a recirculating drum type steam generator, including a drum or boiler 406 and a recirculating evaporator section 408. The output steam passes through line 407 to a superheater coil, and is then provided to a turbine at 415, which generates electricity at 417. As an output, the remaining steam 421 may be expelled to be used as a heat source for a process or condensed at 419 and optionally passed through to a deaeration unit 413 and delivered to pump 411 in order to perform subsequent steam generation.

Certain industrial applications may be particularly well-suited for cogeneration. For example, some applications use higher temperature heat in a first system, such as to convert the heat to mechanical motion as in the case of a turbine, and lower-temperature heat discharged by the first system for a second purpose, in a cascading manner; or an inverse temperature cascade may be employed. One example involves a steam generator that makes high-pressure steam to drive a steam turbine that extracts energy from the steam, and low-pressure steam that is used in a process, such as an ethanol refinery, to drive distillation and electric power to run pumps. Still another example involves a thermal energy storage system in which hot gas is output to a turbine, and the heat of the turbine outlet gas is used to preheat inlet water to a boiler for processing heat in another steam generator (e.g., for use in an oilfield industrial application). In one application, cogeneration involves the use of hot gas at e.g., 840° C. to power or co-power hydrogen electrolysis, and the lower temperature output gas of the hydrogen electrolyzer, which may be at about 640° C., is delivered alone or in combination with higher-temperature heat from a TSU to a steam generator or a turbine for a second use. In another application, cogeneration involves the supply of heated gas at a first temperature e.g., 640° C. to enable the operation of a fuel cell, and the waste heat from the fuel cell which may be above 800° C. is delivered to a steam generator or a turbine for a second use, either alone or in combination with other heat supplied from a TSU.

A cogeneration system may include a heat exchange apparatus that receives the discharged output of the thermal storage unit and generates steam. Alternately, the system may heat another fluid such as supercritical carbon dioxide by circulating high-temperature air from the system through a series of pipes carrying a fluid, such as water or $CO_2$, (which transfers heat from the high-temperature air to the pipes and the fluid), and then recirculating the cooled air back as an input to the thermal storage structure. This heat exchange apparatus is an HRSG, and in one implementation is integrated into a section of the housing that is separated from the thermal storage.

The HRSG may be physically contained within the thermal storage structure or may be packaged in a separate structure with ducts conveying air to and from the HRSG. The HRSG can include a conduit at least partially disposed within the second section of the housing. In one implementation, the conduit can be made of thermally conductive material and be arranged so that fluid flows in a "once-through" configuration in a sequence of tubes, entering as lower-temperature fluid and exiting as higher temperature, possibly partially evaporated, two-phase flow. As noted above, once-through flow is beneficial, for example, in processing feedwater with substantial dissolved mineral contaminants to prevent accumulation and precipitation within the conduits.

Figure 6:
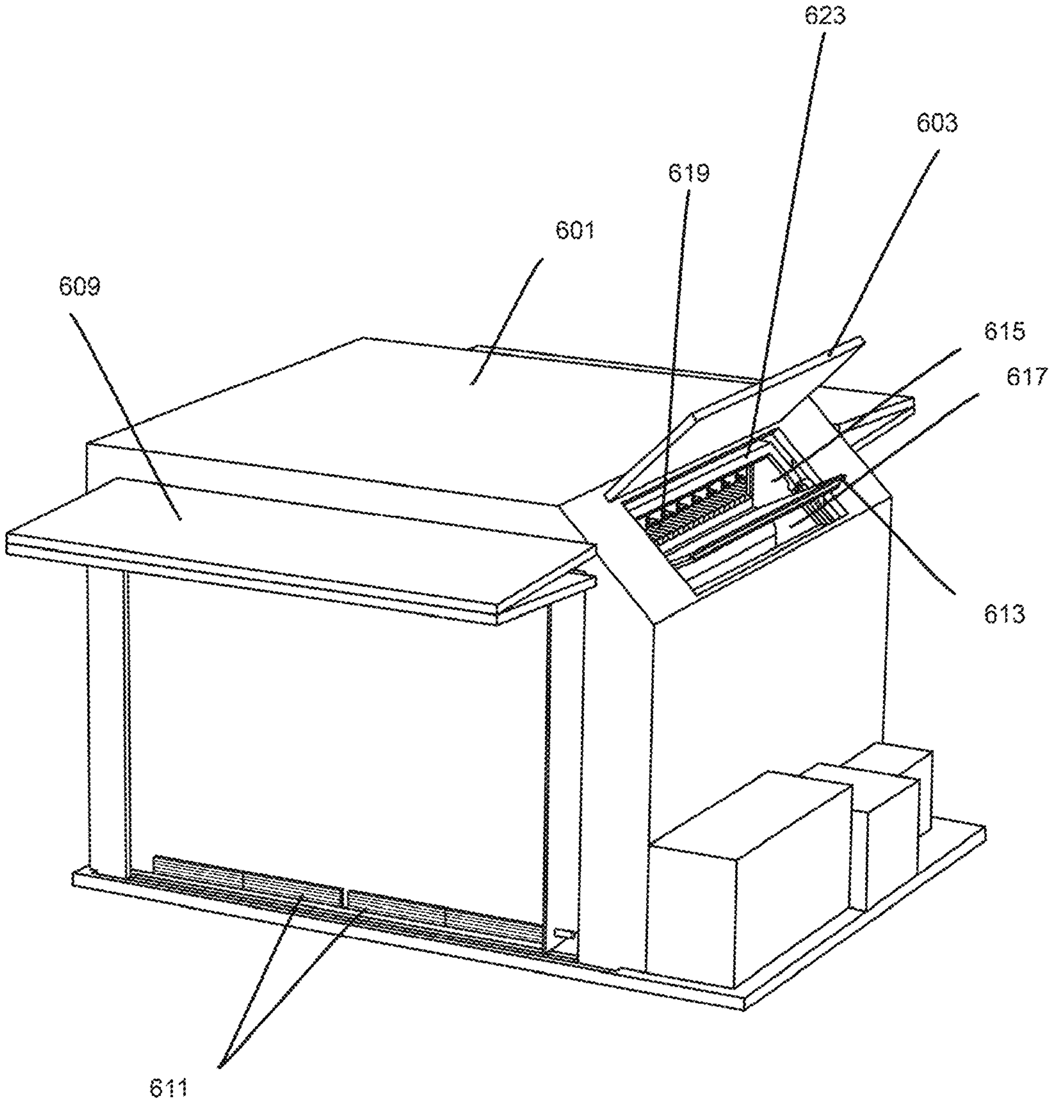

In an OTSG implementation, a first end of the conduit can be fluidically coupled to a water source. The system may provide for inflow of the fluids from the water source into a first end of the conduit, and enable outflow of the received fluid or steam from a second end of the conduit. The system can include one or more pumps configured to facilitate inflow and outflow of the fluid through the conduit. The system can include a set of valves configured to facilitate controlled outflow of steam from the second end of the conduit to a second location for one or more industrial applications or electrical power generation. As shown in FIG. 6, an HRSG may also be organized as a recirculating drum-type boiler with an economizer and optional superheater, for the delivery of saturated or superheated steam.

The output of the steam generator may be provided for one or more industrial uses. For example, steam may be provided to a turbine generator that outputs electricity for use as retail local power. The control system may receive information associated with local power demands, and determine the amount of steam to provide to the turbine, so that local power demands can be met.

In addition to the generation of electricity, the output of the thermal storage structure may be used for industrial applications as explained below. Some of these applications may include, but are not limited to, electrolyzers, fuel cells, gas generation units such as hydrogen, carbon capture, manufacture of materials such as cement, calcining applications, as well as others. More details of these industrial applications are provided further below.

Dynamic Insulation

It is generally beneficial for a thermal storage structure to minimize its total energy losses via effective insulation, and to minimize its cost of insulation. Some insulation materials are tolerant of higher temperatures than others. Higher-temperature tolerant materials tend to be more costly.

FIG. 5 provides a schematic section illustration 500 of an implementation of dynamic insulation. The outer container includes roof 501, walls 503, 507 and a foundation 509. Within the outer container, a layer of insulation 511 is provided between the outer container and columns of bricks in stack 513, the columns being represented as 513*a*, 513*b*, 513*c*, 513*d* and 513*e*. The heated fluid that is discharged from the upper portion of the columns of bricks 513*a*, 513*b*, 513*c*, 513*d* and 513*e* exits by way of an output 515, which is connected to a duct 517. The duct 517 provides the heated fluid as an input to a steam generator 519. Once the heated fluid has passed through steam generator 519, some of its heat is transferred to the water in the steam generator and the stream of fluid is cooler than when exiting the steam generator. Further, the heated fluid may be used directly in an industrial process 520 that is configured to receive the heated fluid, as shown at 518. Cooler recycled fluid exits a bottom portion 521 of the steam generator 519. An air blower 523 receives the cooler fluid, and provides the cooler fluid, via a passage 525 defined between the walls 503 and insulation 527 positioned adjacent the stack 513, through an upper air passage 529 defined between the insulation 511 and the roof 501, down through side passages 531 defined on one or more sides of the stack 513 and the insulation 511, and thence down to a passage 533 directly below the stack 513.

The air in passages 525, 529, 531 and 533 acts as an insulating layer between (a) the insulations 511 and 527 surrounding the stack 513, and (b) the roof 501, walls 503, 507 and foundation 509. Thus, heat from the stack 513 is prevented from overheating the roof 501, walls 503, 507 and foundation 509. At the same time, the air flowing through those passages 525, 529, 531 and 533 carries by convection heat that may penetrate the insulations 511 and/or 517 into air flow passages 535 of the stack 513, thus preheating the air, which is then heated by passage through the air flow passages 535.

The columns of bricks 513*a*, 513*b*, 513*c*, 513*d* and 513*e* and the air passages 535 are shown schematically in FIG. 5. The physical structure of the stacks and air flow passages therethrough in embodiments described herein is more complex, leading to advantages.

In some implementations, to reduce or minimize the total energy loss, the layer of insulation 511 is a high-temperature primary insulation that surrounds the columns 513*a*, 513*b*, 513*c*, 513*d* and 513*e* within the housing. Outer layers of lower-cost insulation may also be provided. The primary insulation may be made of thermally insulating materials selected from any combination of refractory bricks, alumina fiber, ceramic fiber, and fiberglass or any other material that might be apparent to a person of ordinary skill in the art. The amount of insulation required to achieve low losses may be large, given the high temperature differences between the storage media and the environment. To reduce energy losses and insulation costs, conduits are arranged to direct returning, cooler fluid from the HRSG along the outside of a primary insulation layer before it flows into the storage core for reheating.

The cooler plenum, including passages 525, 529, 531 and 533, is insulated from the outside environment, but total temperature differences between the cooler plenum and the outside environment are reduced, which in turn reduces thermal losses. This technique, known as "dynamic insulation," uses the cooler returning fluid, as described above, to recapture heat which passes through the primary insulation, preheating the cooler air before it flows into the stacks of the storage unit. This approach further serves to maintain design temperatures within the foundation and supports of the thermal storage structure. Requirements for foundation cooling in existing designs (e.g., for molten salt) involve expensive dedicated blowers and generators—requirements avoided by implementations according to the present teaching.

The materials of construction and the ground below the storage unit may not be able to tolerate high temperatures, and in the present system active cooling—aided by the unassisted flowing heat exchange fluid in the case of power failure—can maintain temperatures within design limits.

A portion of the fluid returning from the HRSG may be directed through conduits such as element 521 located within the supports and foundation elements, cooling them and delivering the captured heat back to the input of the storage unit stacks as preheated fluid. The dynamic insulation may be provided by arranging the bricks 513*a*, 513*b*, 513*c*, 513*d* and 513*e* within the housing so that the bricks 513*a*, 513*b*, 513*c*, 513*d* and 513*e* are not in contact with the outer surface 501, 503, 507 of the housing, and are thus thermally isolated from the housing by the primary insulation formed by the layer of cool fluid. The bricks 513*a*, 513*b*, 513*c*, 513*d* and 513*e* may be positioned at an elevated height from the bottom of the housing, using a platform made of thermally insulating material.

During unit operation, a controlled flow of relatively cool fluid is provided by the fluid blowing units 523, to a region (including passages 525, 529, 531 and 533) between the housing and the primary insulation (which may be located on an interior or exterior of an inner enclosure for one or more thermal storage assemblages), to create the dynamic thermal insulation between the housing and the bricks, which restricts the dissipation of thermal energy being generated by the heating elements and/or stored by the bricks into the outside environment or the housing, and preheats the fluid. As a result, the controlled flow of cold fluid by the fluid blowing units of the system may facilitate controlled transfer of thermal energy from the bricks to the conduit, and also facilitates dynamic thermal insulation, thereby making the system efficient and economical.

In another example implementation, the buoyancy of fluid can enable an unassisted flow of the cold fluid around the bricks between the housing and the primary insulator 511 such that the cold fluid may provide dynamic insulation passively, even when the fluid blowing units 523 fail to operate in case of power or mechanical failure, thereby maintaining the temperature of the system within predefined safety limits, to achieve intrinsic safety. The opening of vents, ports, or louvres (not shown) may establish passive buoyancy-driven flow to maintain such flow, including cooling for supports and foundation cooling, during such power outages or unit failures, without the need for active equipment.

In the above-described fluid flow, the fluid flows to an upper portion of the unit, down the walls and into the inlet of the stacking, depending on the overall surface area to volume ratio, which is in turn dependent on the overall unit size, the flow path of the dynamic insulation may be changed. For example, in the case of smaller units that have greater surface area as compared with the volume, the amount of fluid flowing through the stack relative to the area may utilize a flow pattern that includes a series of serpentine channels, such that the fluid flows on the outside, moves down the wall, up the wall, and down the wall again before flowing into the inlet. Other channelization patterns may also be used.

Additionally, the pressure difference between the return fluid in the insulation layer and the fluid in the stacks may be maintained such that the dynamic insulation layer has a substantially higher pressure than the pressure in the stacks themselves. Thus, if there is a leak between the stacks and the insulation, the return fluid at the higher pressure may be forced into the leak or the cracks, rather than the fluid within the stacks leaking out into the dynamic insulation layer. Accordingly, in the event of a leak in the stacks, the very hot fluid of the stacks may not escape outside of the unit, but instead the return fluid may push into the stacks, until the pressure between the dynamic insulation layer in the stacks equalizes. Pressure sensors may be located on either side of the blower that provide relative and absolute pressure information. With such a configuration, a pressure drop within the system may be detected, which can be used to locate the leak.

Earlier systems that store high temperature sensible heat in rocks and molten salts have required continuous active means of cooling foundations, and in some implementations continuous active means of heating system elements to prevent damage to the storage system; thus, continuous active power and backup power supply systems are required. A system as described herein does not require an external energy supply to maintain the safety of the unit. Instead, as described below, the present disclosure provides a thermal storage structure that provides for thermally induced flows that passively cools key elements when equipment, power, or water fails. This also reduces the need for fans or other cooling elements inside the thermal storage structure.

Forecast-Based System Control

As noted above, forecast information such as weather predictions may be used by a control system to reduce wear and degradation of system components. Another goal of forecast-based control is to ensure adequate thermal energy production from the thermal energy storage system to the load or application system. Actions that may be taken in view of forecast information include, for example, adjustments to operating parameters of the thermal energy storage system itself, adjustments to an amount of input energy coming into the thermal energy storage system, and actions or adjustments associated with a load system receiving an output of the thermal energy storage system.

Weather forecasting information can come from one or more of multiple sources. One source is a weather station at a site located with the generation of electrical energy, such as a solar array or photovoltaic array, or wind turbines. The weather station may be integrated with a power generation facility and may be operationally used for control decisions of that facility, such as for detection of icing on wind turbines. Another source is weather information from sources covering a wider area, such as radar or other weather stations, which may be fed into databases accessible by the control system of the thermal energy storage system. Weather information covering a broader geography may be advantageous in providing more advanced notice of changes in condition, as compared to the point source information from a weather station located at the power source. Still another possible source of weather information is virtual or simulated weather forecast information. In general, machine learning methods can be used to train the system, taking into account such data and modifying behavior of the system.

As an example, historical information associated with a power curve of an energy source may be used as a predictive tool, taking into account actual conditions, to provide forecasting of power availability and adjust control of the thermal energy storage system, both as to the amount of energy available to charge the units and the amount of discharge heat output available. For example, the power curve information may be matched with actual data to show that when the power output of a photovoltaic array is decreasing, it may be indicative of a cloud passing over one or more parts of the array, or cloudy weather generally over the region associated with the array.

Forecast-related information is used to improve the storage and generation of heat at the thermal energy storage system in view of changing conditions. For example, a forecast may assist in determining the amount of heat that must be stored and the rate at which heat must be discharged in order to provide a desired output to an industrial application—for instance, in the case of providing heat to a steam generator, to ensure a consistent quality and amount of steam, and to ensure that the steam generator does not have to shut down. The controller may adjust the current and future output of heat in response to current or forecast reductions in the availability of charging electricity, so as to ensure across a period of future time that the state of charge of the storage unit does not reduce so that heat output must be stopped. By adjusting the continuous operation of a steam generator to a lower rate in response to a forecasted reduction of available input energy, the unit may operate continuously. The avoidance of shutdowns and later restarts is an advantageous feature: shutting down and restarting a steam generator is a time-consuming process that is costly and wasteful of energy, and potentially exposes personnel and industrial facilities to safety risks.

The forecast, in some cases, may be indicative of an expected lower electricity input or some other change in electricity input pattern to the thermal energy storage system. Accordingly, the control system may determine, based on the input forecast information, that the amount of energy that would be required by the thermal energy storage system to generate the heat necessary to meet the demands of the steam generator or other industrial application is lower than the amount of energy expected to be available. In one implementation, making this determination involves considering any adjustments to operation of the thermal energy storage system that may increase the amount of heat it can produce. For example, one adjustment that may increase an amount of heat produced by the system is to run the heating elements in a thermal storage assemblage at a higher power than usual during periods of input supply availability, in order to obtain a higher temperature of the assemblage and greater amount of thermal energy stored. Such "overcharging" or "supercharging" of an assemblage, as discussed further below, may in some implementations allow sufficient output heat to be produced through a period of lowered input energy supply. Overcharging may increase stresses on the thermal storage medium and heater elements of the system, thus increasing the need for maintenance and the risk of equipment failure.

As an alternative to operational adjustments for the thermal energy storage system, or in embodiments for which such adjustments are not expected to make up for a forecasted shortfall of input energy, action on either the source side or the load side of the thermal energy storage system may be initiated by the control system. On the input side, for example, the forecast difference between predicted and needed input power may be used to provide a determination, or decision-support, with respect to sourcing input electrical energy from other sources during an upcoming time period, to provide the forecasted difference. For example, if the forecasting system determines that the amount of electrical energy to be provided from a photovoltaic array will be 70% of the expected amount needed over a given period of time, e.g., due to a forecast of cloudy weather, the control system may effectuate connection to an alternative input source of electrical energy, such as wind turbine, natural gas or other source, such that the thermal energy storage system receives 100% of the expected amount of energy. In an implementation of a thermal energy storage system having an electrical grid connection available as an alternate input power source, the control system may effectuate connection to the grid in response to a forecast of an input power shortfall.

In a particular implementation, forecast data may be used to determine desired output rates for a certain number of hours or days ahead, presenting to an operator signals and information relating to expected operational adjustments to achieve those output rates, and providing the operator with a mechanism to implement the output rates as determined by the system, or alternatively to modify or override those output rates. This may be as simple as a "click to accept" feedback option provided to the operator, a dead-man's switch that automatically implements the determined output rates unless overridden, and/or more detailed options of control parameters for the system.

II. Heat Transport in TSU: Bricks and Heating Elements

A. Problems Solved by One or more Disclosed Embodiments

Traditional approaches to the formation of energy storage cells may have various problems and disadvantages. For example, traditional approaches may not provide for uniform heating of the thermal energy storage cells. Instead, they may use structures that create uneven heating, such as hot spots and cold spots. Non-uniform heating may reduce the efficiency of an energy storage system, lead to earlier equipment failure, cause safety problems, etc. Further, traditional approaches may suffer from wear and tear on thermal energy storage cells. For example, stresses such as mechanical and thermal stress may cause deterioration of performance, as well as destabilization of the material, such as cracking of the bricks.

B. Example Solutions Disclosed Herein

In some implementations, thermal storage blocks (e.g., bricks) have various features that facilitate more even distribution. As one example, blocks may be formed and positioned to define fluid flow pathways with chambers that are open to heating elements to receive radiative energy. Therefore, a given fluid flow pathway (e.g., oriented vertically from the top to bottom of a stack) may include two types of openings: radiation chambers that are open to a channel for a heating element and fluid flow openings (e.g., fluid flow slots) that are not open to the channel. The radiation chambers may receive infrared radiation from heater elements, which, in conjunction with conductive heating by the heater elements may provide more uniform heating of an assemblage of thermal storage blocks, relative to traditional implementations. The fluid flow openings may receive a small amount of radiative energy indirectly via the chambers, but are not directly open to the heating element. The stack of bricks may be used alone or in combination with other stacks of bricks to form the thermal storage unit, and one or more thermal storage units may be used together in the thermal energy storage system. As the fluid blower circulates the fluid through the structure during charge and discharge as explained above, a thermocline may be formed in a substantially vertical direction. Further, the fluid movement system may direct relatively cooler fluid for insulative purposes, e.g., along the insulated walls and roof of the structure. Finally, a venting system may allow for controlled cooling for maintenance or in the event of power loss, water loss, blower failure, etc., which may advantageously improve safety relative to traditional techniques.

Designs according to the present disclosure combine several key innovations, which together address these challenges and enable a cost-effective, safe, reliable high-temperature thermal energy storage system to be built and operated. A carefully structured solid media system according to the present teaching incorporates structured airflow passages which accomplish effective thermocline discharge; repeated mixing chambers along the direction of air flow which mitigate the thermal effects of any localized air channel blockages or nonuniformities; effective shielding of thermal radiation from propagating in the vertical direction; and a radiation chamber structure which uniformly and rapidly heats brick material with high heater power loading, low and uniform exposed surface temperature, and long-distance heat transfer within the storage media array via multi-step thermal radiation.

Innovative structures according to the present disclosure may comprise an array of bricks that form chambers. The bricks have structured air passages, such that in the vertical direction air flows upwards in a succession of open chambers and small air passages. In some embodiments, the array of bricks with internal air passages is organized in a structure such that the outer surface of each brick within the TSU core forms a wall of a chamber in which it is exposed to radiation from other brick surfaces, as well as radiation originating from an electrical heater.

The chamber structure is created by alternating brick materials into a checkerboard-type pattern, in which each brick is surrounded on all sides by open chambers, and each open chamber has adjacent bricks as its walls. In addition, horizontal parallel passages are provided that pass through multiple chambers. Electrical heating elements that extend horizontally through the array are installed in these passages. An individual heating element it may be exposed along its length to the interior spaces of multiple chambers. Each brick within such a checkerboard structure is exposed to open chambers on all sides. Accordingly, during charging, radiant energy from multiple heating elements heats all outer surfaces of each brick, contributing to the rapid and even heating of the brick, and reducing reliance on conductive heat transfer within the brick by limiting the internal dimensions of the brick.

The radiation chamber structure provides a key advance in the design and production of effective thermal energy storage systems that are charged by electrical energy. The large surface area, which is radiatively exposed to heaters, causes the average temperature of the large surface to determine the radiation balance and thus the surface temperature of the heater. This intrinsic uniformity enables a high wattage per unit area of heater without the potential of localized overheating. And exposed brick surfaces are larger per unit of mass than in prior systems, meaning that incoming wattage per unit area is correspondingly smaller, and consequently thermal stresses due to brick internal temperature differences are lower. And critically, re-radiation of energy—radiation by hotter brick surfaces that is absorbed by cooler brick surfaces—reduces by orders of magnitude the variations in surface temperature, and consequently reduces thermal stresses in brick materials exposed to radiant heat. Thus, the radiation chamber design effectively enables heat to be delivered relatively uniformly to a large horizontally oriented surface area and enables high wattage per unit area of heater with relatively low wattage per unit area of brick.

Note that while this configuration is described in terms of "horizontal" and "vertical", these are not absolute degree or angle restrictions. Advantageous factors include maintaining a thermocline and providing for fluid flow through the stack in a direction that results in convective heat transfer, exiting the stack at a relatively hotter portion of the thermocline. An additional advantageous factor that may be incorporated is to position the stack in a manner that encourages buoyant, hot air to rise through the stack and exit at the hot end of the thermocline; in this case, a stack in which the hot end of the thermocline is at a higher elevation than the cold end of the thermocline is effective, and a vertical thermocline maximizes that effectiveness.

An important advantage of this design is that uniformity of heating element temperature is strongly improved in designs according to the present disclosure. Any variations in brick heat conductivity, or any cracks forming in a brick that result in changed heat conductivity, are strongly mitigated by radiation heat transfer away from the location with reduced conductivity. That is, a region reaching a higher temperature than nearby regions due to reduced effectiveness of internal conduction will be out of radiation balance with nearby surfaces, and will as a result be rapidly cooled by radiation to a temperature relatively close to that of surrounding surfaces. As a result, both thermal stresses within solid media, and localized peak heater temperatures, are reduced by a large factor compared to previous teachings.

The system may include one or more air blowing units including any combination of fans and, blowers, and configured at predefined positions in the housing to facilitate the controlled flow of air between a combination of the first section, the second section, and the outside environment. The first section may be isolated from the second section by a thermal barrier. The air blowing units may facilitate the flow of air through at least one of the channels of the bricks from the bottom end of the cells to the upper end of the cells in the first section at the predefined flow rate, and then into the second section, such that the air passing through the bricks and/or heating elements of the cells at the predefined flow rate may be heated to a second predefined temperature, and may absorb and transfer the thermal energy emitted by the heating elements and/or stored by the bricks within the second section. The air may flow from the second section across a steam generator or other heat exchanger containing one or more conduits, which carry a fluid, and which, upon receiving the thermal energy from the air having the second predefined temperature, may heat the fluid flowing through the conduit to a higher temperature or may convert the fluid into steam. Further, the system may facilitate outflow of the generated steam from the second end of the conduit, to a predefined location for one or more industrial applications. The second predefined temperature of the air may be based on the material being used in conduit, and the required temperature and pressure of the steam. In another implementation, the air leaving the second section may be delivered externally to an industrial process.

Additionally, the example implementations described herein disclose a resistive heating element. The resistive heating element may include a resistive wire. The resistive wire may have a cross-section that is substantially round, elongated, flat, or otherwise shaped to admit as heat the energy received from the input of electrical energy.

Passive Cooling

FIG. 6 provides an isometric view of the thermal storage unit with multiple vent closures open, according to some implementations. Therefore, FIG. 6 may represent a maintenance or failsafe mode of operation. As shown, the thermal storage unit also includes an inner enclosure 623. The outer surface of the inner enclosure 623 and the inner surface of the outer enclosure define a fluid passageway through which fluid may be conducted actively for dynamic cooling or passively for failsafe operation.

The inner enclosure 623 includes two vents 615 and 617 which include corresponding vent closures in some implementations (portions of vent door 613, in this example). In some implementations, vents 615 and 617 define respective passages between an interior of the inner enclosure 623 and an exterior of the inner enclosure. When the external vent closure 603 is open, these two vents are exposed to the exterior of the outer enclosure as well.

As shown, the vent 615 may vent heated fluid from the thermal storage blocks conducted by duct 619. The vent 617 may allow entry of exterior fluid into the fluid passageway and eventually into the bottoms of the thermal storage block assemblies via louvers 611 (the vent closure 609 may remain closed in this situation). In some implementations, the buoyancy of fluid heated by the blocks causes it to exit vent 615 and a chimney effect pulls external fluid into the outer enclosure via vent 617. This external fluid may then be directed through louvers 611 due to the chimney effect and facilitate cooling of the unit. Speaking generally, a first vent closure may open to output heated fluid and a second vent closure may open to input external fluid for passive venting operation.

During passive cooling, the louvers 611 may also receive external fluid directly, e.g., when vent closure 609 is open. In this situation, both vents 615 and 617 may output fluid from the inner and outer enclosures.

Vent door 613 in the illustrated implementation, also closes an input to the steam generator when the vents 615 and 617 are open. This may prevent damage to steam generator components (such as water tubes) when water is cut off, the blower is not operating, or other failure conditions. The vent 617 may communicate with one or more blowers which may allow fluid to passively move through the blowers even when they are not operating. Speaking generally, one or more failsafe vent closure may close one or more passageways to cut off fluid heated by the thermal storage blocks and reduce or avoid equipment damage.

When the vent door 613 is closed, it may define part of the fluid passageway used for dynamic insulation. For example, the fluid movement system may move fluid up along one wall of the inner enclosure, across an outer surface of the vent door 613, across a roof of the inner enclosure, down one or more other sides of the inner enclosure, and into the thermal storage blocks (e.g., via louvers 611). Louvers 611 may allow control of fluid flow into assemblages of thermal storage blocks, including independent control of separately insulated assemblages in some implementations.

In the closed position, vent door 613 may also define an input pathway for heated fluid to pass from the thermal storage blocks to the duct 619 and beneath the vent door 613 into the steam generator to generate steam.

In some implementations, one or more of vent door 613, vent closure 603, and vent closure 609 are configured to open in response to a nonoperating condition of one or more system elements (e.g., nonoperation of the fluid movement system, power failure, water failure, etc.). In some implementations, one or more vent closures or doors are held in a closed position using electric power during normal operation and open automatically when electric power is lost or in response to a signal indicating to open.

In some implementations, one or more vent closures are opened while a fluid blower is operating, e.g., to rapidly cool the unit for maintenance.

Thermoelectric Power Generation

1. Problems to be Solved

Gasification is the thermal conversion of organic matter by partial oxidation into gaseous product, consisting primarily of $H_2$, carbon monoxide (CO), and may also include methane, water, $CO_2$ and other products. Biomass (e.g., wood pellets), carbon rich waste (e.g. paper, cardboard) and even plastic waste can be gasified to produce hydrogen rich syngas at high yields with high temperature steam, with optimum yields attained at >1000° C. The rate of formation of combustible gases are increased by increasing the temperature of the reaction, leading to a more complete conversion of the fuel. The yield of hydrogen, for example, increases with the rise of reaction temperature.

Turning waste carbon sources into a useable alternative energy or feedstock stream to fossil fuels is a potentially highly impactful method for reducing carbon emissions and valorizing otherwise unused carbon sources.

2. Thermoelectric Power Generation

Indirect gasification uses a Dual Fluidized Bed (DFB) system consisting of two intercoupled fluidized bed reactors—one combustor and one gasifier—between which a considerable amount of bed material is circulated. This circulating bed material acts as a heat carrier from the combustor to the gasifier, thus satisfying the net energy demand in the gasifier originated by the fact that it is fluidized solely with steam, i.e., with no air/oxygen present, in contrast to the classical approach in gasification technology also called direct gasification. The absence of nitrogen and combustion in the gasifying chamber implies the generation of a raw gas with much higher heating value than that in direct gasification. The char which is not converted in the gasifying chamber follows the circulating bed material into the combustor, which is fluidized with air, where it is combusted and releases heat which is captured by the circulating bed material and thereby transported into the gasifier in order to close the heat balance of the system.

Referring to FIG. 4, in some example implementations, the thermal energy storage structure 403 can be integrated directly with a steam power plant to provide an integrated cogeneration system 400 for a continuous supply of hot air, steam and/or electrical power for various industrial applications. Thermal storage structure 403 may be operatively coupled to electrical energy sources 401 to receive electrical energy and convert and store the electrical energy in the form of thermal energy. In some implementations, at least one of the electrical energy sources 401 may comprise an input energy source having intermittent availability. However, electrical energy sources 401 may also include input energy sources having on-demand availability, and combinations of intermittent and on-demand sources are also possible and contemplated. The system 403 can be operatively coupled to a heat recovery steam generator (HRSG) 409 which is configured to receive heated air from the system 403 for converting the water flowing through conduits 407 of the HRSG 409 into steam for the steam turbine 415. In an alternative implementation, HRSG 409 is a once-through steam generator in which the water used to generate steam is not recirculated. However, implementations in which the water used to generate steam is partially or fully circulated as shown in FIG. 4 are also possible and contemplated.

A control unit can control the flow of the heated air (and more generally, a fluid) into the HRSG 409, based on load demand, cost per KWH of available energy source, and thermal energy stored in the system. The steam turbine 415 can be operatively coupled to a steam generator 409, which can be configured to generate a continuous supply of electrical energy. Further, the steam turbine 415 can also release a continuous flow of relatively lower-pressure 421 steam as output to supply an industrial process. Accordingly, implementations are possible and contemplated in which steam is received by the turbine at a first pressure and is output therefrom at a second, lower pressure, with lower pressure steam being provided to the industrial process. Examples of such industrial process that may utilize the lower pressure output steam include (but are not limited to) production of liquid transportation fuels, including petroleum fuels, biofuel production, production of diesel fuels, production of ethanol, grain drying, and so on.

The production of ethanol as a fuel from starch and cellulose involves aqueous processes including hydrolysis, fermentation and distillation. Ethanol plants have substantial electrical energy demand for process pumps and other equipment, and significant demands for heat to drive hydrolysis, cooking, distillation, dehydrating, and drying the biomass and alcohol streams. It is well known to use conventional electric power and fuel-fired boilers, or fuel-fired cogeneration of steam and power, to operate the fuel production process. Such energy inputs are a significant source of $CO_2$ emissions, in some cases 25% or more of total $CO_2$ associated with total agriculture, fuel production, and transportation of finished fuel. Accordingly, the use of renewable energy to drive such production processes is of value. Some ethanol plants are located in locations where excellent solar resources are available. Others are located in locations where excellent wind and solar resources are available.

The use of electrothermal energy storage may provide local benefits in such locations to grid operators, including switchable electricity loads to stabilize the grid; and intermittently available grid electricity (e.g., during low-price periods) may provide a low-cost continuous source of energy delivered from the electrothermal storage unit.

The use of renewable energy (wind or solar power) as the source of energy charging the electrothermal storage may deliver important reductions in the total. $CO_2$ emissions involved in producing the fuel, as up to 100% of the driving electricity and driving steam required for plant operations may come from cogeneration of heat and power by a steam turbine powered by steam generated by an electrothermal storage unit. Such emissions reductions are both valuable to the climate and commercially valuable under programs which create financial value for renewable and low-carbon fuels.

The electrothermal energy storage unit having air as a heat transfer fluid may provide other important benefits to an ethanol production facility, notably in the supply of heated dry air to process elements including spent grain drying. One useful combination of heated air output and steam output from a single unit is achieved by directing the outlet stream from the HRSG to the grain dryer. In this manner, a given amount of energy storage material (e.g., brick) may be cycled through a wider change in temperature, enabling the storage of extra energy in a given mass of storage material. There may be periods where the energy storage material temperature is below the temperature required for making steam, but the discharge of heated air for drying or other operations continues.

In some implementations thermal storage structure 403 may be directly integrated to industrial processing systems in order to directly deliver heat to a process without generation of steam or electricity. For example, thermal storage structure 403 may be integrated into industrial systems for manufacturing lime, concrete, petrochemical processing, or any other process that requires the delivery of high temperature air or heat to drive a chemical process. Through integration of thermal storage structure 403 charged by VRE, the fossil fuel requirements of such industrial process may be significantly reduced or possibly eliminated.

The control unit can determine how much steam is to flow through a condenser 419 versus steam output 421, varying both total electrical generation and steam production as needed. As a result, the integrated cogeneration system 400 can cogenerate steam and electrical power for one or more industrial applications.

If implemented with an OTSG as shown in FIG. 3 instead of the recirculating HRSG shown in FIG. 5, the overall integrated cogeneration system 400 can be used as thermal storage once-through steam generator (TSOTG) which can be used in oil fields and industries to deliver wet saturated steam or superheated dry steam at a specific flow rate and steam quality under automated control. High temperature delivered by the bricks and heating elements of the system 403 can power the integrated heat recovery steam generator (HRSG) 409. A closed air recirculation loop can minimize heat losses and maintain overall steam generation efficiency above 98%.

The HRSG 409 can include a positive displacement (PD) pump 411 under variable frequency drive (VFD) control to deliver water to the HRSG 409. Automatic control of steam flow rate and steam quality (including feed-forward and feed-back quality control) can be provided by the TSOTG 400. In an exemplary example implementation, a built-in Local Operator Interface (LOI) panel operatively coupled to system 400 and the control unit can provide unit supervision and control. Further, thermal storage structure 403 can be connected to a supervisory control and data acquisition system (SCADA)) associated with the steam power plant (or other load system). In one implementation, a second electrical power source is electrically connected to the steam generator pumps, blowers, instruments, and control unit.

In some implementations, system 400 may be designed to operate using feedwater with substantially dissolved solids; accordingly, a recirculating boiler configuration is impractical. Instead, a once-through steam generation process can be used to deliver wet steam without the buildup of mineral contaminants within the boiler. A serpentine arrangement of conduits 407 in an alternative once-through configuration of the HRSG 409 can be exposed to high-temperature air generated by the thermal storage structure 403, in which preheating and evaporation of the feedwater can take place consecutively. Water can be forced through the conduits of HRSG 409 by a boiler feedwater pump, entering the HRSG 409 at the “cold” end. The water can change phase along the circuit and may exit as wet steam at the “hot” end. In one implementation, steam quality is calculated based on the temperature of air provided by the thermal storage structure 403, and feedwater temperatures and flow rates, and is measured based on velocity acceleration at the HRSG outlet. Embodiments implementing a separator to separate steam from water vapor and determine the steam quality based on their relative proportions are also possible and contemplated.

In the case of an OTSG implementation, airflow (or other fluid flow) can be arranged such that the hottest air is nearest to the steam outlet at the second end of the conduit. An OTSG conduit can be mounted transversely to the airflow path and arranged in a sequence to provide highly efficient heat transfer and steam generation while achieving a low cost of materials. As a result, other than thermal losses from energy storage, steam generation efficiency can reach above 98%. The prevention of scale formation within the tubing is an important design consideration in the selection of steam quality and tubing design. As water flows through the serpentine conduit, the water first rises in temperature according to the saturation temperature corresponding to the pressure, then begins evaporating (boiling) as flow continues through heated conduits.

As boiling occurs, volume expansion causes acceleration of the rate of flow, and the concentration of dissolved solids increases proportionally with the fraction of liquid phase remaining. Maintaining concentrations below precipitation concentration limits is an important consideration to prevent scale formation. Within a bulk flow whose average mineral precipitation, localized nucleate and film boiling can cause increased local mineral concentrations at the conduit walls. To mitigate the potential for scale formation arising from such localized increases in mineral concentration, conduits which carry water being heated may be rearranged such that the highest temperature heating air flows across conduits which carry water at a lower steam quality, and that heating air at a lower-temperature flows across the conduits that carry the highest steam quality flow.

Returning to FIG. 6, various implementations are contemplated in which a fluid movement device moves fluid across a thermal storage medium, to heat the fluid, and subsequently to an HRSG such as HRSG 409 for use in the generation of steam. In one implementation, the fluid is air. Accordingly, air circulation through the HRSG 409 can be forced by a variable-speed blower, which serves as the fluid movement device in such an embodiment. Air temperature can be adjusted by recirculation/mixing, to provide inlet air temperature that does not vary with the state of charge of the bricks or other mechanisms used to implement a thermal storage unit. The HRSG 409 can be fluidically coupled to a steam turbine generator 415, which upon receiving the steam from the HRSG 409, causes the production of electrical energy using generator 417. Further, the steam gas turbine 415 in various embodiments releases low-pressure steam that is condensed to a liquid by a condenser 419, and then de-aerated using a deaerator 413, and again delivered to the HRSG 409.

III. Electrolysis

Section III of the Detailed Description relates to the newly added disclosure of this continuation-in-part application. In the following description, the thermal energy storage system, thermal storage medium, processes for use and variations thereon may be any of the range of implementations described throughout this continuation-in-part application, including in any combination with the variations discussed above that were described in the aforementioned U.S. Pat. No. 11,603,776.

The gas that is output from the TSU may be provided as the input for various industrial applications. One type of industrial application that uses and benefits from a continuous stream of heat at a constant temperature is electrolysis. The thermal energy storage system receiving electric power that can flow into a heat storage system (e.g., taking air in at 200° C. and delivering air in a range between 500° C. and 1000° C. (such as 860° C.) when discharged for electrolysis). As explained below, art electrolysis systems can be improved by combination with the above-described thermal energy storage system.

1. Problems to be Solved

Solid oxide electrolyzers according to conventional designs receive an input of heated gas and water in the form of superheated steam. The gas is heated prior to input to the solid oxide electrolyzer by an electric resistive heater, a fuel-fired heater, or the like. The use of an electric resistive heater or fuel-fired heater for this purpose may have various problems and disadvantages. For example, fuel heaters may consume fossil fuels such as natural gas, which is expensive and causes pollution. Hydrogen-fired heaters, while non-polluting, may reduce the yield of hydrogen produced for its primary use, as it consumes a portion of the electrolysis hydrogen yield, hence lowering overall system efficiency. Electric heaters powered directly by VRE sources cause problems associated with changing temperatures, such as decreased efficiency, thermal stresses and fatigue at component interfaces leading to premature device failure, and the like, and limited operating periods.

There are several types of fuel cells that take hydrogen or a mix of gases at an elevated temperature and make electric power, such as molten carbonate electrolyzer fuel cells, and solid oxide fuel cells. Such fuel cells are essentially the same as electrolyzers operating in a reverse manner. However, solid oxide fuel cells have problems and disadvantages in electrolyzer mode because the oxidation reaction causes localized heating and issues with cell life, as mentioned above. Solid oxide fuel cells require their inlet reactants and the fuel cell assembly to be maintained at particular temperatures. The operation of fuel cells delivers energy partly in the form of electrical energy and partly as heat. Further, solid oxide fuel cells require a recuperator (e.g., high temperature heat generator) to make use of a portion of the heat generated by the fuel cell. However, a substantial portion of the heat so generated is not used, which results in inefficiencies.

2. Reversible Solid Oxide Unit

Solid oxide electrolyzers use electrical energy to break apart the molecular bonds of water (or $CO_2$) and separate $H_2$ from the elemental oxide ions producing separate outlet streams. Many solid oxide electrolyzers have a porous cathode with a dense electrolyte that is ionically conductive when operated at temperatures at or above 700° C. The higher the temperature the more thermal energy is contributing to cracking the hydrogen bonds in water molecules. A solid oxide fuel cell is typically 40-80% efficient at taking fuel energy and making electric energy, with the rest of the energy being released as heat as the product outlet streams have higher temperatures than the inlet streams, e.g., 850° C. to 860° C. A system may incorporate one or more solid oxide electrolyzers and one or more solid oxide fuel cells; or a single solid oxide unit may operate reversibly as an electrolyzer or fuel cell.

Figure 7:
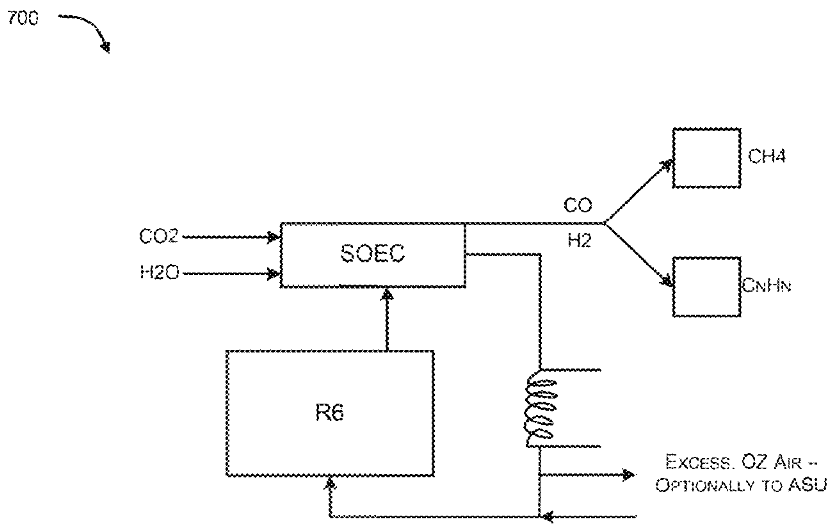

FIG. 7 shows an integration 700 of a solid oxide electrolyzer whose operation is maintained by heat stored in a thermal energy storage R6, and whose operation may be advantageously efficient by being maintained at beneficial temperature, with the thermal energy storage providing thermal energy that is absorbed in an endothermic electrolysis reaction.

Such a solid oxide electrolyzer may electrolyze water to produce hydrogen or may co-electrolyze a flow of steam and carbon dioxide, such that its outlet products are carbon monoxide and hydrogen, or syngas. The relative flow of C $O_2$ and $H_2O$ may be so adjusted as to produce the desired proportions in the syngas of carbon monoxide to hydrogen. The desired syngas composition may also be attained by controlling the combustion and stoichiometry of the fuel fired inlet. The syngas may be used for a variety of purposes, including the drive of Sabatier or Fischer-Tropsch reactions to make various hydrocarbon molecules, or a water gas shift reaction producing $H_2$ which may be used as fuels or feedstocks in other industrial processes.

The solid oxide electrolyzer (SOEC) may be integrated with thermal energy storage R6 in gas contact with the fluid flowing through the thermal storage core, where that circulating fluid is air. In one implementation, the SOEC may be swept by air at a higher temperature, such as 830° C., and the air exiting from the SOEC may be at a lower temperature such as 800° C. The heat in that air is then captured by a heat recovery unit to generate steam or heat another working fluid for another purpose. That heated fluid may for example be integrated into the electric power cycle previously described. The operation for the SOEC releases oxygen into the air sweep.

Figure 8:
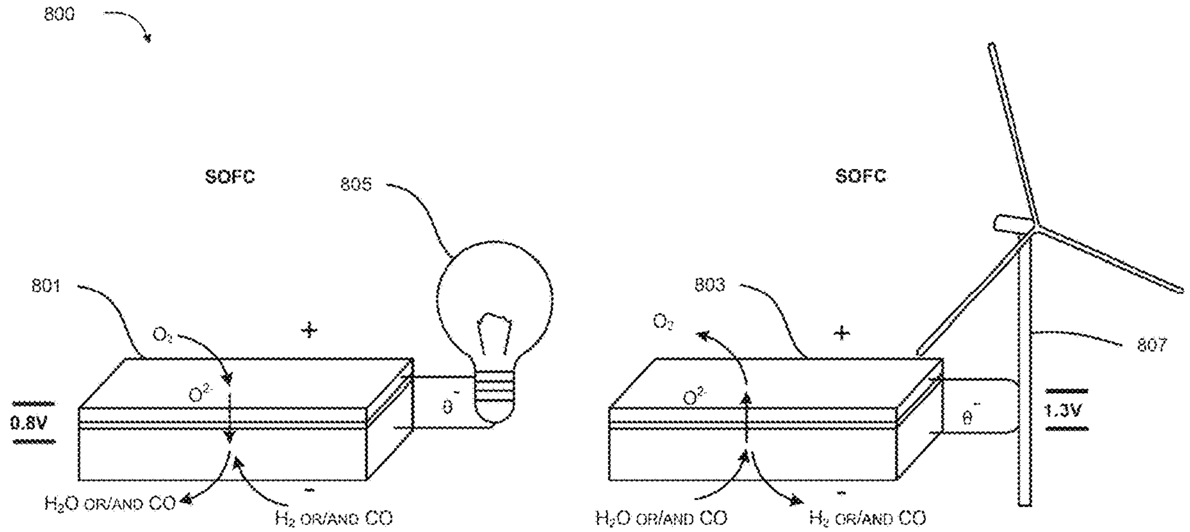

FIG. 8 provides an illustration 800 of the solid oxide unit as a fuel cell 801 and as an electrolyzer 803. Note that in describing the fuel cell and electrolyzer system, they could be part of a single reversible unit or separate devices on their own. The solid oxide fuel cell at 801 receives as its input a gas such as hydrogen or carbon monoxide. The hydrogen or carbon monoxide is combined with oxygen enriched gas across a potential to output electrical energy 805 and either water or carbon dioxide, depending on whether hydrogen or carbon monoxide, respectively, is the input. Similarly, as shown in the solid oxide electrolysis system 803, water or carbon dioxide is provided as an input along with heat in the form of hot fluid from the thermal energy storage system, which obtains its energy from an electrical source such as the renewable wind source 807 as illustrated. The output is hydrogen gas or carbon monoxide or a combination of the two, depending on whether water or carbon dioxide or both was the input, as well as oxygen enriched gas as a byproduct.

Figure 9:
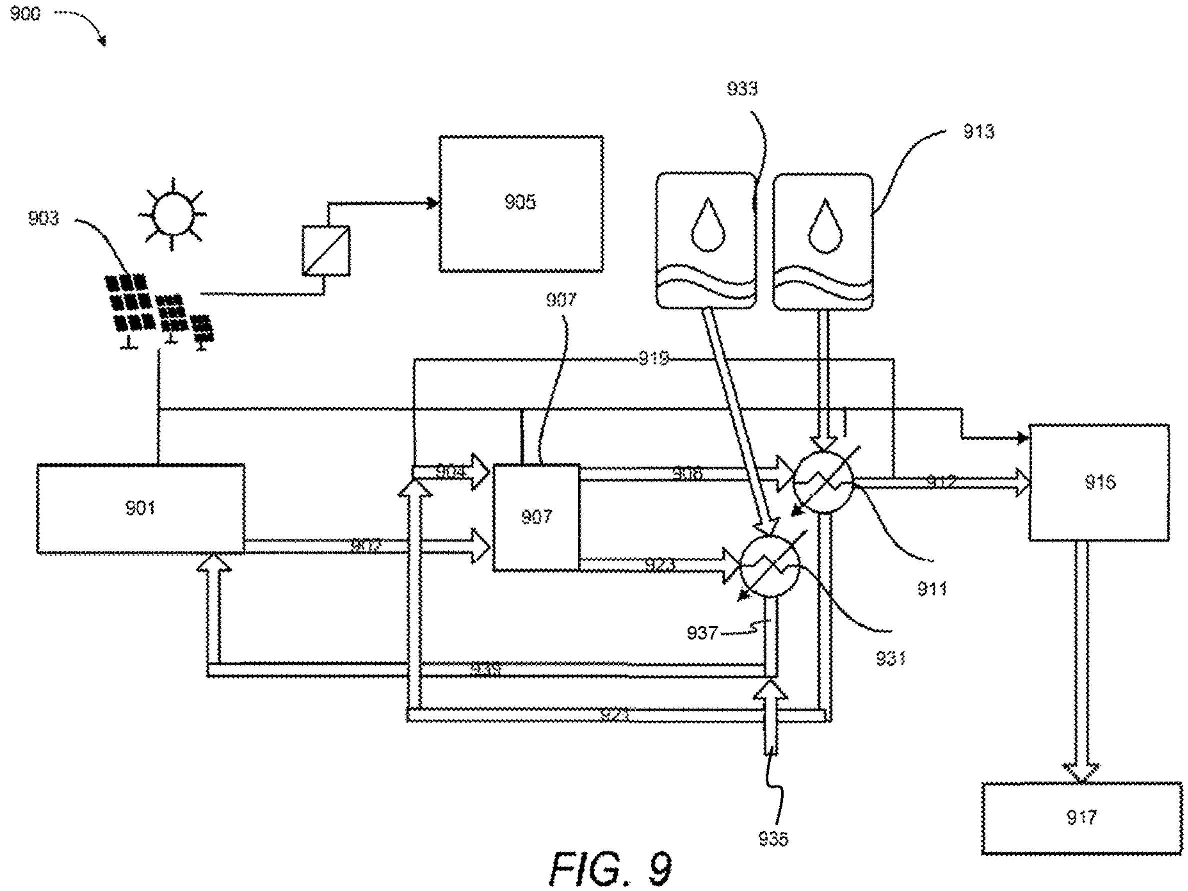

FIG. 9 illustrates the electrolysis mode 900 of the example implementation. The thermal energy system 901 receives electrical energy from a source, such as a VRE source 903, and/or from another source, either locally or via an electricity grid 905. The electricity source 903 may also be coupled to other elements of the solid oxide electrolysis system, for example, to provide electrical potential for the electrolysis reaction. Fluid 902 (e.g., hot air) is output from the thermal energy storage system 901 and provided to the solid oxide electrolysis cell 907. Fluid 902 may be at a temperature between 800° C. and 1000° C. (such as 850° C.). Solid oxide electrolysis cell 907 may also receive steam 904, which may be at a temperature near fluid 902 (for example, 830° C.). The solid oxide electrolysis cell 907 may receive electricity from the electricity source 903 and generate as its output hydrogen as the product gas 908 along with oxygen enriched hot fluid 923 as a byproduct.

The product gas 908 (e.g., hydrogen) is cooled via a heat exchanger. The heat exchanger may reject heat to the environment or, more efficiently, may deliver heat to a thermal load, such as a once-through steam generator (OTSG) 911, as its input. Throughout the description of solid oxide electrochemical systems, the term OTSG broadly refers to any indirect heat exchanger. The product gas flows through the heat exchangers of the OTSG 911, which is supplied by cold water from a source 913. As the product gas 908 is cooled by the heat exchanger/OTSG 911, much of its carried water is condensed and removed, becoming product gas 912 with a higher composition of hydrogen gas. The condensed product gas 912 may be provided to a hydrogen processing unit 915, which in turn compresses and purifies the hydrogen gas in a storage ready form to storage 917. A portion of the product gas is recirculated at 919 to be mixed with the input steam 904. In one implementation, steam 904, or a portion of the steam, may be the output of the OTSG 911, as shown at 919.

In a manner similar to that explained above for OTSG 911, another OTSG 931 may be provided, having water supplied from a source 933. As previously discussed, the OTSG 931 may be any heat exchanger heating a fluid, including a recirculating boiler with or without superheat, or a unit that heats circulating air, $CO_2$, oil, water, or salt. The OTSG 931 receives the oxygen enriched hot fluid, and outputs the cooled fluid at 937. In some implementations, the OTSG 931 may receive another stream of hot fluid from the thermal energy system 901 so as to adjust the temperature or heat flow of the combined stream to a more useful condition. The cooled, oxygen-enriched fluid 937 may be mixed with ambient or preheated air at 935, to adjust the composition of oxygen to a desired level. The adjusted fluid 939 may be provided as an input gas to the thermal energy storage system 901.

Figure 10:
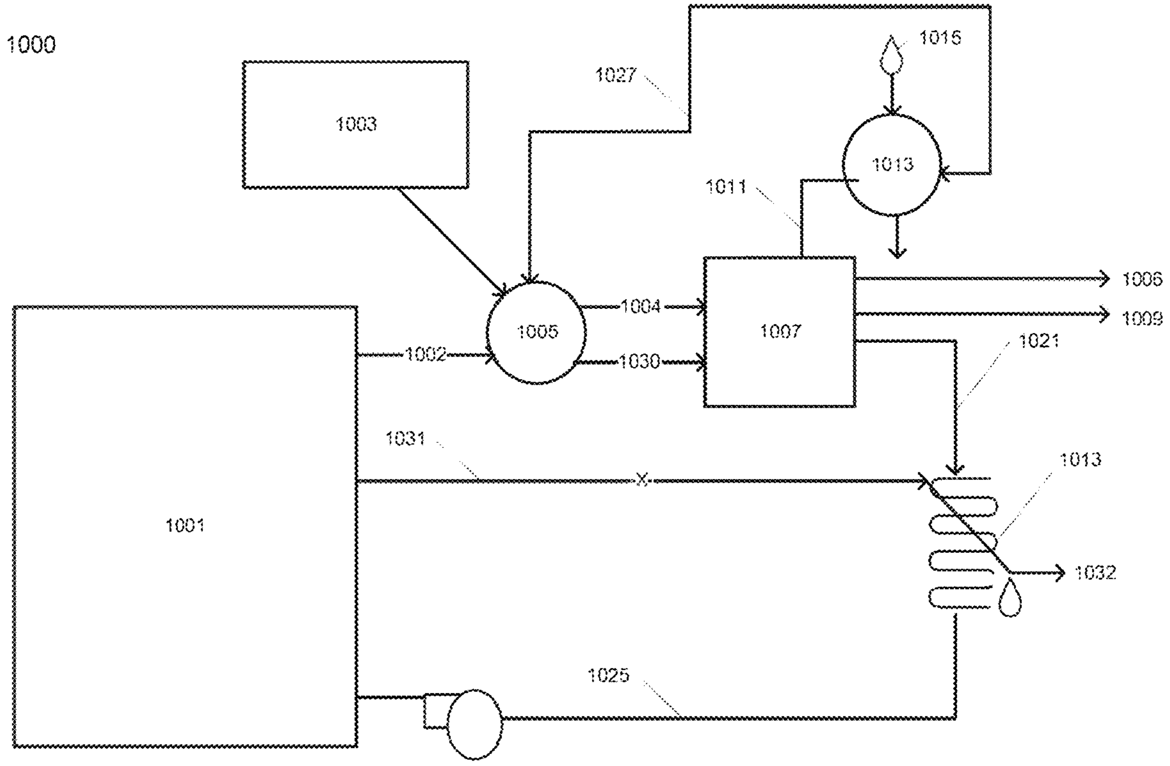

FIG. 10 illustrates a fuel cell mode 1000 according to an example implementation. The thermal energy storage system 1001 provides air or oxygen as shown at 1002, such as explained above with respect to an electrolysis mode. Separately, a supply of hydrogen 1003 is provided. The hydrogen is heated up via the single pass heat exchanger 1005 by the hot fluid from the thermal energy storage system. Optionally, a small amount of steam may be mixed in with the hydrogen gas to avoid degradation of the solid oxide unit.

In the fuel-cell mode of operation, the air or $O_2$ 1030 may provide a cooling effect in solid oxide fuel cell 1007. The air 1002 from the thermal energy storage system 1001 and the heated hydrogen from the hydrogen storage 1003 are input as shown by 1004 and 1030 respectively to the solid oxide fuel cell 1007. As its output, the solid oxide fuel cell 1007 generates direct current electricity at 1006. In one implementation, the direct current electricity is provided to an inverter to convert to an alternating current power output, which can be provided to any use 1009 (which may, e.g., be a power grid). Additional outputs of the solid oxide fuel cell 1007 include water and hydrogen as a product fluid at 1011, and heated, oxygen-depleted air at 1021. The product fluid at 1021 is provided to heat exchanger 1013, which cools the product fluid by heating another fluid, shown as "X" added to fluid stream 1031, which may be water, air, or another fluid received, as shown, for example at fluid source 1015.

When input fluid 1031 includes water, the output 1032 includes export steam, which may be provided as an input to an industrial application that requires steam, such as a steam turbine as explained above. Additionally, residual hydrogen may be recirculated, by way of a heat exchanger 1005, to the solid oxide fuel cell 1007, as shown at 1027. The oxygen-depleted fluid 1021, optionally supplemented with other hot fluid from the storage 1031, is provided as the heating gas for the heat exchanger 1013, and subsequently provided as the input fluid for the thermal energy storage system 1001, as shown at 1025. It is noted that the solid oxide fuel cell 1007 generates electricity and heat. Thus, the input fluid from the thermal energy storage system 1001, which is at about 650° C., e.g., 650° C. in this example, is provided as cooling air for the solid oxide fuel cell 1007.

Figure 11:
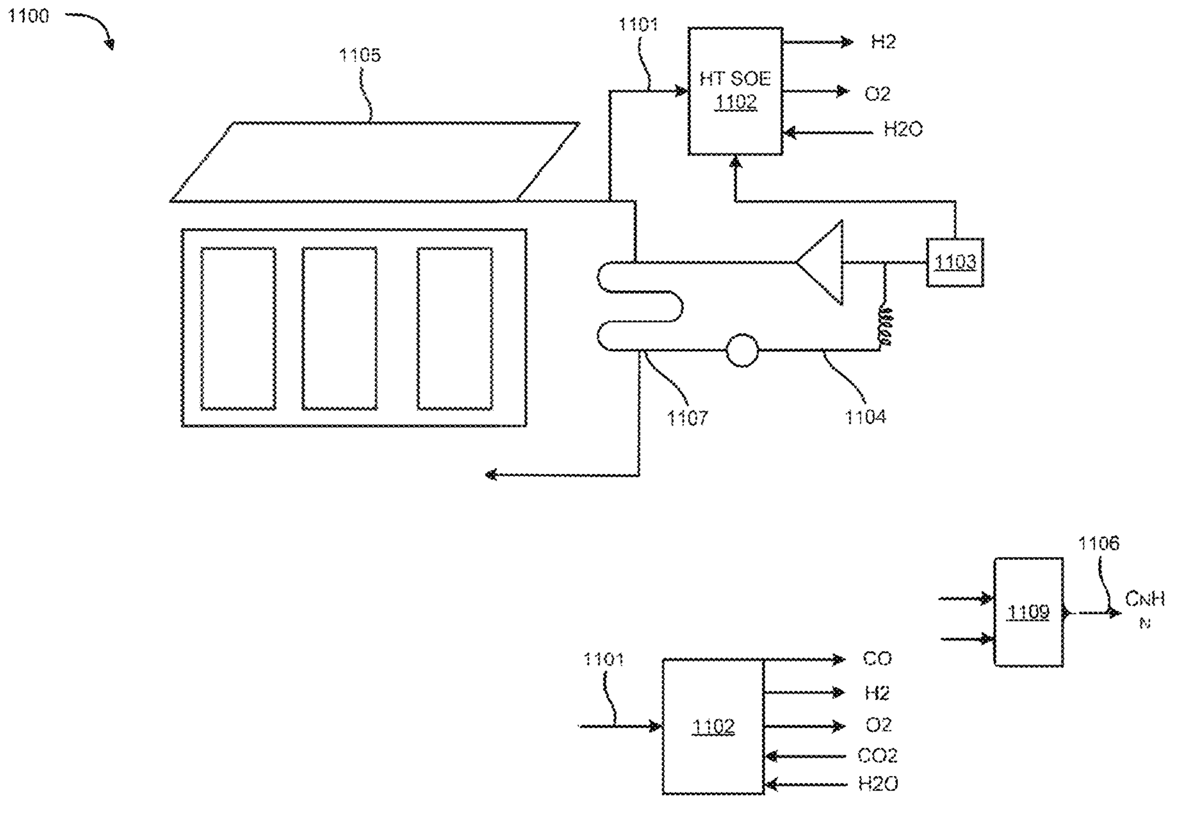

FIG. 11 illustrates an example system 1100 used to power the production of hydrogen and/or hydrocarbon fuels by delivering both heat and power to drive a high-temperature solid-oxide electrolyzer 1102. Solid-oxide electrolyzers can reduce the electrical energy input needed per unit of hydrogen produced by harnessing thermal energy to drive the breaking of chemical bonds and subsequent ionic transport across the electrolyte. Relatively higher total efficiency may be achieved by directing a portion 1101 of the high-temperature stored heat from thermal energy storage system 1105 as high-temperature heat to an electrolyzer 1102 which is also fully or partially powered by electricity 1103 generated by a thermal generation process 1104. Thermal generation process 1104 may include, for example, a Rankine cycle or supercritical $CO_2$ cycle.

In some implementations, the electrolyzer 1102 may co-electrolyze water and $CO_2$ (separate electrolyzers may also be used to electrolyze water and $CO_2$) with all or a portion of the resulting syngas directed to an industrial use such as methanation or Fischer-Tropsch type conversion unit 1109. Unit 1109 may make a synthetic gaseous or liquid hydrocarbon fuel, shown at 1106. Additionally, a once-through steam generator (OTSG) or other heat exchanger 1107 may be provided as a condenser that cools the output fluid of the solid oxide electrolysis unit 1102 and provides the steam as an input to the solid oxide electrolysis unit 1102. The byproduct hot fluid is recirculated back to the thermal energy storage system 1105 as an input fluid (not shown). A solid oxide system is often heated convectively using higher temperature sweep gas that interacts with the air side (the electron donating side in electrolysis) electrode that either accepts oxide ions, removes produced oxygen in electrolysis, or donates oxide ions, supplies oxygen as a reactant in the fuel cell. In electrolysis, the sweep gas temperature is modulated and controlled in order to keep the electrolyzer internals at a uniform, high temperature. In operation the sweep gas may enter the electrolyzer stack at a slightly higher temperature than the desired operating temperature of the stack. The sweep gas exits at a lower temperature that is closer to the operating temperature of the stack and with an increased flow rate due to the addition of molecular oxygen during the reaction. The sweep gas can be recirculated back to the thermal storage system, maybe being diluted with ambient air, so that the system conserves the high temperature heat. This sweep gas may be cooled before reentry to the thermal storage system via heat exchange with water for steam generation or superheating or to preheat inlet gas streams.

As explained above, in some systems, the electrolyzer may be reversible to also be used as a fuel cell. Thus, when the renewable input power such as the photovoltaic array is unavailable or when electricity is needed by the grid, stored hydrogen can be fed to the fuel cell and water, electricity, and heat will be output from the system. The output heat may be at a high enough temperature to produce steam or can be utilized in another industrial process. Accordingly, less heat is extracted out of the heat storage unit as it is replaced with what would otherwise be waste heat coming from the fuel cell.

Alternatively, the gas flow can redirected to enter the thermal storage system, where heat can be added convectively back into thermal storage. Thus, when the system is performing co-generation and running heat, the waste heat from the fuel cell can be used to either displace energy that would otherwise have been discharged from heat storage or be returned to heat storage.

The efficiency in the electrolyzer dramatically improves when using hot fluid from the thermal energy storage system. Further, if none of the outlet stream is being used for an industrial process, the captured heat can be repurposed. For example, hydrogen is produced in one implementation, with a fraction being sold and another fraction being used for power generation. The waste heat from power generation may be recaptured and used to reduce the electricity used for electrolysis during the next period, such as the next day. Further, in some example implementations, one or both of the convective waste heat from the fuel cell and generated electricity may be used to charge the thermal storage unit.

In one implementation, the system may incorporate 1) a solar array or other intermittent electricity source; 2) a combination electrolyzer/fuel cell-thermal storage unit; and 3) a lithium-ion battery and/or an electric vehicle charging station and/or a hydrogen filling station. This system can be used to store energy as hydrogen that may participate in providing the off-hours electricity for EV charging but is also available for dispensing to vehicles as hydrogen charging.

Referring to FIG. 11 as discussed above, in some implementations a thermal energy storage system may be used to power the production of hydrogen and/or hydrocarbon fuels by delivering both heat and power to drive a high-temperature solid-oxide electrolyzer. Solid-oxide electrolyzers can reduce the electrical energy input needed per unit of hydrogen by harnessing thermal energy to drive the breaking of chemical bonds. Relatively higher total efficiency may be achieved by directing a portion 1101 of the high-temperature stored heat from VRE as high-temperature heat to an electrolyzer 1102 which is also fully or partially powered by electricity 1103 generated by a thermal generation process 1104, such as a Rankine cycle or supercritical $CO_2$ cycle. In some implementations, electrolyzer 1102 may co-electrolyze water and $CO_2$, or separate electrolyzers may electrolyze water and $CO_2$, with all or a portion of the resulting syngas directed to a methanation or Fischer-Tropsch type conversion unit 1105 so as to make a synthetic gaseous or liquid hydrocarbon fuel.

Figure 12:
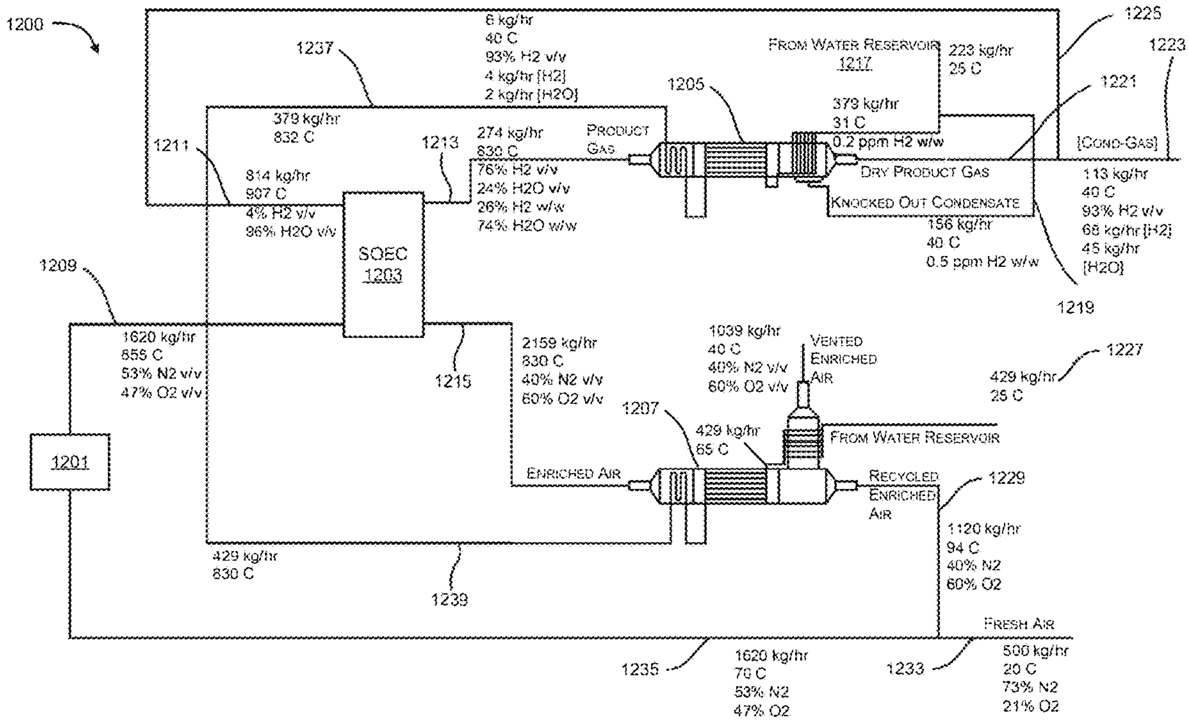

FIG. 12 illustrates a reversible solid oxide electrolysis system 1200 according to an example implementation. The thermal energy storage system 1201 provides hot fluid (e.g., hot gas) 1209 at its output. As shown in this example, the composition of the fluid is 53% nitrogen gas and 47% oxygen gas, at a temperature of 855° C. and a flow rate of 1620 kg per hour. However, the composition of the oxygen or nitrogen can be adjusted based on the operating parameters of the solid oxide cell 1203. For instance, the gas may have an oxygen volume percentage between 10% and 60%. Additionally, the temperature or flow rate may be varied. For example, the temperature may be between 800° C. and 1000° C. or the flow rate may be between 1500 kg/hr. and 2000 kg/hr.

The hot fluid 1209 is provided to a solid oxide unit 1203. In this case, the solid oxide unit is a two-way reversible unit. For example, solid oxide unit 1203 can operate in electrolysis mode, which produces an endothermic reaction, or in fuel cell mode, which produces an exothermic reaction. The solid oxide unit 1203 is currently described in electrolysis mode. While the fuel cell is always exothermic, electrolysis can be overall endothermic, exothermic, or thermal-neutral, depending on the operating voltage. The core chemical reaction is endothermic in electrolysis, but the internal resistance of the electrolyzer stack is exothermic in that heat is always produced as electric current is passed through it. When the heat consumed by the reaction is less than the heat generated by ohmic resistance, the overall electrolysis stack is effectively exothermic as the system is a net generator of thermal energy and the product streams exit at higher temperatures than they entered. Most systems avoid intentionally operating in this mode because it has poor electric-to hydrogen product efficiency. When the reaction consumes just as much heat as is produced via ohmic resistance, the unit is said to be operating at thermal-neutral conditions. Often this is defined by the thermoneutral voltage, i.e. the operating voltage that allows the system to operate without consuming or generating heat. When the reaction consumes more heat (more hydrogen being produced) than heat generated by the ohmic resistance, the stack is endothermic and requires external heat. Often, electrolyzer units operate at voltages in which the overall process is thermal neutral or slightly endothermic. Operating near thermal neutral conditions is often desired as many art systems use electric resistive heaters to provide heat to the inlet streams. In this case, because both heat and electricity used in the system come from the same electric source, there is little added value in replacing electricity with heat. In the novel system described herein, the high-temperature inlet gas and steam are heated with lower-cost, stored electricity by the thermal storage system. With a system according to the present disclosure, it makes financial sense for the electrolyzer to operate at its maximum endothermic operating point, so as to maximize the portion of energy demand filled with cheap, stored heat from the thermal storage system.

The solid oxide cell 1203 in electrolysis mode receives the hot fluid 1209 from the thermal energy storage system 1201. Because the solid oxide unit 1203 in electrolysis mode operates such that the internal resistance does not generate enough heat to overcome the endothermic reaction, the solid oxide unit 1203 is operating below the thermoneutral voltage. Although it is not shown, each of the electrolyzer cells operates at a voltage below an example thermoneutral voltage of 1.30 V. Depending on how an electrolyzer is designed in terms of internal resistance of the electrical components, the feedstock conditions, and the design temperature, a wide range of thermoneutral voltages are possible. In various embodiments, hot fluid 1209 is passed through the solid oxide cells as a sweep fluid (e.g., sweep gas).

In addition to the hot fluid 1209 (e.g., sweep fluid) provided by the thermal energy storage unit, a reaction fluid (e.g., steam mixed with hydrogen) 1211 is also provided as an input to solid oxide unit 1203. In this example, the reaction fluid 1211 is provided having 96% water and 4% hydrogen gas, at a superheated temperature of 807° C. and at a flow rate of 814 kg per hour. The percentage of water, temperature, or flow rate of reaction fluid 1211 may be varied. In various implementations, the temperature of reaction fluid 1211 is at a temperature below hot fluid 1209 but at a temperature above 800° C. In some implementations, the flow rate of reaction fluid 1211 is balanced with the flow rate of hot fluid 1209 to provide desired reaction results in solid oxide unit 1203.

The reaction fluid 1211 is provided to the solid oxide unit 1203. As a result of the reaction in the solid oxide cell, the water molecule is split and the resulting ions form molecular hydrogen gas. The oxide ions move across the electrolyte to the air electrode where the oxide ions form molecular oxygen and donate electrons. The sweep gas (e.g., hot fluid 1209) pulls the oxygen off of the air electrode. A small portion of hydrogen is included with the inlet steam in order to maintain reducing conditions at the cathode. For example the inlet composition on the cathode side may be up to 90% steam with the remaining 10% hydrogen.

As outputs, the solid oxide cell in electrolysis mode produces product fluid 1213 as well as oxygen enriched fluid 1215 (e.g., oxygen enriched air). In certain implementations, the temperature of the product gas is near a temperature of the oxygen enriched fluid. Both fluids may be at a temperature between a temperature of the reaction fluid and a temperature of the hot fluid 1209. In the illustrated embodiment, the product fluid 1213 is 76% hydrogen and 24% water by volume, which corresponds to 26% hydrogen and 74% water by weight. The temperature of the product fluid 1213 is 830° C. and it is provided at a flow rate of 274 kg per hour. The enriched fluid 1215 is a composition of 60% oxygen and 40% nitrogen by volume, at a temperature of 830° C., and at a flow rate of 2159 kg per hour. The composition, temperature, and flow rate of the product fluid 1213 and enriched fluid 1215 may vary based on the operating conditions of the system.

For product fluid 1213, a thermal load such as an OTSG 1205 including heat condensers is provided. OTSG 1205 uses water to cool and condense out the water vapor entrained in the product stream with the hydrogen gas. More specifically, the product fluid 1213 enters the OTSG 1205, where it is exposed to water that is run through pipes. The source of the water for the OTSG 1205 is a water reservoir 1217, where the water is provided at a relatively cool temperature such as 25° C. As the water passes through the various condensers, its temperature increases. More specifically, the water reservoir 1217 provides the clean water and condensate to a first stage of the heat exchanger, where the product fluid is at its coolest point of the three heat exchangers. The heat exchanger would be inline in that the hottest product stream would exchange heat with the hottest part of the cool water stream, and likewise the coolest portion of the product stream would exchange heat with the coolest of the water stream.

The water then flows to a second heat exchanger that is upstream of the first heat exchanger, and the product fluid is warmer than at the first heat exchanger. At the third heat exchanger, the product fluid 1213 is incoming, and is at its hottest point. While the heat exchangers of the condenser are shown as having three stages, the heat exchanger may be varied to have more or fewer stages as a matter of design choice.

As a result of the heat exchange, the condenser operates as the OTSG 1205, because as the water absorbs the heat from the hot hydrogen product fluid 1213, the water is converted to steam, and the steam is provided to the input of the solid oxide unit at a temperature of around 830° C., e.g., 830° C. The steam is then provided as 1237 and input to the solid oxide unit at 1211. Because the solid oxide unit 1203 is sensitive to contamination, the source 1217 of the water for the condenser is purified water. Optionally, the purified water may be combined with the condensate output 1819 of the condenser.

As the hydrogen passes through the condenser, water is removed from the hydrogen gas as condensate due to the hot hydrogen gas passing over the cool pipes of the condenser. The output 1221 of the condenser is dry product fluid, namely dry hydrogen gas. The hydrogen gas is provided to an industrial application at 1223, as explained above.

At 1225, some of the hydrogen gas (e.g., knock-off hydrogen gas having some water mixed in) is fed back into the input of the solid oxide unit 1203 in combination with the steam that is formed at the output of the condenser as explained above. The hydrogen gas is combined with steam at the input of the solid oxide because 100% steam cannot be input to the solid oxide unit due to degradation issues. Optionally, the gas that is output from the thermal energy storage system may be provided at a temperature based on a parameter of the solid oxide electrolyzer, such as the operating temperature.

Because the thermal energy storage system provides the constant flow of heated fluid 1209 at the temperature required for the solid oxide cell in electrolysis mode, there is no need for electric resistive heaters as in prior systems. Thus, the solid oxide cell 1203 may be provided and used without a heater. However, electric resistive heaters (or other heaters) may be optionally added, to provide temperature adjustments or calibration at the entrance of the solid oxide unit.

As the oxygen enriched fluid 1215 is input to the OTSG 1207, the water from the water reservoir 1227 interacts with the enriched fluid, in a manner similar to that described above for the product fluid. Thus, heat is transferred to the water that passes through the heat exchangers. Such water is output as steam at 1239 and provided to the input of the solid oxide unit as part of reaction fluid 1211 along with the steam from the product fluid condenser and the recirculated hydrogen gas. The enriched fluid may also be vented at 1231.

The enriched fluid is output at 1229. The enriched fluid is output to the atmosphere as air at standard atmospheric composition at 1233. Additionally, oxygen enriched fluid may be recycled at 1235 after blending with atmospheric air, such that the composition of the fluid is 53% nitrogen and 47% oxygen, for example. This fluid is provided as an input to the thermal energy storage system 1201, where it is heated in the thermal storage arrays and provided as an output to the solid oxide unit as hot fluid at 1209, as explained above. Further, the blending of the oxygen enriched fluid with atmospheric air also has a benefit for the thermal energy storage system 1201, in that problems and disadvantages associated with having oxygen enriched fluid in the thermal energy storage system, such as potential oxidation of components, are avoided.

Additionally, the gas that is generated by the thermal energy storage system may be provided to the solid oxide unit at a temperature that is at the desired operating temperature of the solid oxide unit. In other words, the voltage of the solid oxide system is thermoneutral, the system is in an isothermal condition, and the system does not have any net heat demands. In other words, the chemical reactions in the solid oxide unit 1203 will cool the system, whereas the only resistance within the solid oxide system is from the internal electric elements that generate heat from ohmic resistance. The result is that there is no net heat flux, which results in a solid oxide system that remains at the same temperature during operation. The inlet streams enter, and product streams exit the electrolyzer at this stable operating temperature. Accordingly, there is cost savings in that it is not necessary to add additional resistive heaters or fuel-fired heaters to the solid oxide unit to heat the incoming air to a temperature higher than the system's desired operating temperature. When heat is sourced from stored, low-cost electricity from the thermal storage system, it becomes beneficial to replace as much of the energy demand as possible with heat. To do this, an operating voltage below the thermoneutral point may be chosen, where the inlet gas from the thermal storage system is at a temperature above the operating temperature of the electrolyzer so that the sweep gas can transfer heat to the electrolysis reaction. Steam may also be superheated to temperature above the electrolyzer operating temperature by the thermal storage system in order to transfer heat to the reaction.

As noted above, the solid oxide unit may be reversible, such that it can be used as an electrolyzer, as explained above, or as a fuel cell. The fuel cell operation may include, using the structures as explained above, with the thermal energy storage unit providing oxygenated enriched fluid that is combined with compressed hydrogen that also may be preheated to operating temperatures by heat exchange with hot gasses from the thermal storage unit to produce direct current electricity and water, as described herein.

Additionally, in some implementations, when the solid oxide unit is not operating the hot fluid 1209 generated by the thermal energy storage system may continue to be provided through the solid oxide unit. The benefit of flowing such hot fluid through the solid oxide unit when the system is not in use is that the ramping down during the cooling process and the ramping up during the heating process before and after active operation (e.g., thermal cycling), respectively, is avoided. Additionally, the wear and tear on the unit during those processes is also avoided and, in addition, the time and cost of cooling and heating of the various components is reduced (such as the ceramic inside the solid oxide unit). Further, it is possible to switch loads, between the different modes of operation (such as electrolyzer and fuel cell), without shutting down and warming up the unit. In some implementations, the solid oxide unit may continue to be heated by hot fluid 1209 at temperatures around those utilized during fuel cell operations. In prior art, this can be extremely energy intensive if ambient air is heated to provide this heat. However, with a closed or semi-closed loop thermal storage the high temperatures gasses can be circulated through the solid oxide unit with almost no parasitic energy cost.

The composition of the fluid flowing within the thermal energy storage unit may be adjusted by the extraction of oxygen enriched fluid 1229 and/or the introduction of ambient fresh air. The oxygen enriched fluid extracted may be used for another purpose, including the purification and supply of oxygen for a commercial purpose.

In addition, hydrogen and oxygen production may be coupled with other processes such as hydrogenation of $CO_2$ or CO to make liquid fuels or remediation of contaminated groundwater contamination using oxygen. Excess heat, such as from a Fischer-Tropsch process, could be used to convectively charge or pre-heat fluid for the thermal storage unit. Other electrolysis processes benefitting from renewable electricity or thermal energy can also be coupled to the storage system. As an example, a direct co-electrolysis of $CO_2$ in combination with the water-gas shift reaction and steam to produce syngas, which can further be processed in a Fischer-Tropsch reactor for conversion to hydrocarbons, is optimal at a temperature serviceable from a renewable energy storage unit, as described above, and powered using the DC architecture described previously.

Nickel-based electrodes may also be utilized to obtain methanation of carbon monoxide (e.g., Sabatier reaction), with the ratios of various component products being controlled by temperature, pressure, and concentration of components in equilibrium. It may be particularly valuable to locate a facility that combines energy storage, Fischer-Tropsch, Sabatier, and co-electrolysis processes at a biorefinery (such as an ethanol refinery (that has a large supply of biogenic $CO_2$ available from the fermenter) or another processing facility such as a renewable diesel refinery (which has $CO_2$ streams arising from process units and has fuel production equipment that can purify the products arising from the Fischer-Tropsch reaction).

The system may also be used in industrial loads such as renewable diesel refineries, petroleum refineries, or oil fields where there is very high value for low-carbon-free hydrogen that is participating in the chemical process. There is also very high value for 24-hour, zero carbon electric power. For instance, instead of producing hydrogen and power at low efficiency, this set of systems allows conversion of essentially every kilowatt hour that comes into the system either leaving as a kilowatt hour of enthalpy and hydrogen or a kilowatt hour of heat or a kilowatt hour of electricity with very high efficiency (for example, 96 percent total system efficiency).

In various implementations, fluids that are flowing in and out of the heat storage unit can be directly coupled with the fluids that are flowing across one side of the electrolyzer (e.g., the oxygen side). As such integration of a directly heated contact and a directly cooled contact may assist with integration of the fuel cell.

In addition to being connected to the solid oxide electrolysis cell, the thermal energy storage system having electric power that can flow into a heat storage system taking fluid in at 200° C. and delivering fluid at a temperature of 500° C.-1600° C. when discharged as explained above, such as the system disclosed above, can perform district heating, driving of turbines, cogeneration, or other industrial uses. For example, in the case of the solid oxide fuel cell mode, the heat generated in the process of making electricity from a hydrogen input may be used as an industrial output for a steam generator in one implementation. Further, the excess electricity generated by the steam generator may be combined with the electricity provided from the source, such as the renewable source, as the electrical input for the thermal heaters of the thermal energy storage system according to the example implementations.

Innovative Concept

Figure 13:
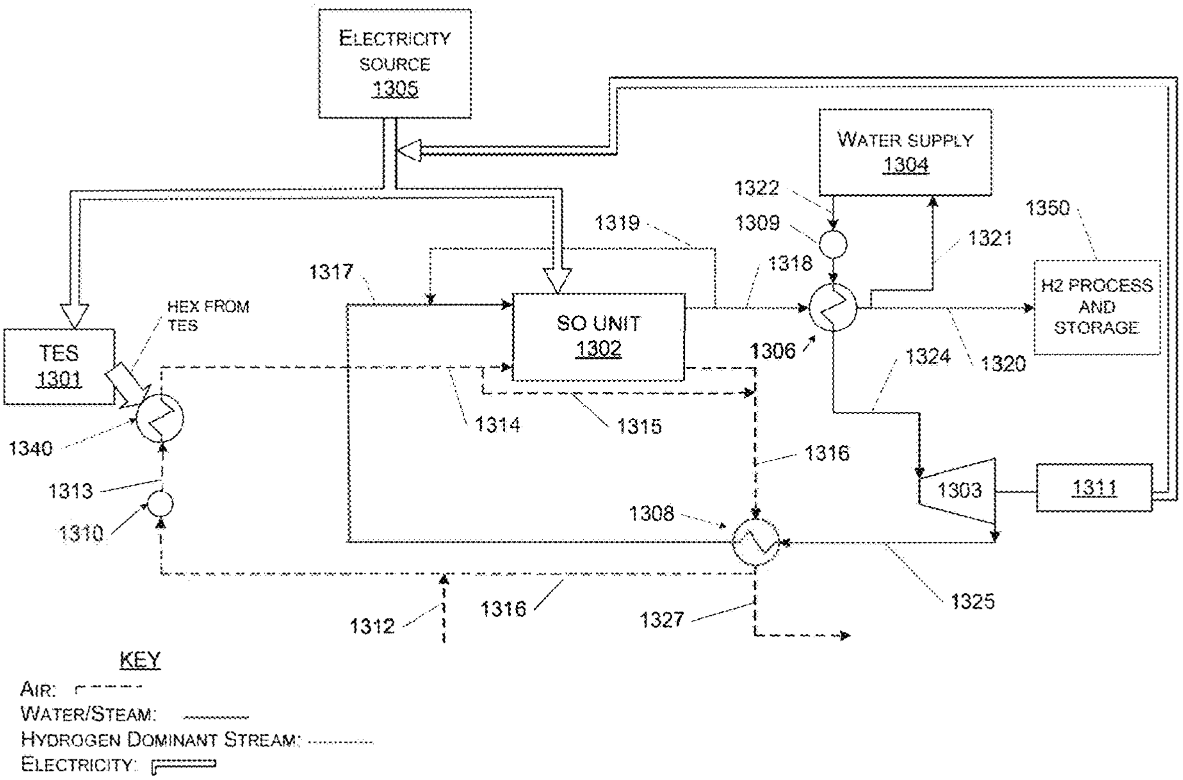
FIGS. 13 to 16 include new disclosure of this continuation-in-part application.
Figure 14:
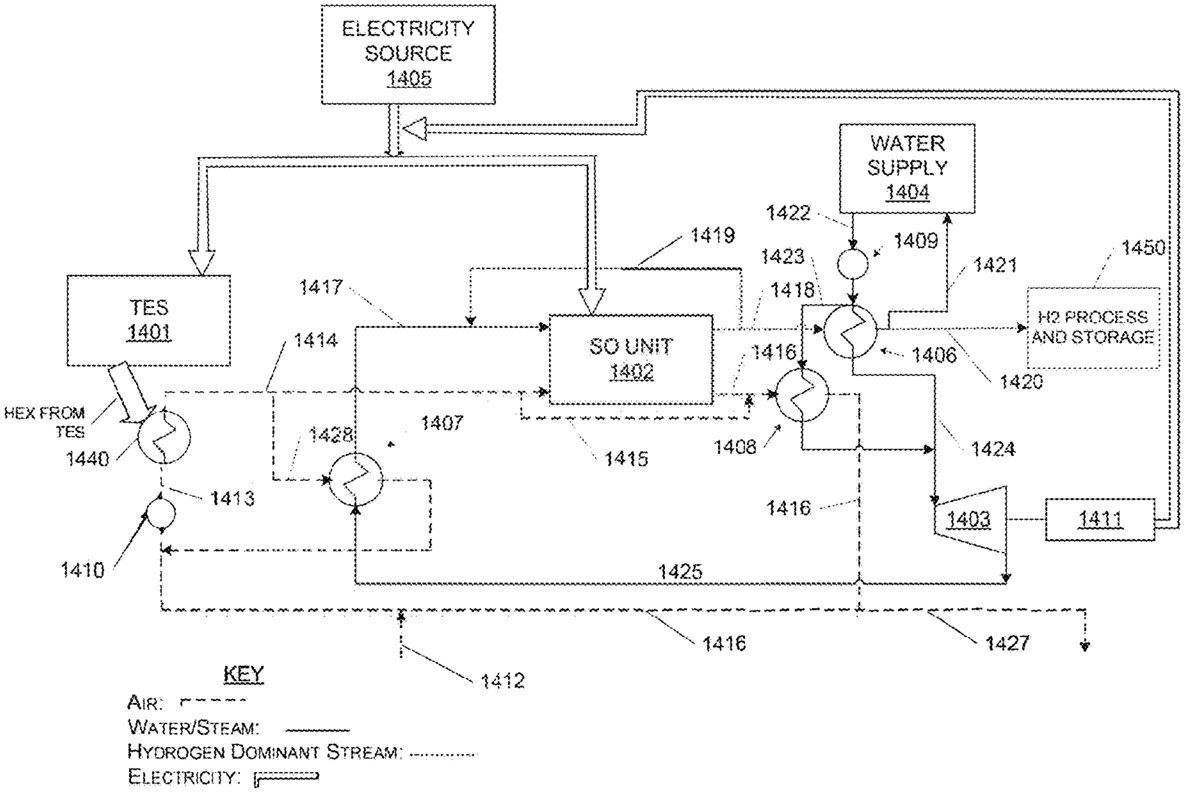
Figure 15:
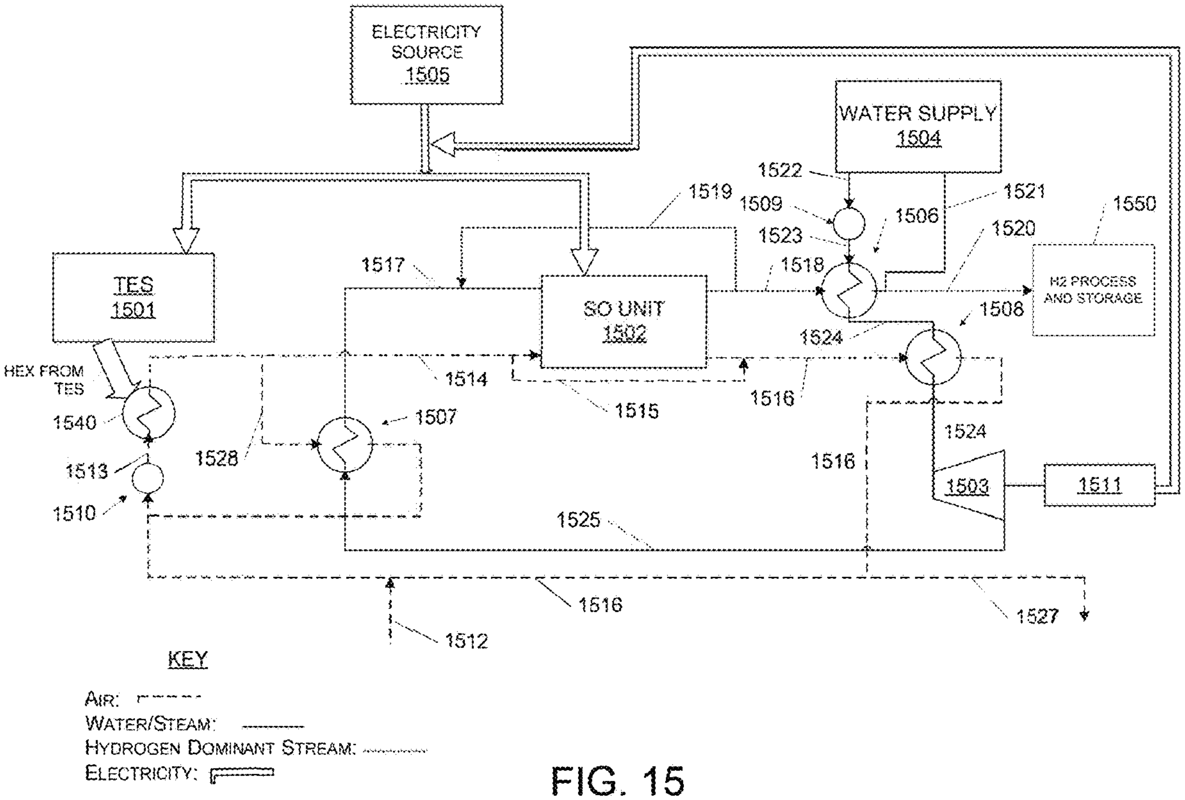
Figure 16:
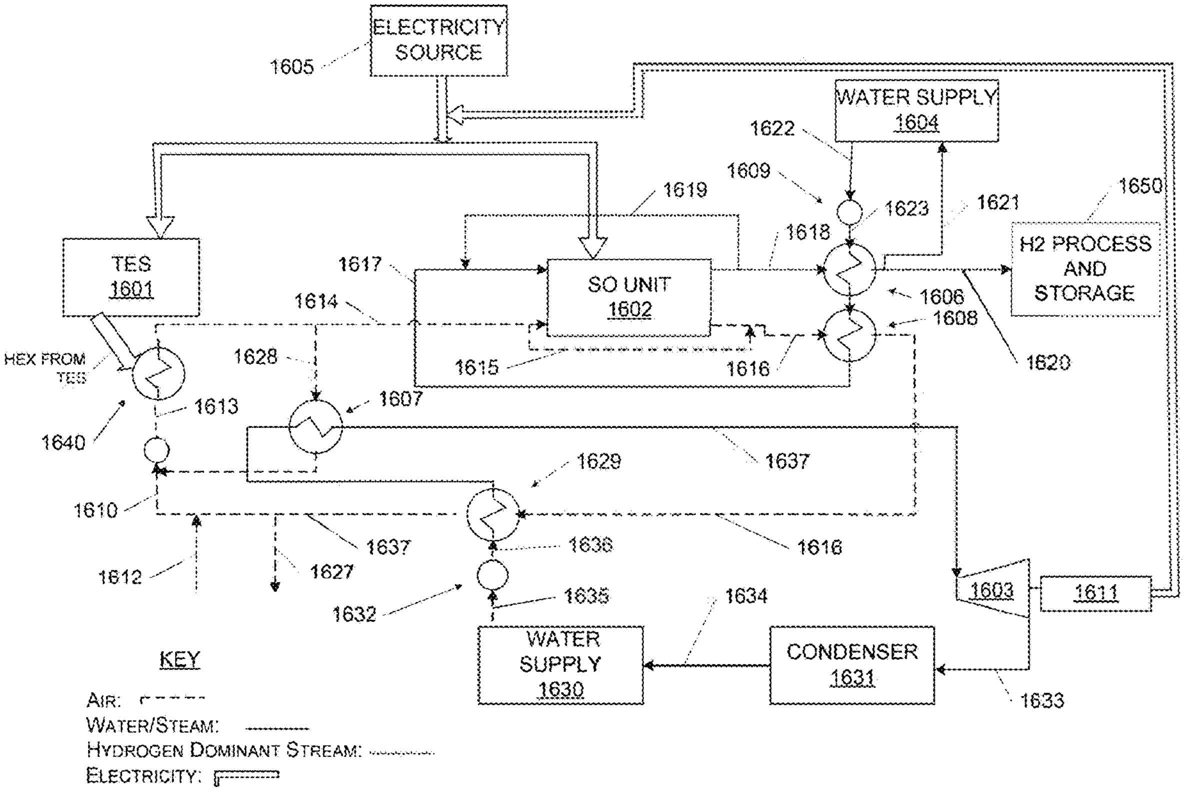

A thermal storage system and a thermal power cycle may be integrated with a solid oxide system as shown in FIGS. 13-16. FIGS. 13, 14, and 15 show an example process integration of a TES system charged by clean, renewable energy with a backpressure or non-condensing steam turbine 1303, 1403, and 1503, respectively. FIG. 16 shows an example process integration with a condensing steam turbine. In the following description, note that the four example processes are similar with many shared streams and components. Streams and components labeled with reference numerals having the same two-digit ending (e.g., 1301 and 1401) may be identical or very similar in function.

FIG. 13 shows an example process of a backpressure turbine 1303 with a thermal storage system 1301 and solid oxide (SO) unit 1302. The thermal storage system 1301 delivers heat radiatively or convectively to heat exchanger 1340 to heat air stream 1313 to a temperature in a specified electrolyzer temperature range for input as hot gas 1314 to the SO unit 1302. In one implementation, the TES 1301 may discharge thermal energy (e.g., heated gas) directly to the SO unit 1302 as stream 1314. The gas 1314 that is either discharged directly from the thermal energy storage unit 1301 or is heated convectively or radiatively by the TES 1301 via heat exchanger 1340 may have a chemical composition similar to air or, depending on whether the solid oxide unit 1302 is operating as a fuel cell or electrolyzer, have a decreased or increased oxygen composition related to air. The hot gas passes through the air side of the solid oxide unit where oxygen is consumed from the stream in fuel cell mode or oxygen is generated and taken by the hot gas stream in electrolysis mode. This is a route for some or all of the hot gas heated by the thermal energy storage system 1301 to bypass the solid oxide unit 1302 in order to solely interact with heat exchangers for steam generation. The stream 1314 may exit the solid oxide unit 1302 with a different oxygen component flow depending on the operating mode of the solid oxide unit 1302, becoming stream 1316. Abypass hot gas stream 1315 may optionally be combined with stream 1316. Stream 1316 is at or near the high operating temperature (500-1000° C.) of the solid oxide unit. This stream 1316 may exchange heat at heat exchanger 1308 to generate or superheat steam for use in the solid oxide system. Heat exchanger 1308 may be an OTSG, HRSG, or some other indirect heat exchanger where hot gas is heating water or steam flow 1325. Depending on the steam quality specifications of the solid oxide unit 1302, there may be a deaerator (not separately shown) disposed between the steam turbine 1303 and the heat exchanger 1308, which is operated to remove dissolved oxygen from the water/steam flow. There may also be a route (not shown) for some or all of the water/steam mixture 1324 to bypass the steam turbine 1303 and join shown stream 1325. This bypass may also include a passive device such as a nozzle to decrease the pressure of the bypassed stream to match the pressure conditions of the turbine outlet. Once the hot gas 1316 exchanges heat with the water or steam flow 1325, a portion of the stream may be vented to the atmosphere or exported to some other use through shown as stream 1327. If the solid oxide unit 1302 is operating as an electrolyzer, flow 1316, and 1327, may have a composition of oxygen that is greater than atmospheric 21% oxygen by mole. In this case, it may be beneficial to export a portion of the oxygen-enhanced air 1327 for some other use such as oxygen-enhanced combustion in another process. The vented air 1327 may also be used elsewhere in the current system or another process for additional heat exchange before eventually being released to the environment. The stream 1316 may then be joined by ambient air 1312. Ambient air is brought in for all or some combination of reasons: close the system mass balance and act as “make-up” air, control the composition of circulating gas through the thermal storage system or solid oxide unit, or control the temperature of the gas prior to reentering the thermal energy storage system 1301 (in an implementation where the TES 1301 takes the place of heat exchanger 1340) since the ambient air may be at a lower temperature than 1316. The returning gas stream may be pumped or compressed slightly in pump/compressor 1310. In an implementation where the TES 1301 replaces the heat exchanger 1340, the returning stream 1313 reenters the thermal energy storage system 1301 at a slightly elevated pressure for the purpose of driving necessary air flow through the thermal storage system and through the process. The stream 1313 is also at a reduced temperature in relation to the gas streams exiting the thermal energy storage unit 1301, 1328 and 1314. 1328 and heat exchanger may or may not be included in the process. If the inlet steam 1317 to the electrolyzer is not sufficiently heated to the operating temperature of the solid oxide unit 1302 in heat exchangers 1306 and 1308, additional thermal energy from the thermal energy storage system 1328 may be directed supply heat to the steam (or hydrogen in fuel cell mode) via another heat exchanger before it enters the solid oxide unit 1302. After exiting 1308, the heated stream 1325 is at an adequate temperature to enter the solid oxide unit and is shown as stream 1317. This flow is steam if used in a conventional solid oxide electrolyzer. The FIGS. 13-16 shown depict a process operating as a conventional electrolyzer. In other implementations, this stream may be carbon monoxide, or some mixture of carbon monoxide and steam if co-electrolysis is being performed. If the solid oxide unit 1302 is operating as a conventional solid oxide fuel cell, this stream may be hydrogen or some mixture of hydrogen and steam. In this case, the process changes slightly in that the turbine may be bypassed completely, and the water supply 1304 may be a hydrogen or carbon monoxide supply. For the remainder of the description, an electrolyzer is assumed to simplify language, but any solid-lined stream in FIGS. 13-16 may be carbon monoxide, carbon dioxide, hydrogen, or water. The heated steam 1317 is joined by a small amount of recirculated product stream 1319 of mostly hydrogen and perhaps unconverted steam from the solid oxide outlet. A small amount of hydrogen must enter the solid oxide unit 1302 along with steam to maintain reducing conditions within the solid oxide unit 1302 and limit degradation. The steam and hydrogen mixture passes though the solid oxide unit 1302 where, in electrolysis, water is converted to hydrogen. The resulting exit stream 1318 may have the same composition as 1319 of majority hydrogen and exits the solid oxide unit 1302 at or near the high operating temperature of the solid oxide unit 1302. This product stream 1318 is cooled via heat exchanger 1306 as it heats up higher pressure water 1323. Heat exchanger 1306 may perform heat exchange via indirect and/or direct contact between the feed water stream 1323 and product gas stream 1318. As the product gas stream is cooled, some unconverted steam contained in the product stream is condensed out. This condensate or water "knock-out" 1321 is returned to the water supply 1304. The remaining product gas stream 1320 has a higher composition of product hydrogen gas as some amount of water vapor was condensed out and removed from the stream. The hydrogen product stream may then be exported for some use in another industrial process. Alternately, the condensed product gas 1320 may be compressed at a hydrogen processing unit in a storage ready form at 1350. The water supply 1304 supplies feedwater 1322 to a pump 1309 where it may be pressurized from ambient pressure to a pressure near the steam turbine inlet to become pressurized stream 1323. In FIG. 13, the feedwater 1323 is heated sufficiently in heat exchanger 1306 to vaporize the feedwater to generate higher pressure steam 1324 to enter the non-condensing steam turbine. FIG. 14 shows an alternative heat exchange process. The main difference between FIGS. 13 and 14 is that both heat exchangers 1406 and 1408 heat pressurized water stream 1423 to generate steam 1424. This steam, which may be superheated, enters the steam turbine at 1403.

FIG. 15 shows another similar heat exchange process as FIG. 14 with the product stream containing hydrogen 1518 first exchanging heat with the pressurized feedwater in heat exchanger 1506 before being further heated by hot gas from the thermal storage system 1516 in heat exchanger 1508. The reason for this specific order is that the product stream must be cooled to a lower temperature than the hot gas stream as cooling to temperatures below 70° C. is required to condense out water contained in the product stream 1518. The hot gas stream 1516 may be able to enter the thermal storage system at temperatures of 250° C. or below, for example. The bypass gas stream 1515 allows heat exchange to occur in 1508 to generate steam for the turbine without being limited by the operating conditions of the solid oxide unit. Even if no streams are being passed through the solid oxide unit or if flow is reduced, hot gas heated by the thermal energy storage system can bypass and heat up feedwater.

The following description of the steam cycle is applicable to the implementations shown in FIGS. 13-15, but for simplicity will be described solely with reference to FIG. 15. In FIG. 15, the generated steam 1524 is expanded across the turbine 1503 from a higher pressure set by pump 1509 to a pressure that is equal or slightly above the operating pressure of the solid oxide unit 1502. The turbine exhaust 1525 may exit the turbine as superheated steam, saturated steam, or some liquid vapor mixture. As mentioned, the exhaust stream 1525 may need to be treated in a deaerator to remove dissolved oxygen. The deaeration may also occur prior to the pump 1510. The steam expansion across the turbine drives shaft work that is converted to electrical energy in generator 1511. This electricity can be used to directly power the solid oxide unit 1502 if operating in electrolysis mode with a power demand. This turbine generated electricity can also be exported to some outside source such as a grid, storage in the thermal energy storage unit 1501, storage in an electrochemical battery, or some other electrical load. If the solid oxide unit 1502 is a fuel cell which generates electricity, this power can be exported in the same way. Electrical source 1505 is some electricity source which may be a renewable source such as solar PV or wind turbine or the grid. This electrical source 1505 is used to charge the thermal energy storage system 1501 where electricity is intermittently pulled, converted to heat, and stored as heat. The electrical source 1505 may also power the electrical demand of electrolysis in the solid oxide unit 1502.

FIG. 16 depicts an example process where the thermal power cycle is a condensing steam turbine instead of a non-condensing. This power cycle is a closed loop so that the working fluid (e.g., water) does not intermix with the water/steam streams that pass through the solid oxide unit 1602. The position of heat exchangers 1606 and 1608 may be reoriented to follow the orientations shown in FIGS. 13-15. Here the water supply is pressurized to a pressure slightly higher than the operating pressure of the solid oxide unit 1602 (to make up for pressure drop in heat exchangers) and significantly less than steam turbine inlet pressures and is heated first by the hydrogen-rich product gas stream 1618 before being further heated by hot gas 1616. The generated steam is then directed to the solid oxide unit 1602 as a reactant for electrolysis at a temperature sufficient for entry to the electrolyzer as stream 1317. Additional hot gas heated by the thermal energy storage system 1601 may be exposed to the electrolyzer steam in heat exchanger 1608 via bypass gas path 1615. The heat exchange here takes place at higher temperatures where the hot gas is superheating the steam to the operating temperature of the solid oxide unit 1602. The result is a hot gas stream that is still at a high temperature after cooling at 1608. The hot gas stream 1616 further exchanges heat with pressurized water at heat exchanger 1629 before venting a portion of the gas 1627 and accepting make-up air 1612 as done in FIGS. 13-15. As secondary water supply 1630 may be the same or different from the electrolyzer steam water supply 1604. The thermal power cycle and electrolyzer may have different water quality requirements which would justify having separate water supplies. Water 1635 for the power cycle enters a feed pump 1632. Unless the solid oxide electrolyzer 1602 is designed for high pressures, the solid oxide unit may operate at pressures close to ambient pressure (~1 bar). In this case, the pump 1632 for the power cycle would have a much higher pressure ratio than water pump 1609 and gas compressor 1610 since the thermal power cycle is operates at maximum pressures substantially higher than ambient. The pressurized water 1536 is heated at heat exchanger 1629 by hot gas returning to the thermal storage system. The heated stream 1637 may be steam at superheated, saturated vapor, saturated liquid vapor mixture, or hot liquid depending on the process conditions. If required, additional hot gas 1628 can be supplied to heat exchanger 1607 to produce superheated steam 1637 for entry to steam turbine 1603. The additional heat provided by heat exchanger 1607 may be needed for steam generation purposes since the heat provided to heat exchanger 1629 is limited by size (flow rate) of heat exchanger 1608. The turbine 1603 expands steam from the high pressure set by pump 1632 to the pressure of the condenser 1631 which drives power generation in generator 1611. The condenser 1631 may be air cooled or water cooled in order to convert exhaust steam flow 1633 to liquid condensate 1634 which is returned to the power cycle's water supply system 1630.

3. Advantages Over Prior Systems

The solid oxide unit of the example implementations may have various benefits and advantages over prior designs. The high operating temperatures of solid oxide electrolyzers and fuel cells are what currently limit commercial development and deployment of the technology. High operating temperatures are necessary because of material constraints attached to the electrolyte. The most used electrolyte is Yttria-stabilized zirconia (YSZ) because of its superior thermal stability. However, its ionic conductivity is sufficient only at temperatures above around 700° C. The resulting high operating temperatures limit the material selection of other components of the solid oxide cells, such as the sealants, interconnects, and electrodes, as they must have good thermal stability and minimal thermal expansion across wide temperature ranges. This leads to complicated and expensive system designs. There are also operational challenges due to the high temperature requirements that the current implementation address. First, the startup and shutdown of high temperature solid oxide units negatively affect the lifetime and/or maintenance costs. When a system is turned off, the system may be at a temperature between the high operating temperature and the ambient temperature of the environment. When the system is turned on again, the unit must be heated back to operating temperature. This thermal-cycling causes degradation of the stack components as different components thermally expand and contract sometimes at different rates within the stack. Additionally, when starting up, the units must be heated to a high operating temperature which is energy intensive and time consuming. In prior art systems, the energy cost of keeping the solid oxide units at high temperatures may be too large to justify keeping the units at hot operating conditions. The thermal energy storage system in the present implementation can use cheap, stored thermal energy to keep the units at or near operating temperature when they are not operating. For example, hot gases at or near the SOC's operating temperature from the thermal energy storage system may be passed through the solid oxide stack before being recirculated to the thermal energy storage system. This feature of the present implementation eliminates the problems associated with thermal cycling. Thus, the present implementation's ability to keep a system hot may enable all or some other combination of the following improvements to art systems: longer system lifetimes, lower maintenance costs, lower material costs, faster start up times, and/or improved overall energy consumption. The present implementation also provides benefit when a solid oxide unit is operating. For example, the solid oxide unit described herein receives stored heat from the thermal energy storage system as its input, instead of requiring an external heater, such as an electrical resistive heater or a fuel-fired heater. With the thermal energy storage system supplying stored heat in operation to the operating solid oxide unit with some degree of recirculation of the heat transfer medium contacting the SOC, the resulting overall energy consumption is reduced, the cost of energy is reduced and, if the present implementation is an improvement over a hydrocarbon fired heater, the amount of pollution may also be reduced. The energy storage system may directly supply high temperature gas or indirectly provide heat to an input gas stream to the oxygen electrode (anode) of a cell and/or preheated hydrogen for the hydrogen-water electrode (cathode) and/or generate/superheat steam for the cathode. Additionally, the thermal energy storage system enables cheap electricity to produce heat used in the solid oxide unit in electrolysis operation. This makes operating at the maximum heat substitution point (max endothermic voltage) beneficial versus operating at or near thermoneutral voltage as is standard in art. There is also the benefit of better thermal balance of the system given the thermal storage unit's ability to take recirculated SOC product gas as an input. This dramatically lowers the parasitic energy consumption of preheating fuel in continuous operation.

Further, while art approaches may burn the oxygen byproduct at the output of the solid oxide unit to generate heat for the heater that the input of the solid oxide unit, the example implementations do not require heat to be generated at the input of the solid oxide unit. Thus, the byproduct air is provided to the heat exchanger, without burning off the oxygen. This produced oxygen then may be vented to the environment, recirculated through the thermal energy storage system, or exported for some use in a different process.

The enhanced concentration of oxygen in the flow may contribute to reductions in the cost of secondary oxygen separation. Such solid oxide electrolyzer integration with thermal energy storage has benefits including significantly enhanced efficiency in the conversion of electrical energy to energy plus hydrogen and enabling such high efficiency electrolyzers to be combined and used effectively with variable supplies of renewable electricity. Accordingly, charging may be intermittent while temperature is held constant without continuous use of electrical power.

Also, a portion of the energy in the electrolytic process is supplied by stored heat. It is beneficial to do this because electrical energy may be stored from the grid when the supply is plentiful and inexpensive, for use later in electrolysis when the instantaneous demand for grid electricity is large therefore expensive. When electric power is available or low-cost, the electric power can be used to both thermally charge the storage system and drive electrolysis to convert water to hydrogen. Existing electrolyzers cost around $500-600/kW, whereas heat storage systems may be significantly less expensive. Heat storage may be less expensive on a per kilowatt basis than electrolyzer stacks and it may therefore be less costly to pull power in at a very high rate during periods of lower-cost power availability and apportion the power between the heat storage and the electrolyzer. The electrolyzer can be made to run longer and the peak load or the peak power can be dropped quickly into heat storage. Thus, there is a matching of electrolyzer capacity factor and cost against the availability of variable renewable electricity. One configuration of a system according to the present disclosure can include an intermittent renewable electric source, a thermal energy storage system, and an electrolyzer in which the thermal energy storage system charging acts as a voltage brake for the electric source, to ensure that even with fluctuating electricity generation the solid oxide unit receives constant electricity without having to waste excess renewable generation. In such a system, the electrolyzer can be a dual-purpose reversible solid oxide cell, and the thermal energy storage system can allow the solid oxide system to operate in a flexible mode of operation, wherein the reactant streams are circulated at operating temperature without an electric current through the cells, with nearly no parasitic energy cost since the streams are being recirculated back to the thermal storage system. This operation allows the solid oxide unit to quickly shift between fuel cell and electrolysis mode, in order to either follow demand or supply a constant electric load.

The integration of a thermal energy storage system, thermal power cycle (Rankine, supercritical $CO_2$), electrolyzer, and an intermittent renewable energy source may have a significant advantage over art systems having just an electrolyzer and intermittent renewable source when the goal is to produce hydrogen while consuming little carbon-based fuel. The art system produces hydrogen at times when the renewable energy source is generating and turn-off when the renewable source is not generating (solar PV at night). The art electrolyzer system uses renewable electricity to both preheat the reactant streams to operating temperature and supply electricity to drive the water-splitting reaction. The electrolyzer system may be sized (referring to the system's power demand in nominal operation) in relation to the installed renewable generation capacity or nameplate such that the renewable generation fills the electrolyzer system's operating power demand when the renewable resource is available. Adding a thermal energy storage system and a thermal power cycle to the art system, can produce the same amount of hydrogen over some time period with the same installed renewable generating capacity and a smaller-sized electrolyzer. The electrolyzer may be the most expensive component of the proposed system on a per Watt of capacity basis. The renewable electricity generation is now oversized for the power demand of the smaller electrolyzer. When the renewable source is generating, the electric demand of the smaller electrolyzer is still fully met by the renewable electric power. However, now the excess renewable generation is used to thermally charge the thermal energy storage system. The thermal energy storage system may integrate with the electrolyzer and supply heat continuously and provide the benefits disclosed above. When the renewable source stops generating, the charged thermal energy storage system provides heat to a thermal power cycle that may be integrated with hot product streams of the operating electrolyzer. The thermal power cycle generates power for electrolysis from the stored heat either continuously or only when the renewable generation is not sufficient to power the electrolyzer. Accordingly, the smaller sized electrolyzer can operate at a higher capacity factor than the art system using a larger electrolyzer and a similarly sized renewable generator. The result is a system that produces more hydrogen per electrolyzer capacity installed than art systems. Given that the electrolyzer may be the most expensive component of the system, this proposed system may produce just as much hydrogen for a lower installed system cost. The art system may also have some electrochemical storage such as a lithium-ion battery storing renewable electricity to enable the higher capacity factor production of hydrogen. The same improvement exists here in that lithium-ion batteries may be significantly more expensive on a per capacity basis than a thermal energy storage system or thermal power cycle. The proposed system may offer a significant financial advantage in producing hydrogen sourced from renewable electricity.

To the extent a term used in a claim is not defined below, it should be given the broadest definition persons in the pertinent art have given that term as reflected in printed publications and issued patents at the time of filing. For example, the following terminology may be used interchangeably, as would be understood to those skilled in the art:

A Amperes
AC Alternating current
DC Direct current
DFB Dual Fluidized Bed
EAR Enhanced Oil Recovery
EV Electric vehicle
GT Gas turbine
HRSG Heat recovery steam generator
kV kilovolt
kW kilowatt
MED Multi-effect desalination
MPPT Maximum power point tracking
MSF Multi-stage flash
MW megawatt
OTSG Once-through steam generator
PEM Proton-exchange membrane
PV Photovoltaic
RSOC Reversible solid oxide cell
SOEC Solid oxide electrolyzer cell
SOFC Solid oxide fuel cell
ST Steam turbine
TES Thermal Energy Storage
TSU Thermal Storage Unit Additionally, the term "heater" is used to refer to a conductive element that generates heat. For example, the term "heater" as used in the present example implementations may include, but is not limited to, a wire, a ribbon, a tape, or other structure that can conduct electricity in a manner that generates heat. The composition of the heater may be metallic (coated or uncoated), ceramic or other composition that can generate heat.

While foregoing example implementations may refer to "air", including $CO_2$, the inventive concept is not limited to this composition, and other fluid streams may be substituted therefor for additional industrial applications. For example but by way of limitation, enhanced oil recovery, sterilization related to healthcare or food and beverages, drying, chemical production, desalination and hydrothermal processing (e.g. Bayer process.) The Bayer process includes a calcination step. The composition of fluid streams may be selected to improve product yields or efficiency, or to control the exhaust stream.

In any of the thermal storage units, the working fluid composition may be changed at times for a number of purposes, including maintenance or re-conditioning of materials. Multiple units may be used in synergy to improve charging or discharging characteristics, sizing or ease of installation, integration or maintenance. As would be understood by those skilled in the art, the thermal storage units disclosed herein may be substituted with other thermal storage units having the necessary properties and functions; results may vary, depending on the manner and scale of combination of the thermal storage units.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain example implementations herein is intended merely to better illuminate the example implementation and does not pose a limitation on the scope of the example implementation otherwise claimed. No language in the specification should be construed as indicating any non-claimed element essential to the practice of the example implementation.

Groupings of alternative elements or example implementations of the example implementation disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various example implementations of the example implementation, other and further example implementations of the example implementation may be devised without departing from the basic scope thereof. The scope of the example implementation is determined by the claims that follow. The example implementation is not limited to the described example implementations, versions or examples, which are included to enable a person having ordinary skill in the art to make and use the example implementation when combined with information and knowledge available to the person having ordinary skill in the art.

What is claimed is:

1. An electrolysis system including:

a thermal energy storage (TES) system configured to be charged using electrical energy;

a solid oxide electrolyzer (SOE) configured to receive thermal energy and electrical energy;

a heat exchange system thermally coupling the TES system to the SOE; and a thermal power cycle system configured to generate electricity using heat provided by the TES system and/or the SOE, wherein the heat exchange system includes a first pathway configured to deliver a heated working fluid from the TES system directly to the SOE and a second pathway configured to route another heated working fluid from the TES system to a steam generator for the thermal power cycle; and wherein the SOE is configured to be operable using only energy supplied from the TES system as a thermal source and an electrical input source for the SOE.

2. The system of claim 1, wherein the TES system is configured to be charged using electrical energy that is intermittent.

3. The system of claim 1, wherein the heat exchange system includes:

a third pathway configured to direct the heated working fluid to a heat exchanger and configured to preheat steam for the SOE using thermal energy from the TES system.

4. The system of claim 1, wherein the thermal power cycle includes a steam turbine, a condenser, and a closed-loop steam circuit configured to fluidically couple the steam turbine, the condenser, and the heat exchanger.

5. The system of claim 1, wherein the TES system includes a refractory thermal storage medium.

6. An electrolysis system, including:

a thermal energy storage (TES) system configured to be charged using electrical energy;

a solid oxide electrolyzer (SOE) configured to receive thermal energy and electrical energy;

a heat exchange system thermally coupling the TES system to the SOE; and a thermal power cycle system configured to generate electricity using heat provided by the TES system and/or the SOE;

wherein the SOE is configured to be operable using only energy supplied from the TES system as a thermal source and an electrical input source for the SOE;

the system further including one or more bypass conduits and flow control valves configured to selectively route working fluid from the TES system around the SOE and toward the steam generator or another heat exchanger.

7. The system of claim 1, wherein the SOE includes an electrolysis stack assembly configured to receive heat from preheated air and/or superheated steam working fluids.

8. The system of claim 1, wherein the heat exchange system further includes:

a water vapor condenser configured to recover heat from and dry the SOE product hydrogen stream;

a steam turbine configured to utilize heat from the TES and SOE systems in the thermal power cycle; and a steam turbine generator configured to provide electricity to the SOE system.

9. The system of claim 1, wherein the TES system is configured to supply thermal energy via radiation, conduction, convection, or combinations thereof.

10. The system of claim 1, further including:

a control system configured to modulate flow of thermal energy and working fluid between the TES system, the SOE, and the thermal power cycle system based on one or more system parameters.

11. The system of claim 10, wherein the one or more system parameters includes at least one of: a detected flow rate of heated working fluid, a desired SOE temperature, or a detected TES temperature.

12. An integrated electrolysis system including:

a thermal energy storage (TES) system configured to store and release heat using intermittent electricity as an energy input;

a solid oxide electrolyzer (SOE) unit configured to produce hydrogen or synthesis gas from steam using both heat and electricity;

a heat exchange system including:

a first section for transferring heat from the TES system to the SOE for temperature management and operation;

a second section for generating steam using heat from the TES system; and a third section for capturing heat from the output stream of the SOE;

a thermal power cycle subsystem, including a steam turbine, configured to generate electricity from steam produced using heat from the TES system;

wherein the system is configured to be operable to run the SOE continuously using only intermittent electrical input stored and dispatched by the TES system, with both heat and electricity provided from within the integrated system; and wherein the system is configured to route working fluid to one or more of:

an inlet of the SOE;

a steam generation heat exchanger; and a heat exchanger configured to preheat electrolyzer steam.

13. The system of claim 12, wherein the heat exchange system includes at least a first heat exchanger for capturing heat from SOE output gas, and a second heat exchanger for generating steam from excess hot air supplied by the TES system.

14. The system of claim 12, wherein the thermal power cycle subsystem is a closed-loop steam cycle including a condenser and water recirculation loop.

15. The system of claim 12, wherein the TES system includes a refractory heat storage medium.

16. The system of claim 12, wherein the TES system includes one or more radiation chambers.

17. A system for production and power generation, including:

a solid oxide electrolyzer (SOE) configured to receive steam and operate within a specified thermally acceptable operating range of temperatures;

a thermal energy storage (TES) system configured to discharge heated working fluid to heat the steam supplied to the SOE;

a condensing steam turbine coupled to a steam loop, the steam loop including:

a pressurized water pump, a first heat exchanger configured to receive heat from a product gas stream exiting the SOE, and a second heat exchanger configured to receive heated working fluid from the TES system;

wherein steam is expanded in the condensing steam turbine to generate electricity, and wherein the system is configured to be operable to run the SOE continuously using only intermittent electrical input stored and dispatched by the TES system, with both heat and electricity provided from within the system; and wherein the second heat exchanger is downstream of the first heat exchanger and is configured to provide additional superheating of steam using heated working fluid from the TES system.

18. The system of claim 17, wherein the TES system includes a closed-loop gas circuit configured to deliver and recirculate heated gas as the heated working fluid.

19. The system of claim 17, wherein the first heat exchanger is configured to condense water vapor from the product gas stream exiting the SOE, thereby increasing the purity of hydrogen gas.

20. The system of claim 17, wherein the SOE is a reversible solid oxide unit that is operable in both fuel cell mode and electrolysis mode.

21. The system of claim 17, wherein the TES system receives electrical input from a renewable energy source to charge a heat storage medium of the TES.

* * * * *